United States Patent
Wu et al.

(10) Patent No.: US 12,503,440 B2
(45) Date of Patent: Dec. 23, 2025

(54) NITROXOLINE DERIVATIVE, PREPARATION METHOD THEREFOR, AND USE THEREOF

(71) Applicants: Jiangsu Yahong Meditech Co., Ltd., Taizhou (CN); Asieris Pharmaceuticals (Shanghai) Co., Ltd., Shanghai (CN)

(72) Inventors: Liang Wu, Taizhou (CN); Yijun Deng, Taizhou (CN); Lu Xiao, Shanghai (CN); Ke Pan, Shanghai (CN)

(73) Assignees: Jiangsu Yahong Meditech Co., Jiangsu (CN); Asieris Pharmaceuticals (Shanghai) Co., Ltd., Shanghai (CN)

( * ) Notice: Subject to any disclaimer, the term of this patent is extended or adjusted under 35 U.S.C. 154(b) by 449 days.

(21) Appl. No.: 18/040,555

(22) PCT Filed: Jul. 30, 2021

(86) PCT No.: PCT/CN2021/109592
§ 371 (c)(1),
(2) Date: Feb. 3, 2023

(87) PCT Pub. No.: WO2022/028321
PCT Pub. Date: Feb. 10, 2022

(65) Prior Publication Data
US 2023/0295094 A1    Sep. 21, 2023

(30) Foreign Application Priority Data
Aug. 3, 2020  (CN) .......................... 202010767532.3

(51) Int. Cl.
C07D 215/38    (2006.01)
A61P 13/02     (2006.01)
C07D 215/42    (2006.01)
C07D 215/50    (2006.01)
C07D 215/54    (2006.01)
C07D 401/04    (2006.01)

(52) U.S. Cl.
CPC ............ C07D 215/38 (2013.01); A61P 13/02 (2018.01); C07D 215/42 (2013.01); C07D 215/50 (2013.01); C07D 215/54 (2013.01); C07D 401/04 (2013.01)

(58) Field of Classification Search
CPC .. C07D 215/38; C07D 215/42; C07D 215/50; C07D 215/54; C07D 401/04; A61P 13/02
See application file for complete search history.

(56) References Cited

U.S. PATENT DOCUMENTS

| | | | |
|---|---|---|---|
| 8,729,097 B2 * | 5/2014 | Liu | A61P 35/00 514/312 |
| 10,287,265 B2 * | 5/2019 | Puskás | A61P 37/00 |
| 10,744,127 B2 * | 8/2020 | Szakács | A61K 31/47 |
| 10,905,668 B2 * | 2/2021 | Pisano | C07C 59/74 |
| 2013/0210821 A1 * | 8/2013 | Vath | C07D 401/06 514/266.1 |

FOREIGN PATENT DOCUMENTS

| | | |
|---|---|---|
| CN | 105228984 A | 1/2016 |
| CN | 109467533 A | 3/2019 |
| CN | 111960998 A | 11/2020 |
| WO | 2016154051 A1 | 9/2016 |

OTHER PUBLICATIONS

Ibeanu, Med Chem Res, 2018, vol. 27, 1093-1102. (Year: 2018).*
Casu, J Biol Chem, vol. 291(45), 23817-23829, 2016. (Year: 2016).*
Valentine-King, Antimicrobial Agents and Chemotherapy, 2019, 63(3), e02265-18, 1-12. (Year: 2019).*
Xing, E J Med Chem, 2019, 163, 281-294. (Year: 2019).*
Sosic, Bioorg & MEd Chem Lett, vol. 28, 2018, 1239-1247. (Year: 2018).*
Anantharajah, JID, 2016, 214, 1105-1116. (Year: 2016).*
Garcia, J Organometallic CHemistry, 867, 312-322, 2018. (Year: 2018).*
Mitra, J Indian Chem Soc, vol. LIX, 192, 367-369. (Year: 1982).*
International Search Report issued Oct. 20, 2021 in PCT/CN2021/109592.
Written Opinion issued Oct. 20, 2021 in PCT/CN2021/109592.
Hamada, Yoshiki, et al., "Quinoline derivatives. (12)," Yakugaku Zasshi, vol. 86, No. 3, Dec. 31, 1966.

(Continued)

*Primary Examiner* — D Margaret M Seaman
(74) *Attorney, Agent, or Firm* — Ice Miller LLP

(57) ABSTRACT

The present invention discloses a nitroxoline derivative, a preparation method therefor, and use thereof. Specifically, the present discloses a compound as represented by general formula (I), a preparation method therefor, a pharmaceutical composition containing same, and use thereof in treating infectious diseases or cancers. The compound of the present invention has excellent anti-tumor activity and antibacterial activity, and can be developed into a drug for treating tumors and infectious diseases. The definition of each group in general formula (I) is the same as that in the description.

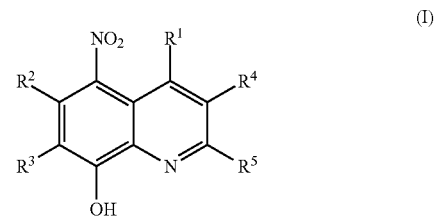

12 Claims, No Drawings

(56) References Cited

OTHER PUBLICATIONS

Gershon, Herman, et al., "5-Nitro-8-Quinolinols and Their Copper(II) Complexes Implications of the Fungal Spore Wall as a Possible Barrier Against Potential Antifungal Agents," Journal of Medicinal Chemistry, vol. 12, No. 5, Nov. 30, 1969.

\* cited by examiner

NITROXOLINE DERIVATIVE, PREPARATION METHOD THEREFOR, AND USE THEREOF

CROSS-REFERENCE TO RELATED APPLICATION

This application is a Section 371 of International Application No. PCT/CN2021/109592 filed Jul. 30, 2021, which was published in the Chinese language Feb. 10, 2022, under International Publication No. WO 2022/028321 A1, which claims priority to Chinese Patent Application No. 202010767532.3 filed Aug. 3, 2020, the disclosures of which are incorporated herein by reference in their entireties.

FIELD OF THE INVENTION

The present invention relates to a nitroxoline derivative, a method for preparing the same, and a use thereof.

BACKGROUND OF THE INVENTION

Nitroxoline, the chemical name of which is 5-nitro-8-hydroxyquinoline, was developed as an oral antibiotic drug in the 1960s. It was mainly used for urinary system infections, and had a relatively safe history of use before being replaced due to discovery and use of new antibiotics. However, with the emergence of bacterial resistance, which is becoming more and more prominent in the field of antibiotics, the scope of application of existing clinical antibacterial drugs is facing challenges to varying degrees. The research and development of antimicrobials against multidrug-resistant bacteria is in urgent need in clinical practice. No obvious resistance against nitroxoline has been found in bacteria.

Moreover, in recent years, new studies have found that nitroxoline can simultaneously inhibit the methionine aminopeptidase MetAP2 and the silence information regulator 2-related enzyme SIRT1 in vascular endothelial cells, exerting a synergistic inhibitory effect on tumor angiogenesis, as well as an inhibitory effect on the proliferation of tumor cells. Therefore, nitroxoline has been re-developed to treat tumors including bladder cancer. It would be even more exciting for researchers to develop a compound with better anticancer activity than nitroxoline.

SUMMARY OF THE INVENTION

The inventor has designed and synthesized a series of nitroxoline derivatives through intensive research. They show excellent antitumor activity and antibacterial activity, and can be developed as a drug for treating tumor and infectious disease.

Therefore, the present invention provides a compound of formula (I), or a mesomer thereof, or a tautomer thereof, a stereoisomer thereof, a enantiomer thereof, a diastereoisomer thereof, or an isotopic derivative thereof, or a pharmaceutically acceptable salt of any of the foregoing, or a crystal form or solvate of any of the foregoing, or a prodrug or metabolite of any of the foregoing, or a racemate containing the same, or a mixture containing the same, wherein the expression "thereof" refers to the compound of formula (I),

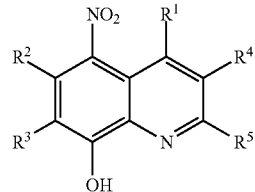

(I)

wherein:
R$^1$ is selected from the group consisting of hydrogen, halogen, nitro, cyano, oxo, alkyl, alkoxy, alkenyl, alkynyl, cycloalkyl, heterocyclyl, aryl, heteroaryl, —NR$^a$R$^b$, —OR$^a$, —SR$^a$, —C(O)R$^a$, —O(O)CR$^a$, —C(O)OR$^a$, —C(O)NR$^a$R$^b$, —N(R$^b$)C(O)R$^a$, —S(O)$_p$R$^a$, —S(O)$_p$NR$^a$R$^b$ and —N(R$^b$)S(O)$_p$R$^a$, wherein the alkyl, alkenyl, alkynyl, cycloalkyl, heterocyclyl, aryl and heteroaryl are optionally further substituted by one or more substituent(s) selected from Q;

R$^2$ is selected from the group consisting of hydrogen, halogen, nitro, cyano, oxo, alkyl, alkoxy, alkenyl, alkynyl, cycloalkyl, heterocyclyl, aryl, heteroaryl, —NR$^a$R$^b$, —OR$^a$, —SR$^a$, —C(O)R$^a$, —O(O)CR$^a$, —C(O)OR$^a$, —C(O)NR$^a$R$^b$, —N(R$^b$)C(O)R$^a$, —S(O)$_p$R$^a$, —S(O)$_p$NR$^a$R$^b$ and —N(R$^b$)S(O)$_p$R$^a$, wherein the alkyl, alkenyl, alkynyl, cycloalkyl, heterocyclyl, aryl and heteroaryl are optionally further substituted by one or more substituent(s) selected from the group consisting of halogen, amino, nitro, cyano, oxo, hydroxy, thiol, carboxy, alkoxycarbonyl, alkyl, alkoxy, alkenyl, alkynyl, cycloalkyl, heterocyclyl, aryl and heteroaryl;

R$^3$ is selected from the group consisting of hydrogen, halogen, nitro, cyano, oxo, alkyl, alkoxy, alkenyl, alkynyl, cycloalkyl, heterocyclyl, aryl, heteroaryl, —NR$^a$R$^b$, —OR$^a$, —SR$^a$, —C(O)R$^a$, —O(O)CR$^a$, —C(O)OR$^a$, —C(O)NR$^a$R$^b$, —N(R$^b$)C(O)R$^a$, —S(O)$_p$R$^a$, —S(O)$_p$NR$^a$R$^b$ and —N(R$^b$)S(O)$_p$R$^a$, wherein the alkyl, alkenyl, alkynyl, cycloalkyl, heterocyclyl, aryl and heteroaryl are optionally further substituted by one or more substituent(s) selected from the group consisting of halogen, amino, nitro, cyano, oxo, hydroxy, thiol, carboxy, alkoxycarbonyl, alkyl, alkoxy, alkenyl, alkynyl, cycloalkyl, heterocyclyl, aryl and heteroaryl;

R$^4$ is selected from the group consisting of hydrogen, halogen, nitro, cyano, oxo, alkyl, alkoxy, alkenyl, alkynyl, cycloalkyl, heterocyclyl, aryl, heteroaryl, —NR$^a$R$^b$, —OR$^a$, —SR$^a$, —C(O)R$^a$, —O(O)CR$^a$, —C(O)OR$^a$, —C(O)NR$^a$R$^b$, —N(R$^b$)C(O)R$^a$, —S(O)$_p$R$^a$, —S(O)$_p$NR$^a$R$^b$ and —N(R$^b$)S(O)$_p$R$^a$, wherein the alkyl, alkenyl, alkynyl, cycloalkyl, heterocyclyl, aryl and heteroaryl are optionally further substituted by one or more substituent(s) selected from the group consisting of halogen, amino, nitro, cyano, oxo, hydroxy, thiol, carboxy, alkoxycarbonyl, alkyl, alkoxy, alkenyl, alkynyl, cycloalkyl, heterocyclyl, aryl and heteroaryl;

R$^5$ is selected from the group consisting of hydrogen, halogen, nitro, cyano, oxo, alkyl, alkoxy, alkenyl, alkynyl, cycloalkyl, heterocyclyl, aryl, heteroaryl, —NR$^a$R$^b$, —OR$^a$, —SR$^a$, —C(O)R$^a$, —O(O)CR$^a$, —C(O)OR$^a$, —C(O)NR$^a$R$^b$, —N(R$^b$)C(O)R$^a$, —S(O)$_p$R$^a$, —S(O)$_p$NR$^a$R$^b$ and —N(R$^b$)S(O)$_p$R$^a$, wherein the alkyl, alkenyl, alkynyl, cycloalkyl, heterocyclyl, aryl and heteroaryl are optionally further substituted by one or more substituent(s) selected from the group consisting of halogen, amino, nitro, cyano, oxo, hydroxy, thiol, carboxy, alkoxycarbonyl, alkyl, alkoxy, alkenyl, alkynyl, cycloalkyl, heterocyclyl, aryl and heteroaryl;

$R^a$ and $R^b$ are each independently selected from the group consisting of hydrogen, halogen, hydroxy, nitro, cyano, oxo, alkyl, alkoxy, alkenyl, alkynyl, cycloalkyl, heterocyclyl, aryl and heteroaryl, wherein the alkyl, alkenyl, alkynyl, cycloalkyl, heterocyclyl, aryl and heteroaryl are optionally further substituted by one or more substituent(s) selected from Q;

or, $R^a$ and $R^b$ together with the nitrogen atom to which they are attached form a nitrogen-containing heterocyclyl, the nitrogen-containing heterocyclyl optionally comprises one or more heteroatom(s) selected from the group consisting of N, O and S in addition to N, the nitrogen-containing heterocyclyl is optionally further substituted by one or more substituent(s) selected from Q;

Q is halogen, amino, nitro, cyano, oxo, hydroxy, thiol, carboxy, alkoxycarbonyl, alkyl, alkoxy, alkenyl, alkynyl, cycloalkyl, heterocyclyl, aryl, heteroaryl, —$NR^cR^d$, —$OR^c$, —$SR^c$, —$C(O)R^c$, —$O(O)CR^c$, —$C(O)OR^c$, —$C(O)NR^cR^d$, —$C(O)N(R^c)(CH_2)_qR^d$, —$NR^cC(O)R^d$, —$S(O)_pR^c$, —$S(O)_pNR^cR^d$ or —$NR^cS(O)_pR^d$, wherein the alkyl, alkoxy, alkenyl, alkynyl, cycloalkyl, heterocyclyl, aryl and heteroaryl are optionally further substituted by one or more substituent(s) selected from the group consisting of halogen, amino, nitro, cyano, oxo, hydroxy, thiol, carboxy, alkoxycarbonyl, alkyl, alkoxy, alkenyl, alkynyl, cycloalkyl, heterocyclyl, aryl and heteroaryl;

$R^c$ and $R^d$ are each independently selected from the group consisting of hydrogen, halogen, hydroxy, nitro, cyano, oxo, alkyl, alkoxy, alkenyl, alkynyl, cycloalkyl, heterocyclyl, aryl and heteroaryl, wherein the alkyl, alkenyl, alkynyl, cycloalkyl, heterocyclyl, aryl and heteroaryl are optionally further substituted by one or more substituent(s) selected from the group consisting of halogen, amino, nitro, cyano, oxo, hydroxy, thiol, carboxy, alkoxycarbonyl, alkyl, alkoxy, alkenyl, alkynyl, cycloalkyl, heterocyclyl, aryl and heteroaryl;

or, $R^c$ and $R^d$ together with the nitrogen atom to which they are attached form a nitrogen-containing heterocyclyl, the nitrogen-containing heterocyclyl optionally comprises one or more heteroatom(s) selected from the group consisting of N, O and S in addition to N, the nitrogen-containing heterocyclyl is optionally further substituted by one or more substituent(s) selected from the group consisting of halogen, amino, nitro, cyano, oxo, hydroxy, thiol, carboxy, alkoxycarbonyl, alkyl, alkoxy, alkenyl, alkynyl, cycloalkyl, heterocyclyl, aryl and heteroaryl;

p is 1 or 2;

q is an integer from 0 to 6;

provided that $R^1$, $R^2$, $R^3$, $R^4$ and $R^5$ are not hydrogen at the same time.

In some preferred embodiments, $R^1$ is selected from the group consisting of hydrogen, halogen, cyano, alkyl, alkoxy, alkenyl, alkynyl, cycloalkyl, heterocyclyl, aryl, heteroaryl, —$NR^aR^b$, —$OR^a$, —$SR^a$, —$C(O)R^a$, —$C(O)OR^a$, —$C(O)NR^aR^b$, —$N(R^b)C(O)R^a$, —$S(O)_pR^a$, —$S(O)_pNR^aR^b$ and —$N(R^b)S(O)_pR^a$, wherein the alkyl, alkenyl, alkynyl, cycloalkyl, heterocyclyl, aryl and heteroaryl are optionally further substituted by one or more substituent(s) selected from Q;

$R^a$ and $R^b$ are each independently selected from the group consisting of hydrogen, alkyl and cycloalkyl;

or, $R^a$ and $R^b$ together with the nitrogen atom to which they are attached form a nitrogen-containing heterocyclyl, the nitrogen-containing heterocyclyl optionally comprises one or more heteroatom(s) selected from the group consisting of N, O and S in addition to N, the nitrogen-containing heterocyclyl is optionally further substituted by one or more substituent(s) selected from Q;

Q is halogen, oxo, alkyl, —$NR^cR^d$, —$OR^c$, —$SR^c$, —$C(O)R^c$, —$C(O)OR^c$, —$C(O)NR^cR^d$, —$C(O)N(R^c)(CH_2)_qR^d$, —$S(O)_pR^c$ or —$S(O)_pNR^cR^d$, wherein the alkyl is optionally further substituted by one or more substituent(s) selected from halogen;

$R^c$ and $R^d$ are each independently selected from the group consisting of hydrogen, alkyl, aryl and heteroaryl, wherein the alkyl, aryl and heteroaryl are optionally further substituted by one or more substituent(s) selected from the group consisting of halogen, amino, nitro, cyano, oxo, hydroxy, thiol, carboxy, alkoxycarbonyl, alkyl, alkoxy, alkenyl, alkynyl, cycloalkyl, heterocyclyl, aryl and heteroaryl;

or, $R^c$ and $R^d$ together with the nitrogen atom to which they are attached form a nitrogen-containing heterocyclyl, the nitrogen-containing heterocyclyl optionally comprises one or more heteroatom(s) selected from the group consisting of N, O and S in addition to N, the nitrogen-containing heterocyclyl is optionally further substituted by one or more substituent(s) selected from the group consisting of halogen, amino, nitro, cyano, oxo, hydroxy, thiol, carboxy, alkoxycarbonyl, alkyl, alkoxy, alkenyl, alkynyl, cycloalkyl, heterocyclyl, aryl and heteroaryl;

p is 1 or 2;

q is an integer from 0 to 6.

In other preferred embodiments, $R^1$ is selected from the group consisting of hydrogen, halogen, cyano, $C_1$-$C_6$ alkyl, $C_1$-$C_6$ alkoxy, $C_2$-$C_6$ alkenyl and $C_2$-$C_6$ alkynyl, wherein the $C_1$-$C_6$ alkyl, $C_1$-$C_6$ alkoxy, $C_2$-$C_6$ alkenyl and $C_2$-$C_6$ alkynyl are optionally further substituted by one or more substituent(s) selected from halogen.

In other preferred embodiments, $R^1$ is selected from —$NR^aR^b$;

$R^a$ and $R^b$ are each independently selected from the group consisting of hydrogen and $C_1$-$C_6$ alkyl;

or, $R^a$ and $R^b$ together with the nitrogen atom to which they are attached form a 5- to 7-membered nitrogen-containing heterocyclyl, the 5- to 7-membered nitrogen-containing heterocyclyl optionally comprises one or more heteroatom(s) selected from the group consisting of N, O and S in addition to N, preferably, the nitrogen-containing heterocyclyl is selected from the group consisting of

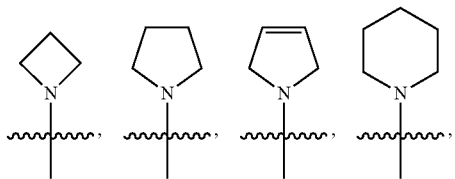

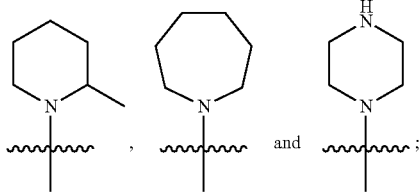

and the 5- to 7-membered nitrogen-containing heterocyclyl is optionally further substituted by one or more substituent(s) selected from Q;

Q is halogen, oxo, $C_1$-$C_6$ alkyl, —C(O)$R^c$, —C(O)O$R^c$, —C(O)N$R^c R^d$, —C(O)N($R^c$)(CH$_2$)$_q R^d$ or —S(O)$_p R^c$;

$R^c$ and $R^d$ are each independently selected from the group consisting of hydrogen and $C_1$-$C_6$ alkyl, wherein the $C_1$-$C_6$ alkyl is optionally further substituted by one or more substituent(s) selected from halogen;

or, $R^c$ and $R^d$ together with the nitrogen atom to which they are attached form a 5- to 7-membered nitrogen-containing heterocyclyl, the 5- to 7-membered nitrogen-containing heterocyclyl optionally comprises one or more heteroatom(s) selected from the group consisting of N, O and S in addition to N, the 5- to 7-membered nitrogen-containing heterocyclyl is optionally further substituted by one or more substituent(s) selected from the group consisting of halogen and $C_1$-$C_6$ alkyl;

p is 1 or 2;

q is an integer from 0 to 6.

In other preferred embodiments, $R^1$ is selected from $C_3$-$C_{10}$ cycloalkyl, preferably $C_3$-$C_6$ cycloalkyl, and more preferably cyclopropyl, cyclopentyl and cyclohexyl, wherein the cycloalkyl is optionally further substituted by one or more substituent(s) selected from the group consisting of halogen and $C_1$-$C_6$ alkyl.

In other preferred embodiments, $R^1$ is selected from the group consisting of $C_6$-$C_{10}$ aryl, preferably phenyl, and 5- to 10-membered heteroaryl, preferably pyridyl, wherein the $C_6$-$C_{10}$ aryl and 5- to 10-membered heteroaryl are optionally further substituted by one or more substituent(s) selected from the group consisting of halogen and $C_1$-$C_6$ alkyl.

In other preferred embodiments, $R^1$ is selected from $C_2$-$C_6$ alkenyl, wherein the $C_2$-$C_6$ alkenyl is optionally further substituted by one or more substituent(s) selected from the group consisting of —C(O)O$R^c$, —C(O)N$R^c R^d$, —C(O)N($R^c$)(CH$_2$)$_q R^d$, —S(O)$_p R^c$ and —S(O)$_p$N$R^c R^d$, and preferably substituted by one or more substituent(s) selected from the group consisting of —C(O)O$R^c$ and —C(O)N$R^c R^d$;

$R^c$ and $R^d$ are each independently selected from the group consisting of hydrogen, $C_1$-$C_6$ alkyl and $C_6$-$C_{10}$ aryl (preferably phenyl), wherein the $C_1$-$C_6$ alkyl and $C_6$-$C_{10}$ aryl are optionally further substituted by one or more substituent(s) selected from the group consisting of halogen, $C_1$-$C_6$ alkyl and $C_1$-$C_6$ alkoxy;

or, $R^c$ and $R^d$ together with the nitrogen atom to which they are attached form a 5- to 7-membered nitrogen-containing heterocyclyl, and preferably morpholinyl, the 5- to 7-membered nitrogen-containing heterocyclyl optionally comprises one or more heteroatom(s) selected from the group consisting of N, O and S in addition to N, the 5- to 7-membered nitrogen-containing heterocyclyl is optionally further substituted by one or more substituent(s) selected from the group consisting of halogen and $C_1$-$C_6$ alkyl;

p is 1 or 2;

q is an integer from 0 to 6, and preferably an integer from 1 to 4.

In other preferred embodiments, $R^1$ is selected from the group consisting of —C(O)$R^a$, —C(O)O$R^a$, —C(O)N$R^a R^b$, —S(O)$_p R^a$ and —S(O)$_p$N$R^a R^b$;

$R^a$ and $R^b$ are each independently selected from the group consisting of hydrogen and $C_1$-$C_6$ alkyl;

or, $R^a$ and $R^b$ together with the nitrogen atom to which they are attached form a 5- to 7-membered nitrogen-containing heterocyclyl, the 5- to 7-membered nitrogen-containing heterocyclyl optionally comprises one or more heteroatom(s) selected from the group consisting of N, O and S in addition to N, the 5- to 7-membered nitrogen-containing heterocyclyl is optionally further substituted by one or more substituent(s) selected from the group consisting of halogen and $C_1$-$C_6$ alkyl;

p is 1 or 2.

In other preferred embodiments, $R^2$ is selected from the group consisting of hydrogen, halogen, $C_1$-$C_6$ cycloalkyl and $C_1$-$C_6$ alkyl; and $R^3$ is selected from the group consisting of hydrogen, halogen and $C_1$-$C_6$ alkyl.

In other preferred embodiments, $R^4$ is selected from the group consisting of hydrogen, halogen, $C_1$-$C_6$ alkyl, —C(O)O$R^a$ and —C(O)N$R^a R^b$, wherein $R^a$ and $R^b$ are each independently selected from the group consisting of hydrogen, $C_1$-$C_6$ alkyl, $C_3$-$C_6$ cycloalkyl and $C_3$-$C_6$ cycloalkyl-$C_1$-$C_6$ alkyl; and $R^5$ is selected from the group consisting of hydrogen, halogen and $C_1$-$C_6$ alkyl.

The present invention also provides a compound of formula (I), or a mesomer thereof, or a tautomer thereof, a stereoisomer thereof, a enantiomer thereof, a diastereoisomer thereof, or an isotopic derivative thereof, or a pharmaceutically acceptable salt of any of the foregoing, or a crystal form or solvate of any of the foregoing, or a prodrug or metabolite of any of the foregoing, or a racemate containing the same, or a mixture containing the same, wherein the expression "thereof" refers to the compound of formula (I),

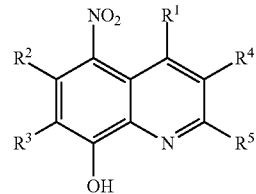

(I)

wherein:

$R^2$ is selected from the group consisting of hydrogen, halogen, alkyl and cycloalkyl;

$R^3$ is selected from the group consisting of hydrogen, halogen and alkyl;

$R^4$ is selected from the group consisting of hydrogen, halogen, alkyl, —C(O)O$R^a$ and —C(O)N$R^a R^b$, wherein $R^a$ and $R^b$ are each independently selected from the group consisting of hydrogen, $C_1$-$C_6$ alkyl, $C_3$-$C_6$ cycloalkyl and $C_3$-$C_6$ cycloalkyl-$C_1$-$C_6$ alkyl;

$R^5$ is selected from the group consisting of hydrogen, halogen and alkyl;

$R^a$ and $R^b$ are each independently selected from the group consisting of hydrogen, alkyl and cycloalkyl;

Q is halogen, alkyl, oxo, —C(O)$R^c$, —C(O)O$R^c$, —C(O)N$R^c R^d$ or —C(O)N($R^c$)(CH$_2$)$_q R^d$;

$R^c$ and $R^d$ are each independently selected from the group consisting of hydrogen, alkyl, aryl and heteroaryl, wherein the alkyl, aryl and heteroaryl are optionally further substituted by alkoxy;

or, $R^c$ and $R^d$ together with the nitrogen atom to which they are attached form a nitrogen-containing heterocyclyl, the nitrogen-containing heterocyclyl optionally comprises one or more heteroatom(s) selected from the group consisting of N and O in addition to N;

p is 1 or 2;

q is an integer from 0 to 6;

provided that $R^1$, $R^2$, $R^3$, $R^4$ and $R^5$ are not hydrogen at the same time.

In some embodiments of the present invention, $R^1$ is as defined above, and the halogen is preferably chlorine or fluorine.

In other embodiments of the present invention, $R^1$ is as defined above, and the alkyl is preferably a $C_1$-$C_6$ alkyl, more preferably a $C_1$-$C_6$ alkyl substituted by halogen, further more preferably —$CF_3$, —$CHF_2$ or —$CH_2F$, and still more preferably —$CF_3$.

In other embodiments of the present invention, $R^1$ is as defined above, preferably, the alkenyl is a $C_2$-$C_6$ alkenyl; more preferably, the $C_2$-$C_6$ alkenyl is an alkenyl substituted by one or more substituent(s) selected from Q, Q is —C(O)$R^c$, —C(O)O$R^c$, —C(O)N$R^c R^d$ and —C(O)N($R^c$)(CH$_2$)$_q R^d$, $R^c$ and $R^d$ are as defined above; and further more preferably, the $C_2$-$C_6$ alkenyl is —CH═CH—COOH,

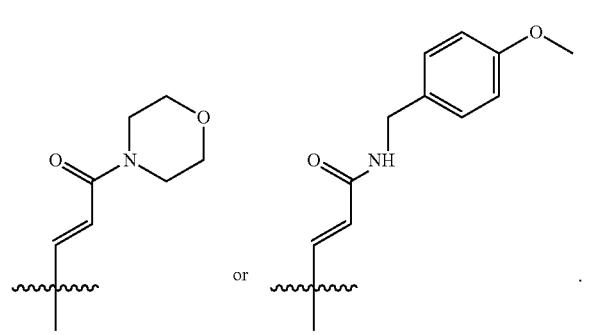 [SMILES: */C=C/C(=O)N1CCOCC1 ; */C=C/C(=O)NCc1ccc(OC)cc1]

In other embodiments of the present invention, $R^1$ is as defined above, the cycloalkyl is preferably a $C_3$-$C_{10}$ cycloalkyl, more preferably a $C_3$-$C_6$ cycloalkyl, and further more preferably an unsubstituted $C_3$-$C_6$ cycloalkyl, for example, unsubstituted cyclopropyl, unsubstituted cyclopentyl or unsubstituted cyclohexyl.

In other embodiments of the present invention, $R^1$ is as defined above, and preferably, the heterocyclyl is a $C_4$-$C_7$ heterocyclyl. More preferably, the $C_4$-$C_7$ heterocyclyl is a $C_4$-$C_7$ nitrogen-containing heterocyclyl. Further more preferably, the $C_4$-$C_7$ heterocyclyl is —N$R^e R^f$, $R^e$ and $R^f$ together with the nitrogen atom to which they are attached form a nitrogen-containing heterocyclyl, the nitrogen-containing heterocyclyl optionally comprises one or more heteroatom(s) selected from the group consisting of N and O in addition to N, the nitrogen-containing heterocyclyl is optionally further substituted by one or more substituent(s) selected from Q, Q is a $C_1$-$C_6$ alkyl, oxo or $C_1$-$C_6$ alkoxycarbonyl; wherein the $C_1$-$C_6$ alkyl is preferably methyl, and the $C_1$-$C_6$ alkoxycarbonyl is preferably —C(O)OCH$_2$CH$_3$. Further more preferably, the $C_4$-$C_7$ heterocyclyl is

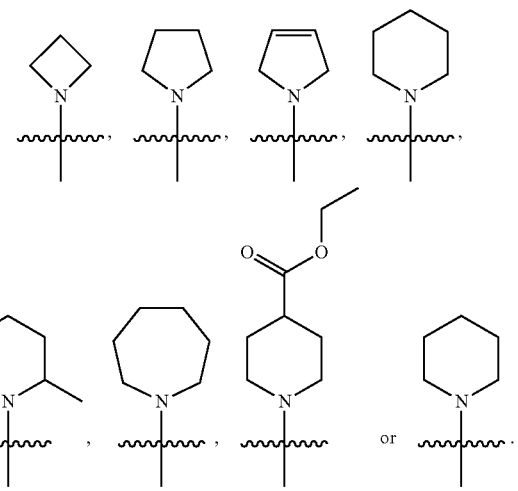

In other embodiments of the present invention, $R^1$ is as defined above, and the aryl is preferably a $C_6$-$C_{10}$ aryl, and more preferably an unsubstituted phenyl.

In other embodiments of the present invention, $R^1$ is as defined above, and the heteroaryl is preferably a 5- to 10-membered heteroaryl, more preferably pyridyl, pyrazolyl or imidazolyl unsubstituted or substituted by $C_1$-$C_6$ alkyl, and more preferably

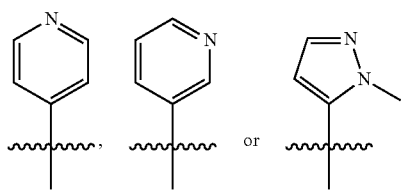

In other embodiments of the present invention, $R^1$ is as defined above, $R^g$ in —C(O)O$R^c$ is $C_1$-$C_6$ alkyl; and more preferably —C(O)O$R^c$ is —C(O)OCH$_2$CH$_3$.

In other embodiments of the present invention, $R^1$ is as defined above, and —N$R^a R^b$ is preferably —NH$_2$ or —N(CH$_3$)$_2$.

In other embodiments of the present invention, $R^1$ is as defined above, and —O$R^a$ is preferably —OCH$_3$.

In other embodiments of the present invention, $R^1$ is as defined above, and —S(O)$_p R^a$ is preferably —S(O)$_2$CH$_3$.

In some preferred embodiments of the present invention, $R^1$ is selected from the group consisting of halogen, cycloalkyl, heterocyclyl, aryl, heteroaryl and —O$R^a$, and the groups are as defined above; preferably, $R^1$ is selected from the group consisting of chlorine,

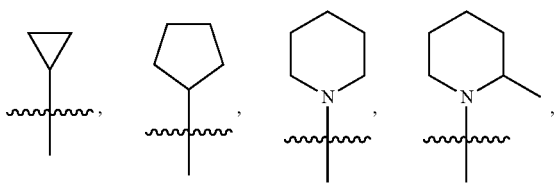

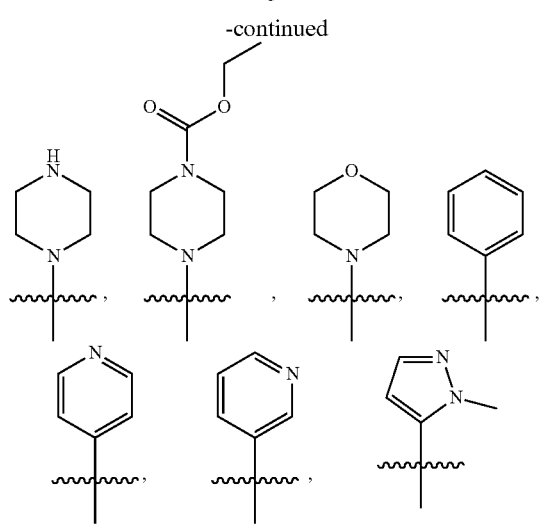

and —OCH$_3$; and more preferably, R$^2$, R$^3$, R$^4$ and R$^5$ are hydrogen.

The compounds of the above embodiments have an IC$_{50}$ lower than that of nitroxoline for at least one selected from the group consisting of endothelial cell line, bladder cancer cell line, prostate cancer cell line and mouse prostate cancer cell line.

In other preferred embodiments of the present invention, R$^1$ is selected from the group consisting of halogen, cycloalkyl, heterocyclyl and aryl, and the groups are as defined above; preferably, R$^1$ is selected from the group consisting of chlorine,

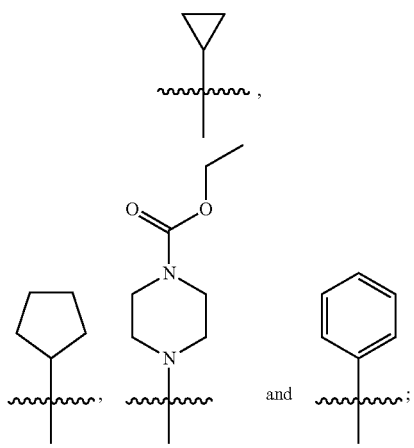

and more preferably, R$^2$, R$^3$, R$^4$ and R$^5$ are hydrogen. The compound of the above technical solution has an IC$_{50}$ lower than that of nitroxoline for endothelial cell line, bladder cancer cell line, prostate cancer cell line and mouse prostate cancer cell line.

In other embodiments of the present invention, R$^2$ is as defined above, and the halogen is preferably fluorine or chlorine.

In other embodiments of the present invention, R$^2$ is as defined above, and the alkyl is preferably a C$_1$-C$_6$ alkyl, and more preferably methyl.

In other embodiments of the present invention, R$^2$ is as defined above, and the cycloalkyl is a C$_1$-C$_6$ cycloalkyl, and preferably cyclopropyl.

In other embodiments of the present invention, R$^3$ is as defined above, and the halogen is preferably fluorine or chlorine.

In other embodiments of the present invention, R$^3$ is as defined above, and the alkyl is preferably a C$_1$-C$_6$ alkyl, and more preferably methyl.

In other preferred embodiments of the present invention, R$^2$ and R$^3$ are hydrogen.

In other embodiments of the present invention, R$^4$ is as defined above, and the halogen is preferably fluorine or chlorine.

In other embodiments of the present invention, R$^4$ is as defined above, and the alkyl is preferably a C$_1$-C$_6$ alkyl, and more preferably methyl.

In other embodiments of the present invention, R$^4$ is as defined above, R$^a$ in —C(O)OR$^a$ is an alkyl or cycloalkyl, the alkyl is a C$_1$-C$_6$ alkyl, preferably ethyl, the cycloalkyl is a C$_1$-C$_6$ cycloalkyl, and preferably methylcyclopropyl or cyclohexyl.

In other embodiments of the present invention, R$^4$ is as defined above, R$^a$ and R$^b$ in —C(O)NR$^c$R$^b$ are each independently an alkyl, the alkyl is a C$_1$-C$_6$ alkyl, and preferably ethyl, methyl, isopropyl.

In other embodiments of the present invention, R$^5$ is as defined above, and the halogen is preferably fluorine or chlorine.

In other embodiments of the present invention, R$^5$ is as defined above, and the alkyl is preferably a C$_1$-C$_6$ alkyl, and more preferably methyl.

In other preferred embodiments of the present invention, R$^4$ and R$^5$ are hydrogen.

Typical compounds of the present invention include, but are not limited to the following compounds:

| Example No. | Structure and name |
|---|---|
| 1 | 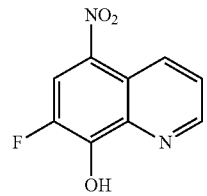<br>7-Fluoro-5-nitroquinolin-8-ol |
| 2 | 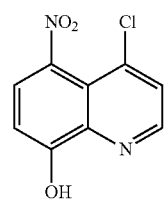<br>4-Chloro-5-nitroquinolin-8-ol |

| Example No. | Structure and name |
|---|---|
| 3 | 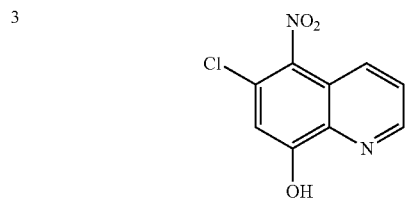
6-Chloro-5-nitroquinolin-8-ol |
| 4 | 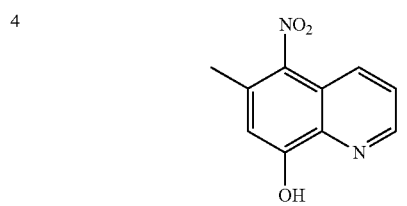
6-Methyl-5-nitroquinolin-8-ol |
| 5 | 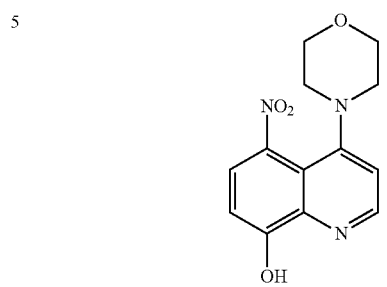
4-Morpholino-5-nitroquinolin-8-ol |
| 6 | 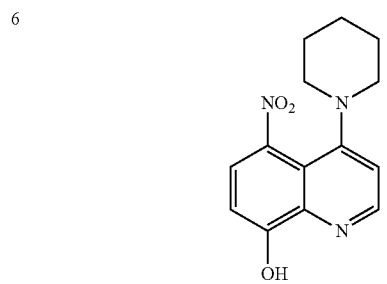
5-Nitro-4-(piperidin-1-yl)quinolin-8-ol |
| 7 | 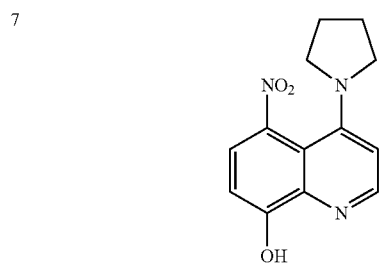
5-Nitro-4-(pyrrolidin-1-yl)quinolin-8-ol |
| 8 | 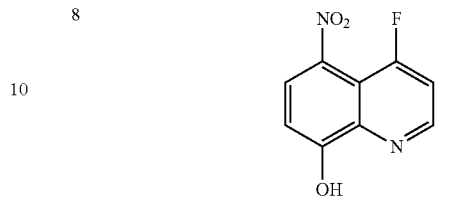
4-Fluoro-5-nitroquinolin-8-ol |
| 9 | 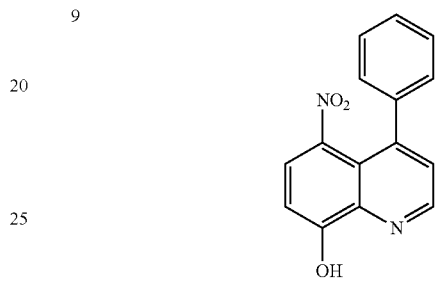
5-Nitro-4-phenylquinolin-8-ol |
| 10 | 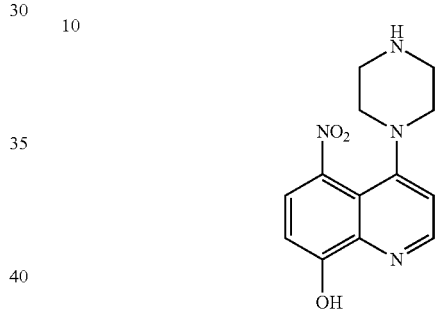
5-Nitro-4-(piperazin-1-yl)quinolin-8-ol |
| 11 | 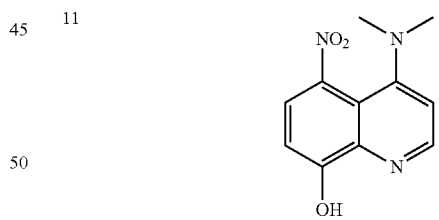
4-(Dimethylamino)-5-nitroquinolin-8-ol |
| 12 | 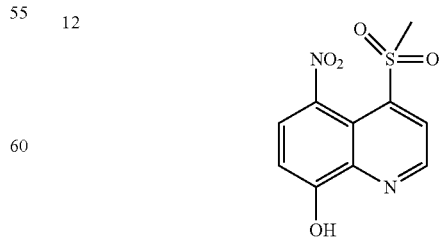
4-(Methylsulfonyl)-5-nitroquinolin-8-ol |

| Example No. | Structure and name |
|---|---|
| 13 | 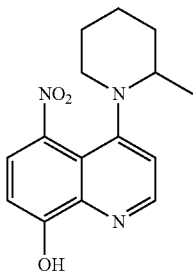<br>4-(2-Methylpiperidin-1-yl)-5-nitroquinolin-8-ol |
| 14 | 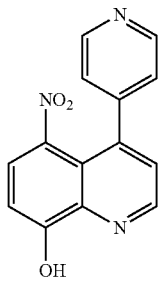<br>5-Nitro-4-(pyridin-4-yl)quinolin-8-ol |
| 15 | 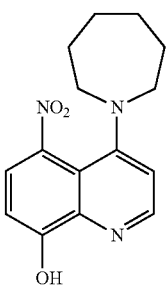<br>4-(Azepan-1-yl)-5-nitroquinolin-8-ol |
| 16 | 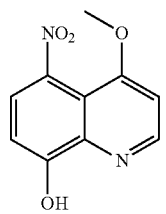<br>4-Methoxy-5-nitroquinolin-8-ol |
| 17 | 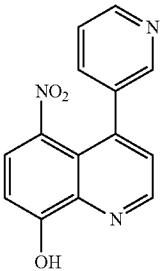<br>5-Nitro-4-(pyridin-3-yl)quinolin-8-ol |
| 18 | 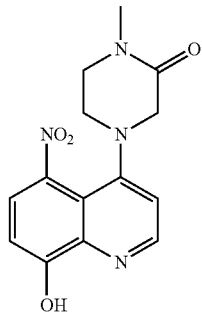<br>4-(8-Hydroxy-5-nitroquinolin-4-yl)-1-methylpiperazin-2-one |
| 19 | 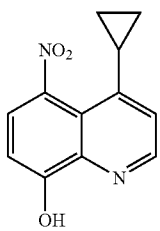<br>4-Cyclopropyl-5-nitroquinolin-8-ol |
| 20 | 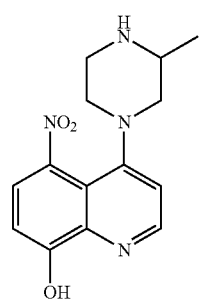<br>4-(3-Methylpiperazin-1-yl)-5-nitroquinolin-8-ol |

| Example No. | Structure and name |
|---|---|
| 21 | 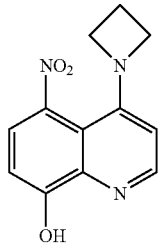<br>4-(Azetidin-1-yl)-5-nitroquinolin-8-ol |
| 22 | 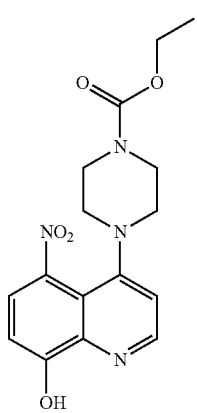<br>Ethyl 4-(8-hydroxy-5-nitroquinolin-4-yl)piperazine-1-carboxylate |
| 23 | 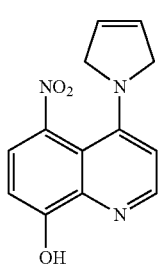<br>4-(2,5-Dihydro-1H-pyrrol-1-yl)-5-nitroquinolin-8-ol |
| 24 | 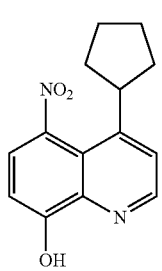<br>4-Cyclopentyl-5-nitroquinolin-8-ol |
| 25 | 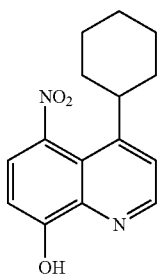<br>4-Cyclohexyl-5-nitroquinoliln-8-ol |
| 26 | 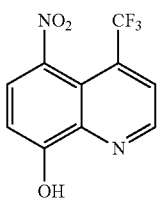<br>5-Nitro-4-(trifluoromethyl)quinolin-8-ol |
| 27 | 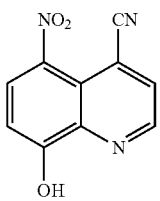<br>4-Cyano-5-nitroquinolin-8-ol |
| 28 | 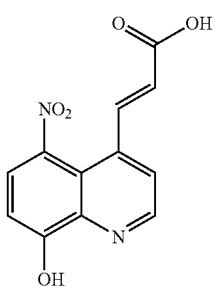<br>3-(8-Hydroxy-5-nitroquinolin-4-yl)acrylic acid |

| Example No. | Structure and name |
|---|---|
| 29 | 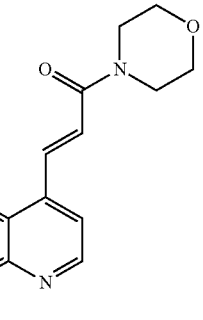<br>3-(8-Hydroxy-5-nitroquinolin-4-yl)-N-acryloylmorpholine |
| 30 | 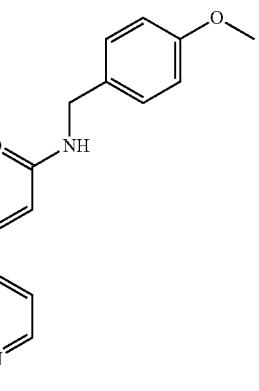<br>3-(8-Hydroxy-5-nitroquinolin-4-yl)-N-(4-methoxybenzyl)acrylamide |
| 31 | 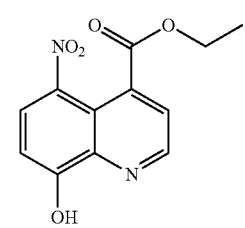<br>Ethyl 8-hydroxy-5-nitroquinoline-4-carboxylate |
| 32 | 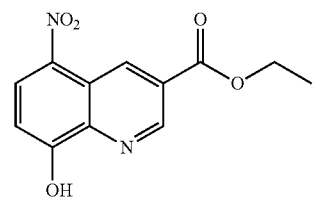<br>Ethyl 8-hydroxy-5-nitroquinoline-3-carboxylate |
| 33 | 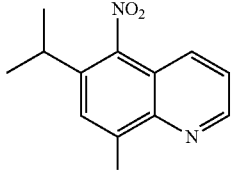<br>8-Hydroxy-6-isopropyl-5-nitroquinoline |
| 34 | 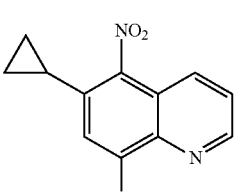<br>8-Hydroxy-6-cyclopropyl-5-nitroquinoline |
| 35 | 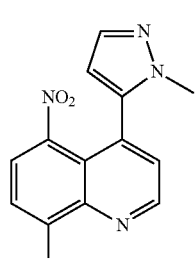<br>8-Hydroxy-4-(1-methyl-1H-pyrazol-5-yl)-5-nitroquinoline |
| 36 | 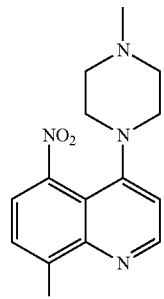<br>8-Hydroxy-4-(4-methylpiperazinyl)-5-nitroquinoline |

| Example No. | Structure and name |
|---|---|
| 37 | 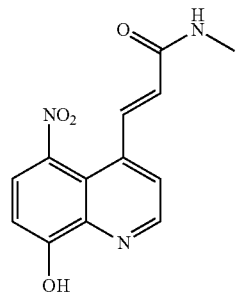<br>3-(8-Hydroxy-5-nitroquinolin-4-yl)-N-methylacrylamide |
| 38 | 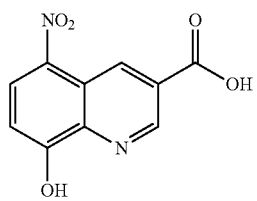<br>8-Hydroxy-5-nitroquinoline-3-carboxylic acid |
| 39 | 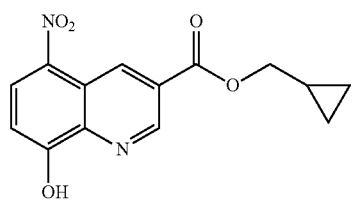<br>Cyclopropylmethyl 8-hydroxy-5-nitroquinoline-3-carboxylate |
| 40 | 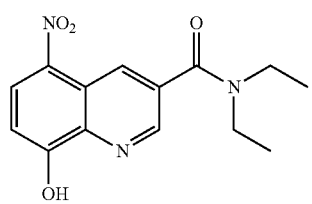<br>N,N-Diethyl-8-hydroxy-5-nitroquinoline-3-carboxamide |
| 41 | 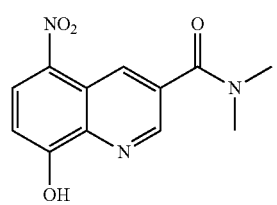<br>N,N-Dimethyl-8-hydroxy-5-nitroquinoline-3-carboxamide |
| 42 | 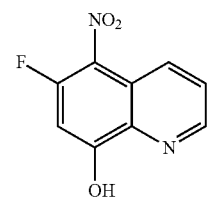<br>8-Hydroxy-6-fluoro-5-nitroquinoline |
| 43 | 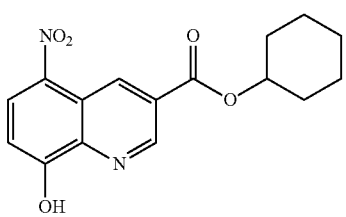<br>Cyclohexyl 8-hydroxy-5-nitroquinoline-3-carboxylate |
| 44 | 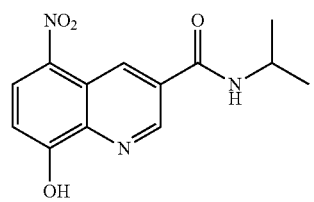<br>N-Isopropyl-8-hydroxy-5-nitroquinoline-3-carboxamide | or a tautomer, mesomer, racemate, enantiomer, diastereomer thereof, or a mixture thereof, or a pharmaceutically acceptable salt thereof.

The present invention further provides a method for preparing the compound of formula (I), or a mesomer thereof, or a tautomer thereof, a stereoisomer thereof, a enantiomer thereof, a diastereoisomer thereof, or an isotopic derivative thereof, or a pharmaceutically acceptable salt of any of the foregoing, or a crystal form or solvate of any of the foregoing, or a prodrug or metabolite of any of the foregoing, or a racemate containing the same, or a mixture containing the same of the present invention, comprising the following step of:

when $R^1$ is $—NR^aR^b$,

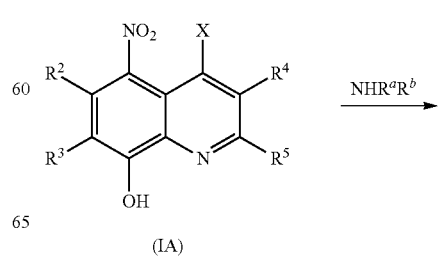

(IA)

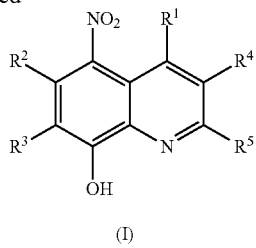

(I)

reacting a compound of formula (IA) with an amine compound $NHR^aR^b$ under a heating condition in a solvent to obtain the compound of formula (I); wherein the solvent is preferably DMF, and the heating condition is preferably from 100° C. to the reflux temperature of the solvent, wherein, X is selected from halogen, and preferably chlorine and bromine;

$R^a$ and $R^b$ are each independently selected from the group consisting of hydrogen and $C_1$-$C_6$ alkyl;

or, $R^a$ and $R^b$ together with the nitrogen atom to which they are attached form a 5- to 7-membered nitrogen-containing heterocyclyl, the 5- to 7-membered nitrogen-containing heterocyclyl optionally comprises one or more heteroatom(s) selected from the group consisting of N, O and S in addition to N, preferably, the heterocyclyl is selected from the group consisting of

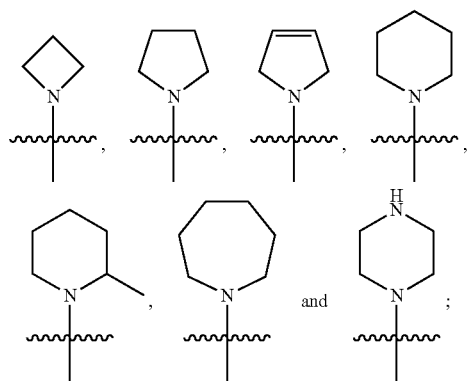

and the 5- to 7-membered nitrogen-containing heterocyclyl is optionally further substituted by one or more substituent(s) selected from Q;

Q is halogen, oxo, $C_1$-$C_6$ alkyl, —C(O)$R^c$, —C(O)O$R^c$, —C(O)N$R^cR^d$, —C(O)N($R^c$)(CH$_2$)$_q R^d$ or —S(O)$_p R^c$;

$R^c$ and $R^d$ are each independently selected from the group consisting of hydrogen and $C_1$-$C_6$ alkyl, wherein the $C_1$-$C_6$ alkyl is optionally further substituted by one or more substituent(s) selected from halogen;

or, $R^c$ and $R^d$ together with the nitrogen atom to which they are attached form a 5- to 7-membered nitrogen-containing heterocyclyl, the 5- to 7-membered nitrogen-containing heterocyclyl optionally comprises one or more heteroatom(s) selected from the group consisting of N, O and S in addition to N, the 5- to 7-membered nitrogen-containing heterocyclyl is optionally further substituted by one or more substituent(s) selected from the group consisting of halogen and $C_1$-$C_6$ alkyl;

p is 1 or 2;

q is an integer from 0 to 6;

$R^2$, $R^3$, $R^4$ and $R^5$ are as defined above.

The present invention further provides a method for preparing the compound of formula (I), or a mesomer thereof, or a tautomer thereof, a stereoisomer thereof, a enantiomer thereof, a diastereoisomer thereof, or an isotopic derivative thereof, or a pharmaceutically acceptable salt of any of the foregoing, or a crystal form or solvate of any of the foregoing, or a prodrug or metabolite of any of the foregoing, or a racemate containing the same, or a mixture containing the same of the present invention, comprising the following steps of:

when $R^1$ is a $C_3$-$C_{10}$ cycloalkyl, $C_6$-$C_{10}$ aryl or 5- to 10-membered heteroaryl,

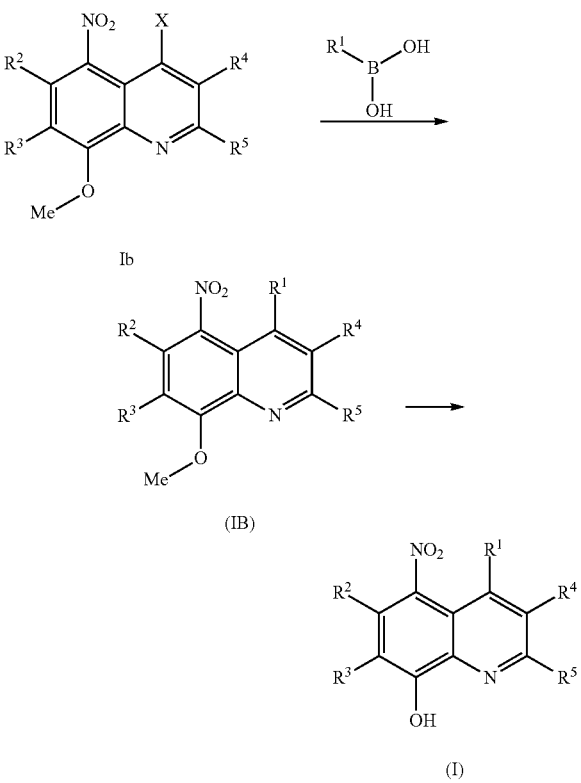

reacting compound Ib with a boronic acid compound $R^1$—B(OH)$_2$ in the presence of a catalyst and an alkali to obtain a compound of formula (IB); wherein the catalyst is preferably tetrakistriphenylphosphine palladium, and the alkali is preferably potassium carbonate; and then, subjecting the compound of formula (IB) to a demethylation reaction under a heating condition in a solvent in the presence of a demethylation reagent to obtain the compound of formula (I); wherein the solvent is preferably DMF, the demethylation reagent is preferably LiCl, and the heating condition is preferably the reflux temperature of the solvent;

wherein X is selected from halogen, and preferably chlorine and bromine;

$R^2$, $R^3$, $R^4$ and $R^5$ are as defined above.

The present invention further provides a method for preparing the compound of formula (I), or a mesomer thereof, or a tautomer thereof, a stereoisomer thereof, a enantiomer thereof, a diastereoisomer thereof, or an isotopic derivative thereof, or a pharmaceutically acceptable salt of any of the foregoing, or a crystal form or solvate of any of the foregoing, or a prodrug or metabolite of any of the foregoing, or a racemate containing the same, or a mixture containing the same of the present invention, comprising the following step of:

when Rt is —C(O)OR$^a$ or —S(O)$_p$R$^a$,

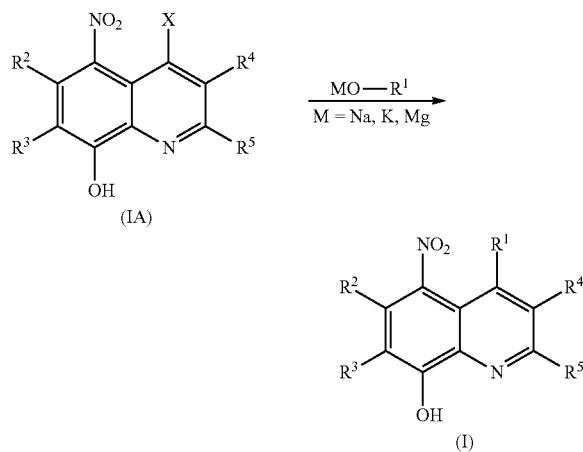

reacting a compound of formula (IA) with compound MO-R$^1$ in a solvent under a heating condition to obtain the compound of formula (I); wherein M is an alkali metal, such as Na, K or Mg; the solvent is preferably DMF, and the heating condition is preferably from 100° C. to the reflux temperature of the solvent;
wherein,
X is selected from halogen, and preferably chlorine and bromine;
R$^a$ is selected from the group consisting of hydrogen and C$_1$-C$_6$ alkyl;
p is 1 or 2;
R$^2$, R$^3$, R$^4$ and R$^5$ are as defined above.

The present invention also provides a pharmaceutical composition comprising a therapeutically effective amount of the compound of formula (I), or a mesomer thereof, or a tautomer thereof, a stereoisomer thereof, a enantiomer thereof, a diastereoisomer thereof, or an isotopic derivative thereof, or a pharmaceutically acceptable salt of any of the foregoing, or a crystal form or solvate of any of the foregoing, or a prodrug or metabolite of any of the foregoing, or a racemate containing the same, or a mixture containing the same according to the present invention and a pharmaceutically acceptable carrier; wherein the expression "thereof" refers to the compound of formula (I).

The present invention also provides a use of the compound of formula (I), or a mesomer thereof, or a tautomer thereof, a stereoisomer thereof, a enantiomer thereof, a diastereoisomer thereof, or an isotopic derivative thereof, or a pharmaceutically acceptable salt of any of the foregoing, or a crystal form or solvate of any of the foregoing, or a prodrug or metabolite of any of the foregoing, or a racemate containing the same, or a mixture containing the same, or the above pharmaceutical composition according to the present invention in the preparation of a medicament for treating infectious disease or cancer, wherein the infectious disease is a systemic infection, reproductive system infection or urinary system infection, preferably the infectious disease is an urinary system infection, more preferably the infectious disease is an infection caused by Gram-negative bacteria and/or Gram-positive bacteria, the Gram-negative bacteria include *Escherichia coli* and *Acinetobacter baumannii*, the Gram-positive bacteria include *Staphylococcus aureus*, and the cancer is preferably bladder cancer.

The present invention also provides the compound of formula (I), or a mesomer thereof, or a tautomer thereof, a stereoisomer thereof, a enantiomer thereof, a diastereoisomer thereof, or an isotopic derivative thereof, or a pharmaceutically acceptable salt of any of the foregoing, or a crystal form or solvate of any of the foregoing, or a prodrug or metabolite of any of the foregoing, or a racemate containing the same, or a mixture containing the same, or the above pharmaceutical composition according to the present invention for use in treating infectious disease or cancer, wherein the infectious disease is a systemic infection, reproductive system infection or urinary system infection, preferably the infectious disease is an urinary system infection, more preferably the infectious disease is an infection caused by Gram-negative bacteria and/or Gram-positive bacteria, the Gram-negative bacteria include *Escherichia coli* and *Acinetobacter baumannii*, the Gram-positive bacteria include *Staphylococcus aureus*, and the cancer is preferably bladder cancer.

The present invention also provides a method for treating infectious disease or cancer in a patient comprising a step of administering a therapeutically effective amount of the compound of formula (I), or a mesomer thereof, or a tautomer thereof, a stereoisomer thereof, a enantiomer thereof, a diastereoisomer thereof, or an isotopic derivative thereof, or a pharmaceutically acceptable salt of any of the foregoing, or a crystal form or solvate of any of the foregoing, or a prodrug or metabolite of any of the foregoing, or a racemate containing the same, or a mixture containing the same, or the above pharmaceutical composition according to the present invention to the patient in need thereof; wherein the infectious disease is a systemic infection, reproductive system infection or urinary system infection, preferably the infectious disease is an urinary system infection, more preferably the infectious disease is an infection caused by Gram-negative bacteria and/or Gram-positive bacteria, the Gram-negative bacteria include *Escherichia coli* and *Acinetobacter baumannii*, the Gram-positive bacteria include *Staphylococcus aureus*, and the cancer is preferably bladder cancer.

According to conventional methods in the field of the present invention, the compound of formula (I) of the present invention can form a pharmaceutically acceptable base addition salt or acid addition salt with an alkali or an acid. The alkali includes inorganic alkali and organic alkali. Acceptable organic alkali includes diethanolamine, ethanolamine, N-methylglucamine, triethanolamine, tromethamine, and the like. Acceptable inorganic alkali includes aluminum hydroxide, calcium hydroxide, potassium hydroxide, sodium carbonate, sodium hydroxide, and the like. The acid includes inorganic acid and organic acid. Acceptable inorganic acid includes hydrochloric acid, sulfuric acid, nitric acid, phosphoric acid, hydrobromic acid, and the like. Acceptable organic acid includes acetic acid, trifluoroacetic acid, formic acid, ascorbic acid, and the like.

The pharmaceutical composition containing the active ingredient can be in a form suitable for oral administration, for example, a tablet, troche, lozenge, aqueous or oily suspension, dispersible powder or granule, emulsion, hard or soft capsule, syrup or elixir. An oral composition can be prepared according to any known method in the art for the preparation of pharmaceutical composition. Such composition can contain one or more ingredients selected from the group consisting of sweeteners, flavoring agents, colorants and preservatives, in order to provide a pleasing and palatable pharmaceutical formulation. The tablet contains the active ingredient in admixture with nontoxic, pharmaceutically acceptable excipients suitable for the preparation of tablets. These excipients can be inert excipients, such as calcium carbonate, sodium carbonate, lactose, calcium phosphate or sodium phosphate; granulating and disintegrating agents, such as microcrystalline cellulose, cross-linked sodium carboxymethyl cellulose, corn starch or alginic acid; binders, such as starch, gelatin, polyvinylpyrrolidone or acacia; and lubricants, such as magnesium stearate, stearic acid or talc. The tablet can be uncoated or coated by means of known techniques, which can mask drug taste or delay the disintegration and absorption of the active ingredient in the gastrointestinal tract, thereby providing sustained release over an extended period. For example, a water-soluble taste masking material can be used, such as hydroxypropyl methylcellulose or hydroxypropyl cellulose, or an extended release material can be used, such as ethyl cellulose, cellulose acetate butyrate.

An oral formulation can also be provided as hard gelatin capsules in which the active ingredient is mixed with an inert solid diluent, such as calcium carbonate, calcium phosphate or kaolin, or as soft gelatin capsules in which the active ingredient is mixed with a water-soluble carrier such as polyethylene glycol or an oil medium such as peanut oil, liquid paraffin or olive oil.

An aqueous suspension contains the active ingredient in admixture with an excipient suitable for the preparation of aqueous suspension. Such excipient is a suspending agent, such as sodium carboxymethylcellulose, methylcellulose, hydroxypropylmethylcellulose, sodium alginate, polyvinylpyrrolidone and acacia; a dispersant or humectant, which can be a naturally occurring phosphatide such as lecithin, or a condensation product of an alkylene oxide with fatty acid such as polyoxyethylene stearate, or a condensation product of ethylene oxide with a long chain aliphatic alcohol such as heptadecaethyleneoxy cetanol, or a condensation product of ethylene oxide with part esters derived from fatty acids and hexitols such as polyoxyethylene sorbitol monooleate, or a condensation product of ethylene oxide with partial esters derived from fatty acids and hexitol anhydrides such as polyoxyethylene sorbitan monooleate. The aqueous suspension can also contain one or more preservatives, such as ethylparaben or n-propylparaben, one or more colorants, one or more flavoring agents, and one or more sweeteners such as sucrose, saccharin or aspartame.

An oil suspension can be formulated by suspending the active ingredient in a vegetable oil such as peanut oil, olive oil, sesame oil or coconut oil, or in a mineral oil such as liquid paraffin. The oil suspension can contain a thickener, such as beeswax, hard paraffin or cetyl alcohol. The above sweetener and flavoring agent can be added to provide a palatable formulation. These compositions can be preserved by addition of an antioxidant, such as butylated hydroxyanisole or α-tocopherol.

The active ingredient in admixture with the dispersants or wetting agents, suspending agent or one or more preservatives can be prepared as a dispersible powder or granule suitable for the preparation of an aqueous suspension by addition of water. Suitable dispersants or wetting agents and suspending agents are as described above. Additional excipients, such as sweetening agents, flavoring agents and coloring agents, can also be added. These compositions are preserved by addition of an antioxidant such as ascorbic acid.

The pharmaceutical composition of the present invention can also be in the form of an oil-in-water emulsion. The oil phase can be a vegetable oil such as olive oil or peanut oil, or a mineral oil such as liquid paraffin or a mixture thereof. Suitable emulsifying agent can be naturally occurring phosphatides, such as soy bean lecithin, and esters or partial esters derived from fatty acids and hexitol anhydrides such as sorbitan monooleate, and condensation products of said partial esters with ethylene oxide such as polyoxyethylene sorbitol monooleate. The emulsion can also contain a sweetener, flavoring agent, preservative and antioxidant. Syrup and elixir can be formulated with a sweetener, such as glycerol, propylene glycol, sorbitol or sucrose. Such formulations can also contain a moderator, a preservative, a colorant and an antioxidant.

The pharmaceutical composition of the present invention can be in the form of a sterile injectable aqueous solution. The acceptable vehicles and solvents that can be employed include water, Ringer's solution and isotonic sodium chloride solution. The sterile injectable formulation can be a sterile injectable oil-in-water microemulsion in which the active ingredient is dissolved in the oil phase. For example, the active ingredient can be firstly dissolved in a mixture of soybean oil and lecithin, the oil solution is then introduced into a mixture of water and glycerol and processed to form a microemulsion. The injectable solution or microemulsion can be introduced into a patient's bloodstream by local bolus injection. Alternatively, it can be advantageous to administrate the solution or microemulsion in such a way as to maintain a constant circulating concentration of the compound of the present invention. In order to maintain such a constant concentration, a continuous intravenous delivery device can be utilized.

The pharmaceutical composition of the present invention can be in the form of a sterile injectable aqueous or oily suspension for intramuscular and subcutaneous administration. Such a suspension can be formulated with suitable dispersants or wetting agents and suspending agents as described above according to known techniques. The sterile injectable formulation can also be a sterile injectable solution or suspension prepared in a nontoxic parenterally acceptable diluent or solvent, such as a solution prepared in 1,3-butanediol. Moreover, sterile fixed oils can easily be used as a solvent or suspending medium. For this purpose, any blending fixed oils including synthetic mono- or di-glyceride can be employed. Moreover, fatty acids such as oleic acid can also be employed in the preparation of an injection.

The compound of the present invention can be administrated in the form of a suppository for rectal administration. These pharmaceutical compositions can be prepared by mixing the drug with a suitable non-irritating excipient that is solid at ordinary temperatures, but liquid in the rectum, thereby melting in the rectum to release the drug. Such materials include cocoa butter, glycerin gelatin, hydrogenated vegetable oils, mixtures of polyethylene glycols with various molecular weights and fatty acid esters of polyethylene glycols.

It is well known to those skilled in the art that the dosage of a drug depends on a variety of factors including, but not limited to the following factors: activity of a specific compound, age of the patient, weight of the patient, general health of the patient, behavior of the patient, diet of the patient, administration time, administration route, excretion rate, drug combination and the like. In addition, the optimal treatment, such as treatment mode, daily dose of the compound or the type of pharmaceutically acceptable salt thereof can be verified according to the traditional therapeutic regimens.

The present invention can contain a composition comprising the compound of formula (I) or the pharmaceutically acceptable salt, hydrate or solvate as an active ingredient, and a pharmaceutically acceptable carrier or excipient, which is formulated into a clinically acceptable formulation. The derivatives of the present invention can be used in combination with other active ingredients as long as they do not cause other adverse effects such as allergic reactions and the like. The compound of the present invention can be used as the sole active ingredient, and can also be used in combination with other drugs treating diseases associated with tyrosine kinase activity. A combination therapy is achieved by administrating the individual therapeutic components simultaneously, separately or sequentially.

DETAILED DESCRIPTION OF THE INVENTION

Unless otherwise stated, the terms used in the specification and claims have the meanings described below.

The term "alkyl" refers to a saturated aliphatic hydrocarbon group, which is a straight or branched chain group comprising 1 to 20 carbon atoms, preferably an alkyl having 1 to 12 carbon atoms, and more preferably an alkyl having 1 to 6 carbon atoms. Non-limiting examples include methyl, ethyl, n-propyl, isopropyl, n-butyl, isobutyl, tert-butyl, sec-butyl, n-pentyl, 1,1-dimethylpropyl, 1,2-dimethylpropyl, 2,2-dimethylpropyl, 1-ethylpropyl, 2-methylbutyl, 3-methylbutyl, n-hexyl, 1-ethyl-2-methylpropyl, 1,1,2-trimethylpropyl, 1,1-dimethylbutyl, 1,2-dimethylbutyl, 2,2-dimethylbutyl, 1,3-dimethylbutyl, 2-ethylbutyl, 2-methylpentyl, 3-methylpentyl, 4-methylpentyl, 2,3-dimethylbutyl, n-heptyl, 2-methylhexyl, 3-methylhexyl, 4-methylhexyl, 5-methylhexyl, 2,3-dimethylpentyl, 2,4-dimethylpentyl, 2,2-dimethylpentyl, 3,3-dimethylpentyl, 2-ethylpentyl, 3-ethylpentyl, n-octyl, 2,3-dimethylhexyl, 2,4-dimethylhexyl, 2,5-dimethylhexyl, 2,2-dimethylhexyl, 3,3-dimethylhexyl, 4,4-dimethylhexyl, 2-ethylhexyl, 3-ethylhexyl, 4-ethylhexyl, 2-methyl-2-ethylpentyl, 2-methyl-3-ethylpentyl, n-nonyl, 2-methyl-2-ethylhexyl, 2-methyl-3-ethylhexyl, 2,2-diethylpentyl, n-decyl, 3,3-diethylhexyl, 2,2-diethylhexyl, and various branched isomers thereof. More preferably, the alkyl group is a lower alkyl having 1 to 6 carbon atoms, and non-limiting examples include methyl, ethyl, n-propyl, isopropyl, n-butyl, isobutyl, tert-butyl, sec-butyl, n-pentyl, 1,1-dimethylpropyl, 1,2-dimethylpropyl, 2,2-dimethylpropyl, 1-ethylpropyl, 2-methylbutyl, 3-methylbutyl, n-hexyl, 1-ethyl-2-methylpropyl, 1,1,2-trimethylpropyl, 1,1-dimethylbutyl, 1,2-dimethylbutyl, 2,2-dimethylbutyl, 1,3-dimethylbutyl, 2-ethylbutyl, 2-methylpentyl, 3-methylpentyl, 4-methylpentyl, 2,3-dimethylbutyl and the like. The alkyl group can be substituted or unsubstituted. When substituted, the substituent group(s) can be substituted at any available connection point. The substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, oxo, carboxy and alkoxycarbonyl.

The term "alkenyl" refers to an alkyl group as defined above consisting of at least two carbon atoms and at least one carbon-carbon double bond, such as ethenyl, 1-propenyl, 2-propenyl, 1-, 2- or 3-butenyl and the like. The alkenyl group can be substituted or unsubstituted. When substituted, the substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio and heterocyclylthio.

The term "alkynyl" refers to an alkyl group as defined above consisting of at least two carbon atoms and at least one carbon-carbon triple bond, such as ethynyl, propynyl, butynyl and the like. The alkynyl group can be substituted or unsubstituted. When substituted, the substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio and heterocyclylthio.

The term "cycloalkyl" refers to a saturated or partially unsaturated monocyclic or polycyclic hydrocarbon substituent group having 3 to 20 carbon atoms, preferably 3 to 12 carbon atoms, more preferably 3 to 10 carbon atoms, further preferably 3 to 8 carbon atoms, and most preferably 3 to 6 carbon atoms. Non-limiting examples of monocyclic cycloalkyl include cyclopropyl, cyclobutyl, cyclopentyl, cyclopentenyl, cyclohexyl, cyclohexenyl, cyclohexadienyl, cycloheptyl, cycloheptatrienyl, cyclooctyl and the like. Polycyclic cycloalkyl includes a cycloalkyl having a spiro ring, fused ring or bridged ring.

The term "spiro cycloalkyl" refers to a 5- to 20-membered polycyclic group with individual rings connected through one common carbon atom (called a spiro atom), wherein one or more rings can contain one or more double bonds, but none of the rings has a completely conjugated π-electron system. The spiro cycloalkyl is preferably a 6- to 14-membered spiro cycloalkyl, and more preferably a 7- to 10-membered spiro cycloalkyl. According to the number of the spiro atoms shared between the rings, the spiro cycloalkyl can be divided into a mono-spiro cycloalkyl, a di-spiro cycloalkyl, or a poly-spiro cycloalkyl, and the spiro cycloalkyl is preferably a mono-spiro cycloalkyl or di-spiro cycloalkyl, and more preferably a 4-membered/4-membered, 4-membered/5-membered, 4-membered/6-membered, 5-membered/5-membered, or 5-membered/6-membered mono-spiro cycloalkyl. Non-limiting examples of spiro cycloalkyl include:

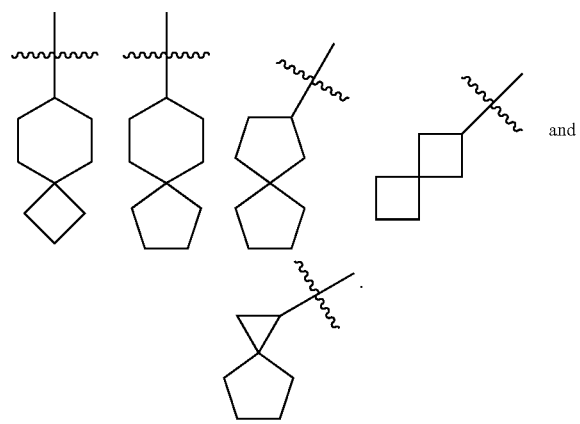

and

The term "fused cycloalkyl" refers to a 5- to 20-membered all-carbon polycyclic group, wherein each ring in the system shares an adjacent pair of carbon atoms with another ring, one or more rings can contain one or more double bonds, but none of the rings has a completely conjugated π-electron system. The fused cycloalkyl is preferably a 6- to 14-membered fused cycloalkyl, and more preferably a 7- to 10-membered fused cycloalkyl. According to the number of membered rings, the fused cycloalkyl can be divided into a bicyclic, tricyclic, tetracyclic or polycyclic fused cycloalkyl, and the fused cycloalkyl is preferably a bicyclic or tricyclic fused cycloalkyl, and more preferably a 5-membered/5-membered, or 5-membered/6-membered bicyclic fused cycloalkyl. Non-limiting examples of fused cycloalkyl include:

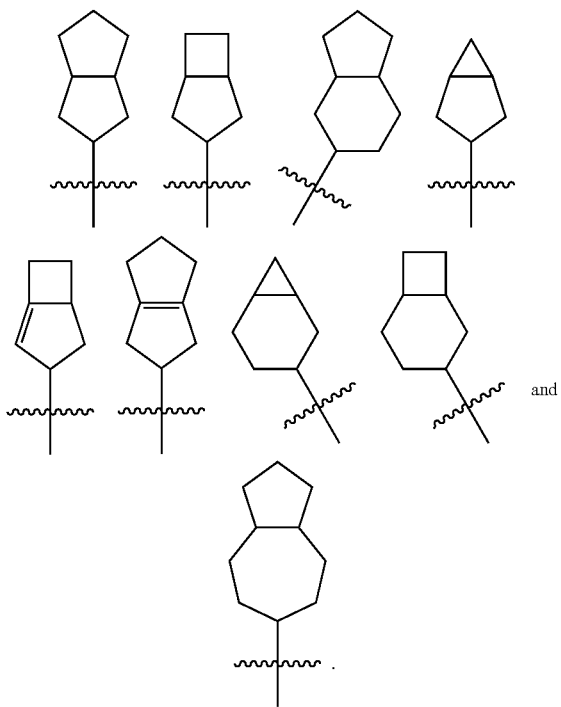

The term "bridged cycloalkyl" refers to a 5- to 20-membered all-carbon polycyclic group, wherein any two rings in the system share two disconnected carbon atoms, one or more rings can have one or more double bonds, but none of the rings has a completely conjugated π-electron system. The bridged cycloalkyl is preferably a 6- to 14-membered bridged cycloalkyl, and more preferably a 7- to 10-membered bridged cycloalkyl. According to the number of membered rings, the bridged cycloalkyl can be divided into a bicyclic, tricyclic, tetracyclic or polycyclic bridged cycloalkyl, and the bridged cycloalkyl is preferably a bicyclic, tricyclic or tetracyclic bridged cycloalkyl, and more preferably a bicyclic or tricyclic bridged cycloalkyl. Non-limiting examples of bridged cycloalkyl include:

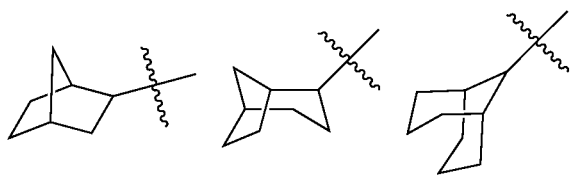

-continued

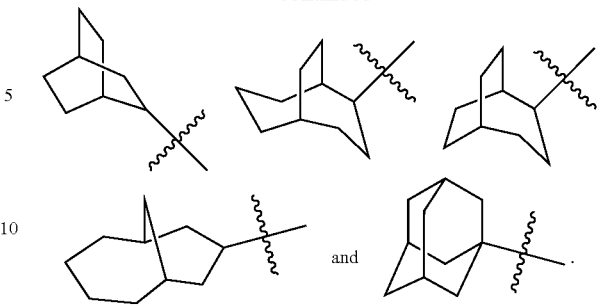

The cycloalkyl ring can be fused to the ring of aryl, heteroaryl or heterocyclyl, wherein the ring linking to the parent structure is cycloalkyl. Non-limiting examples include indanyl, tetrahydronaphthyl, benzocycloheptyl and the like. The cycloalkyl can be optionally substituted or unsubstituted. When substituted, the substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, oxo, carboxy and alkoxycarbonyl.

The term "heterocyclyl" refers to a 3- to 20-membered saturated or partially unsaturated monocyclic or polycyclic hydrocarbon group, wherein one or more ring atoms are heteroatoms selected from the group consisting of N, O and $S(O)_m$ (wherein m is an integer of 0 to 2), but excluding —O—O—, —O—S— or —S—S— in the ring, with the remaining ring atoms being carbon atoms. Preferably, the heterocyclyl has 3 to 12 ring atoms wherein 1 to 4 atoms are heteroatoms; most preferably, 3 to 8 ring atoms wherein 1 to 3 atoms are heteroatoms; and most preferably 5 to 7 ring atoms wherein 1 to 2 or 1 to 3 atoms are heteroatoms. Non-limiting examples of monocyclic heterocyclyl include pyrrolidinyl, imidazolyl, tetrahydrofuranyl, tetrahydrothienyl, dihydroimidazolyl, dihydrofuranyl, dihydropyrazolyl, dihydropyrrolyl, piperidinyl, piperazinyl, morpholinyl, thiomorpholinyl, homopiperazinyl, pyranyl and the like, and preferably, 1,2,5-oxadiazolyl, pyranyl or morpholinyl. Polycyclic heterocyclyl includes a heterocyclyl having a spiro ring, fused ring or bridged ring.

The term "spiro heterocyclyl" refers to a 5- to 20-membered polycyclic heterocyclyl group with individual rings connected through one common atom (called a spiro atom), wherein one or more ring atoms are heteroatoms selected from the group consisting of N, O and $S(O)_m$ (wherein m is an integer of 0 to 2), with the remaining ring atoms being carbon atoms, and the rings can contain one or more double bonds, but none of the rings has a completely conjugated π-electron system. The spiro heterocyclyl is preferably a 6- to 14-membered spiro heterocyclyl, and more preferably a 7- to 10-membered spiro heterocyclyl. According to the number of the spiro atoms shared between the rings, the spiro heterocyclyl can be divided into a mono-spiro heterocyclyl, di-spiro heterocyclyl, or poly-spiro heterocyclyl, and the spiro heterocyclyl is preferably a mono-spiro heterocyclyl or di-spiro heterocyclyl, and more preferably a 4-membered/4-membered, 4-membered/5-membered, 4-membered/6-membered, 5-membered/5-membered, or 5-membered/6-membered mono-spiro heterocyclyl. Non-limiting examples of spiro heterocyclyl include:

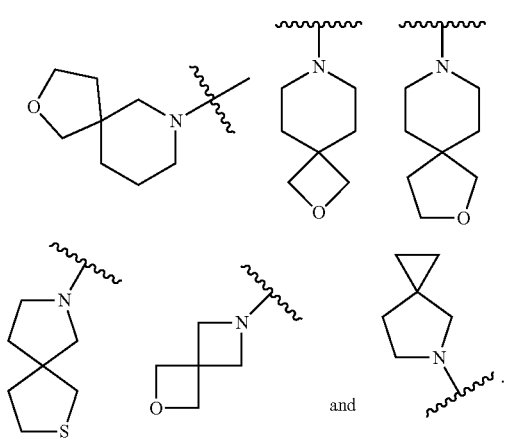

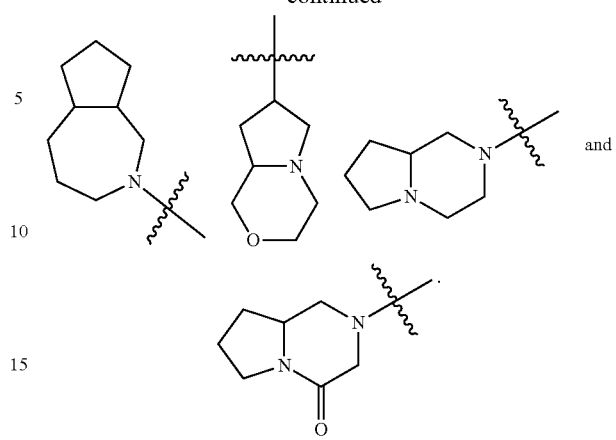

The term "fused heterocyclyl" refers to a 5- to 20-membered polycyclic heterocyclyl group, wherein each ring in the system shares an adjacent pair of atoms with another ring, one or more rings can contain one or more double bonds, but none of the rings has a completely conjugated π-electron system, and one or more ring atoms are heteroatoms selected from the group consisting of N, O and $S(O)_m$ (wherein m is an integer of 0 to 2), with the remaining ring atoms being carbon atoms. The fused heterocyclyl is preferably a 6- to 14-membered fused heterocyclyl, and more preferably a 7- to 10: membered fused heterocyclyl. According to the number of membered rings, the fused heterocyclyl can be divided into a bicyclic, tricyclic, tetracyclic or polycyclic fused heterocyclyl, and preferably a bicyclic or tricyclic fused heterocyclyl, and more preferably a 5-membered/5-membered or 5-membered/6-membered bicyclic fused heterocyclyl. Non-limiting examples of fused heterocyclyl include:

The term "bridged heterocyclyl" refers to a 5- to 14-membered polycyclic heterocyclyl group, wherein any two rings in the system share two disconnected atoms, wherein one or more rings can have one or more double bond(s), but none of the rings has a completely conjugated π-electron system, and one or more ring atoms are heteroatoms selected from the group consisting of N, O and $S(O)_m$ (wherein m is an integer of 0 to 2), with the remaining ring atoms being carbon atoms. The bridged heterocyclyl is preferably a 6- to 14-membered bridged heterocyclyl, and more preferably a 7- to 10-membered bridged heterocyclyl. According to the number of membered rings, the bridged heterocyclyl can be divided into a bicyclic, tricyclic, tetracyclic or polycyclic bridged heterocyclyl, and the bridged heterocyclyl is preferably a bicyclic, tricyclic or tetracyclic bridged heterocyclyl, and more preferably a bicyclic or tricyclic bridged heterocyclyl. Non-limiting examples of bridged heterocyclyl include:

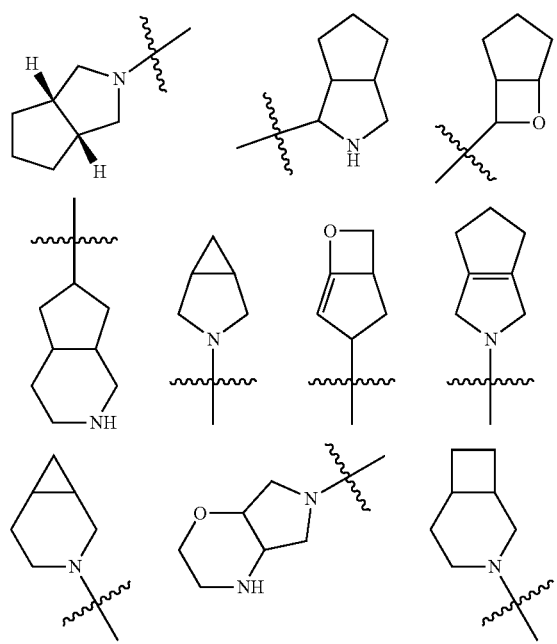

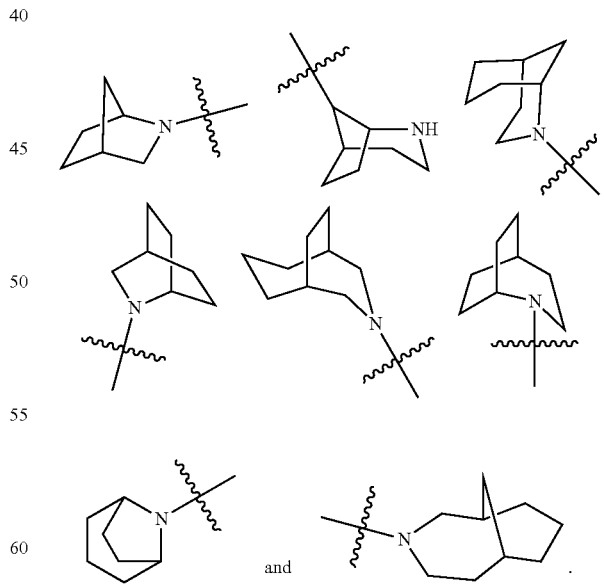

The heterocyclyl ring can be fused to the ring of aryl, heteroaryl or cycloalkyl, wherein the ring bound to the parent structure is heterocyclyl. Non-limiting examples thereof include:

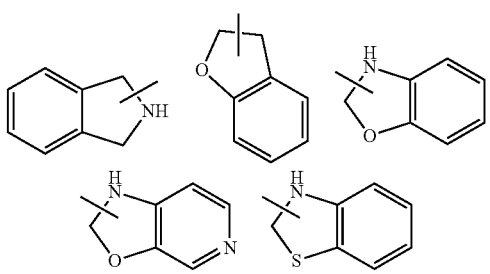

and the like.

The heterocyclyl can be optionally substituted or unsubstituted. When substituted, the substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, oxo, carboxy and alkoxycarbonyl.

The term "aryl" refers to a 6: to 14: membered all-carbon monocyclic ring or polycyclic fused ring (i.e. each ring in the system shares an adjacent pair of carbon atoms with another ring in the system) having a conjugated 7l-electron system, preferably a 6: to 10-membered aryl, for example, phenyl and naphthyl. The aryl is more preferably phenyl. The aryl ring can be fused to the ring of heteroaryl, heterocyclyl or cycloalkyl, wherein the ring bound to the parent structure is aryl ring. Non-limiting examples thereof include:

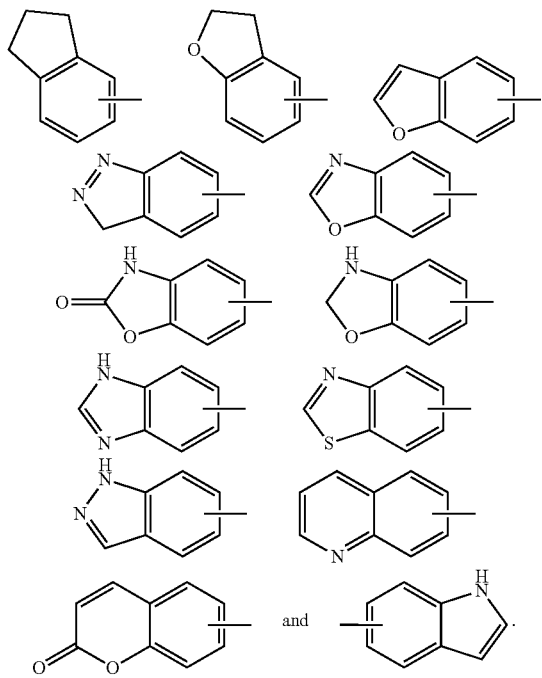

The aryl can be substituted or unsubstituted. When substituted, the substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, carboxy and alkoxycarbonyl.

The term "heteroaryl" refers to a 5- to 14-membered heteroaromatic system having 1 to 4 heteroatoms selected from the group consisting of O, S and N. The heteroaryl is preferably a 5- to 10-membered heteroaryl having 1 to 3 heteroatom(s), and more preferably a 5- or 6-membered heteroaryl having 1 to 2 heteroatom(s), for example imidazolyl, furyl, thienyl, thiazolyl, pyrazolyl, oxazolyl, pyrrolyl, tetrazolyl, pyridyl, pyrimidinyl, thiadiazolyl, pyrazinyl and the like, preferably imidazolyl, thiazolyl, pyrazolyl, pyrimidinyl or thiazolyl, and more preferably pyrazolyl or thiazolyl. The heteroaryl ring can be fused to the ring of aryl, heterocyclyl or cycloalkyl, wherein the ring bound to the parent structure is heteroaryl ring. Non-limiting examples thereof include:

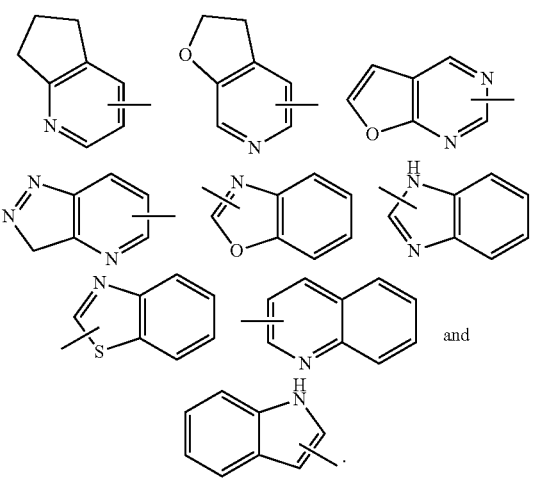

The heteroaryl can be optionally substituted or unsubstituted. When substituted, the substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, carboxy and alkoxycarbonyl.

The term "alkoxy" refers to an —O-(alkyl) or an —O-(unsubstituted cycloalkyl) group, wherein the alkyl is as defined above. Non-limiting examples of alkoxy include methoxy, ethoxy, propoxy, butoxy, cyclopropyloxy, cyclobutyloxy, cyclopentyloxy, cyclohexyloxy. The alkoxy can be optionally substituted or unsubstituted. When substituted, the substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, carboxy and alkoxycarbonyl.

The term "haloalkyl" refers to an alkyl group substituted by one or more halogen(s), wherein the alkyl is as defined above.

The term "haloalkoxy" refers to an alkoxy group substituted by one or more halogen(s), wherein the alkoxy is as defined above.

The term "hydroxy" refers to an —OH group.

The term "halogen" refers to fluorine, chlorine, bromine or iodine.

The term "amino" refers to a —NH$_2$ group.
The term "cyano" refers to a —CN group.
The term "nitro" refers to a —NO$_2$ group.
The term "oxo" refers to a =O group.
The term "carboxy" refers to a —C(O)OH group.
The term "thiol" refers to a —SH group.
The term "alkoxycarbonyl" refers to a —C(O)O(alkyl) or a —C(O)O(cycloalkyl) group, wherein the alkyl and cycloalkyl are as defined above.

The term "acyl" refers to a compound comprising a —C(O)R group, where R is an alkyl, cycloalkyl, heterocyclyl, aryl or heteroaryl.

"Optional" or "optionally" means that the event or circumstance described subsequently can, but need not, occur, and such a description includes the situation in which the event or circumstance does or does not occur. For example, "the heterocyclyl optionally substituted by an alkyl" means that an alkyl group can be, but need not be, present, and such a description includes the situation of the heterocyclyl being substituted by an alkyl and the situation of the heterocyclyl being not substituted by an alkyl.

"Substituted" refers to one or more hydrogen atoms in a group, preferably up to 5, and more preferably 1 to 3 hydrogen atoms in a group, are independently substituted by a corresponding number of substituents. It goes without saying that the substituents only exist in their possible chemical position. The person skilled in the art is able to determine whether the substitution is possible or impossible by experiments or theory without excessive efforts. For example, the combination of amino or hydroxy having free hydrogen and carbon atoms having unsaturated bonds (such as olefinic) may be unstable.

A "pharmaceutical composition" refers to a mixture of one or more of the compounds according to the present invention or physiologically/pharmaceutically acceptable salts or prodrugs thereof with other chemical components, and other components such as physiologically/pharmaceutically acceptable carriers and excipients.

The purpose of the pharmaceutical composition is to facilitate administration of a compound to an organism, which is conducive to the absorption of the active ingredient so as to exert biological activity.

A "pharmaceutically acceptable salt" refers to a salt of the compound of the present invention, which is safe and effective in mammals and has the desired biological activity.

Synthesis Method of the Present Compounds

In order to achieve the purpose of the present invention, the present invention applies the following synthetic schemes to prepare the compound of formula (I) of the present invention.

Scheme 1:
When R$^1$ is —NR$^e$R$^f$,

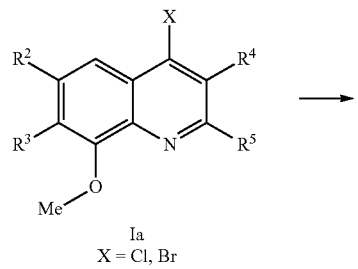

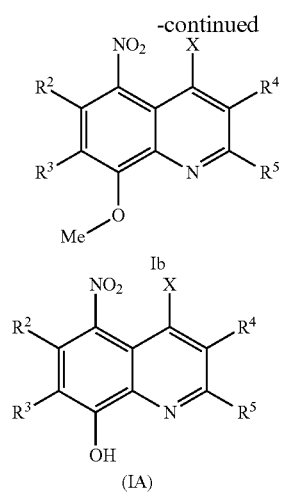

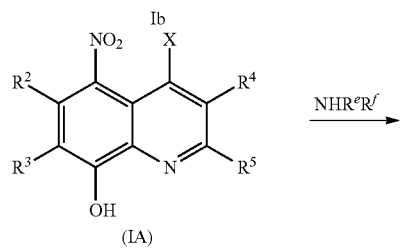

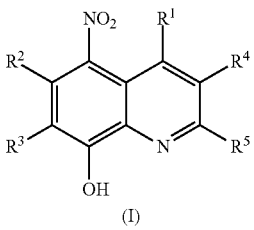

1) compound Ia is subjected to a nitration reaction in the presence of a nitrification reagent and a dehydrating agent to obtain compound Ib; wherein, the nitrification reagent is preferably nitric acid, and the dehydrating agent is preferably concentrated sulfuric acid and acetic anhydride;

2) compound Ib is subjected to a demethylation reaction under a heating condition in a solvent in the presence of a demethylation reagent to obtain a compound of formula (IA); wherein the solvent is preferably DMF, the demethylation reagent is preferably LiCl, and the heating condition is preferably the reflux temperature of the solvent;

3) the compound of formula (IA) is reacted with an amine compound NHR$^e$R$^f$ under a heating condition in a solvent to obtain the compound of formula (I); wherein the solvent is preferably DMF, and the heating condition is preferably from 100° C. to the reflux temperature of the solvent;

wherein,

R$^e$ and R$^f$ together with the nitrogen atom to which they are attached form a nitrogen-containing heterocyclyl, the nitrogen-containing heterocyclyl optionally comprises one or more heteroatom(s) selected from the group consisting of N and O in addition to N, the nitrogen-containing heterocyclyl is optionally further substituted by one or more substituent(s) selected from Q;

Q is C$_1$-C$_6$ alkyl or alkoxycarbonyl; wherein the C$_1$-C$_6$ alkyl is preferably methyl, and the alkoxycarbonyl is preferably —C(O)OCH$_2$CH$_3$; preferably, the heterocyclyl is

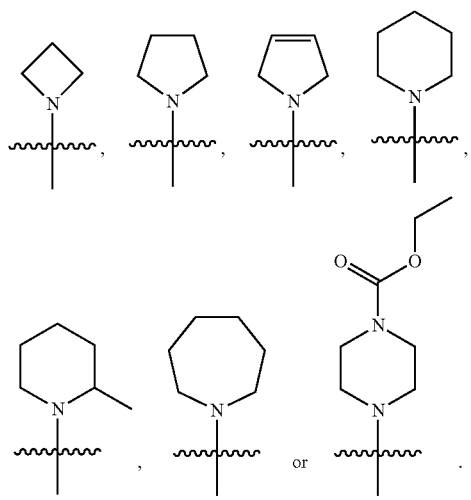

Scheme 2:
when $R^1$ is a $C_3$-$C_{10}$ cycloalkyl, $C_6$-$C_{10}$ aryl or 5- to 10-membered heteroaryl,

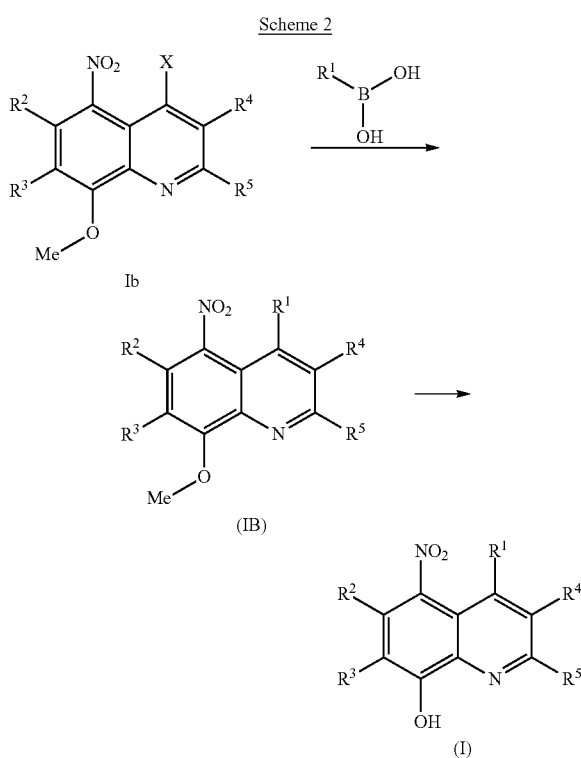

1) compound Ib is reacted with a boronic acid compound $R^1$—$B(OH)_2$ in the presence of a catalyst and an alkali to obtain a compound of formula (IB); wherein the catalyst is preferably tetrakistriphenylphosphine palladium, and the alkali is preferably potassium carbonate;
2) the compound of formula (IB) is subjected to a demethylation reaction under a heating condition in a solvent in the presence of a demethylation reagent to obtain the compound of formula (I); the solvent is preferably DMF, the demethylation reagent is preferably LiCl, and the heating condition is preferably the reflux temperature of the solvent.

Scheme 3:
when $R^1$ is —C(O)$OR^a$ or —S(O)$_pR^a$,

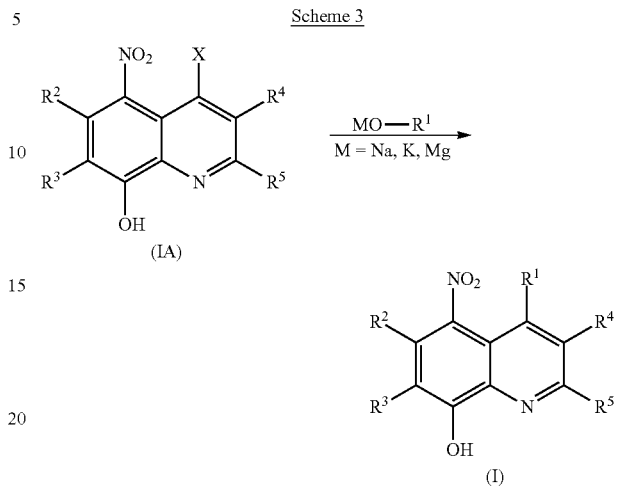

a compound of formula (IA) is reacted with compound MO-$R^1$ (M is an alkali metal, such as Na, K, Mg and the like) in a solvent under a heating condition to obtain the compound of formula (I); wherein, the solvent is preferably DMF, and the heating condition is preferably from 100° C. to the reflux temperature of the solvent; wherein,
$R^a$ is selected from the group consisting of hydrogen and $C_1$-$C_6$ alkyl;
p is 1 or 2.

In the above schemes, X is a halogen, and preferably chlorine or bromine; $R^2$, $R^3$, $R^4$ and $R^5$ are as defined in formula (I).

On the basis of not deviating from the common knowledge of the field, the above preferred conditions can be combined arbitrarily to obtain preferred examples of the present invention.

The reagents and raw materials used in the present invention are all commercially available.

The positive progress effect of the present invention is that the compounds of the present invention exhibit excellent anti-tumor activity, and can be developed as a drug for treating tumors.

Preferred Embodiments

The compounds of the present invention and their preparation are further illustrated with reference to the following examples. These examples illustrate some methods for preparing or using said compounds. However, it should be understood that these examples are not intended to limit the scope of the present invention. Variants of the present invention now known or to be further developed are considered to fall within the scope of the present invention described and claimed herein.

The compound of the present invention is prepared by using convenient starting materials and general preparation procedures. The present invention provides typical or preferential reaction conditions, such as reaction temperature, duration, solvent, pressure and molar ratio of reactants. However, unless otherwise specified, other reaction conditions can also be adopted. Optimal conditions may vary with the use of specific reactants or solvents, but under normal circumstances, reaction optimization steps and conditions can be determined.

In addition, certain protecting groups may be used in the present invention to protect certain functional groups from unnecessary reactions. The protecting groups suitable for various functional groups and their protection or deprotection conditions are well known to those skilled in the art. For example, "Protective Groups in Organic Synthesis" by T. W. Greene and G. M. Wuts ($3^{rd}$ edition, Wiley, New York, 1999 and citations in the book) describes the protection or deprotection of a large number of protecting groups in detail.

The isolation and purification of compounds and intermediates are carried out by appropriate methods and steps according to specific needs, such as filtration, extraction, distillation, crystallization, column chromatography, preparative thin-layer chromatography, preparative high performance liquid chromatography or a combination of the above methods. The specific method of use may be referred to the examples described in the present invention. Of course, other similar isolation and purification methods can also be used. They can be characterized using conventional methods (including physical constants and spectral data).

The structures of the compounds are identified by nuclear magnetic resonance (NMR) and/or mass spectrometry (MS). NMR shifts are given in $10^{-6}$ (ppm). NMR is determined by a Bruker dps 400 machine. The solvents for determination are deuterated-dimethyl sulfoxide (DMSO-$d_6$), deuterated-chloroform (CDCl$_3$) and deuterated-methanol (CD$_3$OD), and the internal standard is tetramethylsilane (TMS).

MS is determined by a LC (Agilent 1260 Infinity II)/MS (G6125B single quadrupole) mass spectrograph (manufacturer: Agilent) (Photodiode Array Detector).

Preparative liquid chromatography is conducted on an Agilent 1260 Infinity II high performance liquid chromatograph (manufacturer: Agilent). The chromatographic column is Daisogel C18 10 μm 100 A (30 mm×250 mm), and the mobile phase is acetonitrile/water.

GF254 silica gel plate of Qingdao Haiyang Chemical is used for the thin-layer silica gel chromatography (TLC). The dimension of the silica gel plate used in TLC is 0.20 mm to 0.25 mm, and the dimension of the silica gel plate used in product purification is 0.5 mm.

Silica gel of 100 to 200 mesh, 200 to 300 mesh or 300 to 400 mesh of Qingdao Haiyang Chemical is generally used as a carrier for gel column chromatography.

The known starting materials of the present invention can be prepared by the known methods in the art, or can be purchased from Wanghua Mall, Beijing Ouhe Technology, Sigma, J&K Scientific, Yishiming, Shanghai Shuya Chemical, Innochem Science & Technology, Energy Chemical, Shanghai Bide Pharmatech and the like.

Unless otherwise stated, the reactions are carried out under a nitrogen atmosphere.

Argon atmosphere or nitrogen atmosphere means that a reaction flask is equipped with an argon or nitrogen balloon (about 1 L).

The reaction solvent, organic solvent or inert solvent are each expressed as the solvent used that does not participate in the reaction under the described reaction conditions, which includes for example, benzene, toluene, acetonitrile, tetrahydrofuran (THF), dimethylformamide (DMF), chloroform, dichloromethane, ether, methanol, N-methylpyrrolidone (NMP), pyridine and the like. Unless otherwise specified in the examples, a solution means an aqueous solution.

The chemical reaction described in the present invention is generally carried out under normal pressure. The reaction temperature is between −78° C. and 200° C. The reaction duration and condition are, for example, between −78° C. and 200° C. under one atmospheric pressure, and completed within about 1 to 24 hours. If the reaction is conducted overnight, then the reaction duration is generally 16 hours. Unless otherwise specified in the examples, the reaction temperature is room temperature, which is 20° C. to 30° C.

Unless otherwise defined, all professional and scientific terms used herein have the same meaning as those familiar to those skilled in the art. In addition, any methods and materials similar or equivalent to the content described herein can be applied to the method of the present invention.

Unless otherwise specified, the temperatures indicated in the Examples are the temperatures of the heating medium (simethicone), and the mixing ratios of different solvents are volume ratios.

Hereinafter, the mass fraction of palladium in palladium/carbon is 10%.

Example 1: Synthesis of 7-fluoro-5-nitroquinolin-8-ol (1)

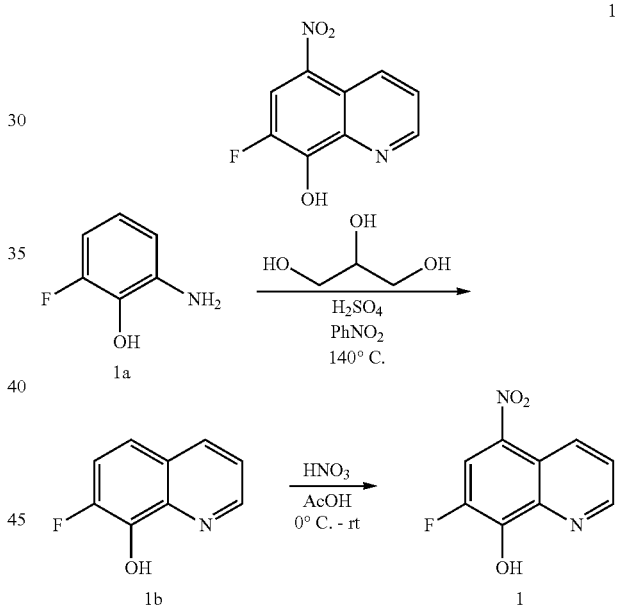

Step 1) Preparation of 7-fluoroquinolin-8-ol (1b)

2-Amino-6-fluorophenol (1a) (5.0 g, 39.3 mmol), glycerol (18 g, 196.6 mmol), nitrobenzene (50.0 mL) and concentrated sulfuric acid (5.0 mL, 93.8 mmol) were added into a tube at room temperature successively. The tube was sealed, and the reaction solution was stirred at 140° C. for 2 hours. The reaction solution was cooled to room temperature, followed by addition of ice water (100.0 mL) and tert-butyl methyl ether (50.0 mL). The resulting mixture was filtered and subjected to separation to remove the organic phase. The aqueous phase was adjusted to pH 6-7 with aqueous ammonia, and then extracted with ethyl acetate (50.0 mL×2). The combined organic phases were dried over anhydrous sodium sulfate and filtered, and the filtrate was concentrated under reduced pressure. The resulting residues were purified by silica gel column chromatography (eluent: petroleum ether/ethyl acetate=5/1) to obtain 7-fluoroquinolin-8-ol (1b) (4.7 g, yield 73%).

Step 2) Preparation of 7-fluoro-5-nitroquinolin-8-ol (1)

Nitric acid (65 wt. %) (5.0 mL) was slowly added dropwise to a solution of 7-fluoroquinolin-8-ol (1b) (4.7 g, 28.8 mmol) in acetic acid (15.0 mL) at 0° C. The reaction mixture was stirred at 0° C. for 60 min, warmed up to room temperature, and then stirred for 30 min. The reaction solution was diluted with water (80.0 mL), and the pH of the aqueous phase was adjusted to about 6-7 with aqueous ammonia. The resulting mixture was filtered under reduced pressure, and the filter cake was washed with water (50.0 mL), and dried under reduced pressure. The resulting solid was mixed with methanol (50.0 mL) and stirred for 5 minutes. The mixture was filtered under reduced pressure, and the filter cake was dried under vacuum to obtain 7-fluoro-5-nitroquinolin-8-ol (2.5 g, yield 42%).

$^1$H NMR (400 MHz, DMSO-$d_6$) δ 9.24 (dd, J=8.8, 1.4 Hz, 1H), 9.02 (dd, J=4.2, 1.2 Hz, 1H), 8.63 (d, J=11.6 Hz, 1H), 7.90 (dd, J=8.8, 4.2 Hz, 1H).

MS calculated: 208.03; MS measured: 209.1 [M+H]$^+$.

Example 2: Synthesis of 4-chloro-5-nitroquinolin-8-ol (2)

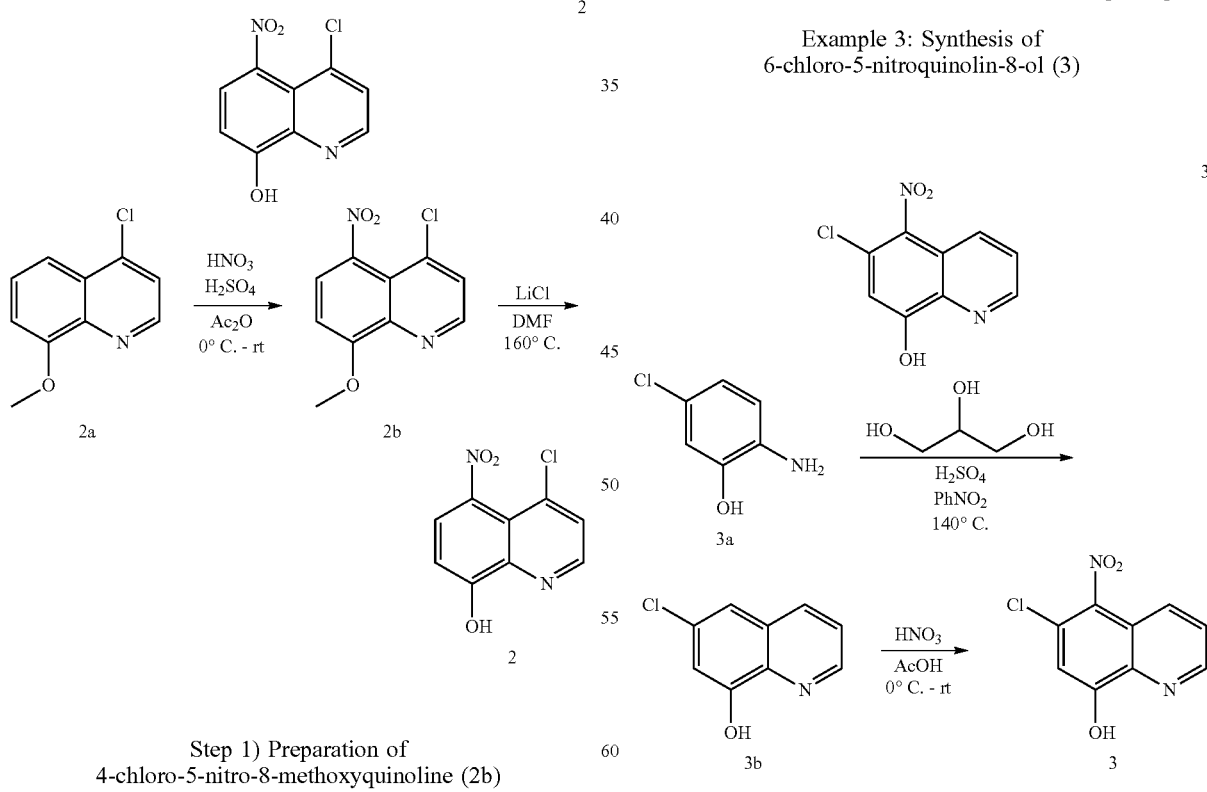

Step 1) Preparation of 4-chloro-5-nitro-8-methoxyquinoline (2b)

Nitric acid (65 wt. %) (3.0 mL, 43.6 mmol) was slowly added to a solution (40.0 mL) of 4-chloro-8-methoxyquinoline (2a) (5.0 g, 25.1 mmol) in acetic anhydride at 0° C. The reaction solution was stirred for 10 minutes. Then concentrated sulfuric acid (98 wt. %) (3.0 mL, 55.2 mmol) was slowly added dropwise. The reaction mixture was warmed up to room temperature and stirred for 1 hour, followed by addition of ice water (50.0 mL). The pH value of the aqueous phase was slowly adjusted to about 8-9 with aqueous ammonia. The aqueous phase was extracted with dichloromethane (10.0 mL×3). The combined organic phases were dried over anhydrous sodium sulfate and filtered, and the filtrate was concentrated under reduced pressure. The residues were purified by silica gel column chromatography (eluent: petroleum ether/ethyl acetate=2/1) to obtain 4-chloro-5-nitro-8-methoxyquinoline (2b) (3.8 g, yield 63%).

Step 2) Preparation of 4-chloro-5-nitroquinolin-8-ol (2)

4-Chloro-5-nitro-8-methoxyquinoline (2b) (2.3 g, 9.6 mmol) and lithium chloride (4.0 g, 96.0 mmol) were added to N,N-dimethylformamide (10.0 mL) at room temperature. The reaction mixture was stirred at 160° C. for 1 hour, and cooled to room temperature. The reaction solution was concentrated under reduced pressure to remove the organic solvent. The residues were added with water (30.0 mL), stirred for 3 minutes, and filtered under reduced pressure. The filter cake was washed with water (3.0 mL×3), and dried under vacuum to obtain 4-chloro-5-nitroquinolin-8-ol (2) (2.1 g, yield 97%).

$^1$H NMR (400 MHz, DMSO-$d_6$) δ 11.34 (s, 1H), 8.93 (d, J=4.8 Hz, 1H), 8.13 (d, J=8.4 Hz, 1H), 8.00 (d, J=4.8 Hz, 1H), 7.21 (d, J=8.4 Hz, 1H).

MS calculated: 224.00; MS measured: 225.1 [M+H]$^+$.

Example 3: Synthesis of 6-chloro-5-nitroquinolin-8-ol (3)

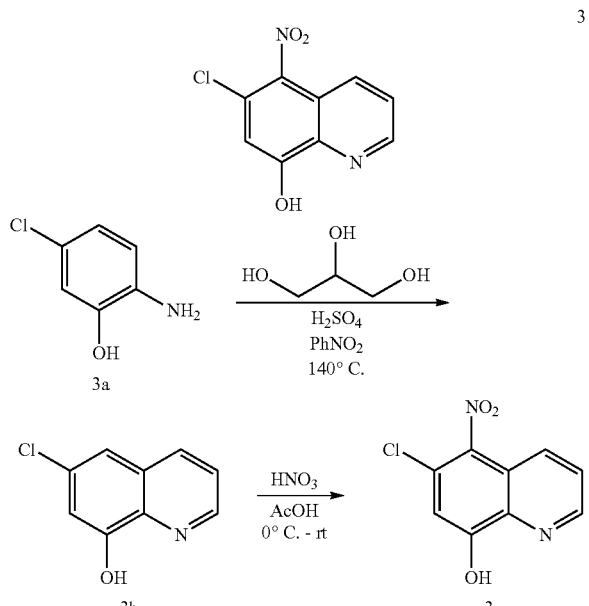

Step 1) Preparation of 6-chloroquinolin-8-ol (3b)

2-Amino-5-chlorophenol (3a) (1.0 g, 6.9 mmol), glycerol (2.6 mL, 34.8 mmol), nitrobenzene (5.0 mL) and concentrated sulfuric acid (1.0 mL, 18.8 mmol) were added into a tube at room temperature successively. The tube was sealed, and the reaction solution was stirred at 140° C. for 6 hours. The reaction solution was cooled to room temperature, followed by addition of ice water (20.0 mL). The pH value of the aqueous phase was slowly adjusted to about 8-9 with aqueous ammonia. The aqueous phase was extracted with dichloromethane (10.0 mL×3), the organic phases were combined, dried over anhydrous sodium sulfate and filtered, and the filtrate was concentrated under reduced pressure. The residues were purified by silica gel column chromatography (eluent: dichloromethane/methanol=10/1) to obtain 6-chloroquinolin-8-ol (3b) (300 mg, yield 24%).

Step 2) Preparation of 6-chloro-5-nitroquinolin-8-ol (3)

Nitric acid (65 wt. %) (1.0 mL) was slowly added dropwise to a solution (5.0 mL) of 6-chloroquinolin-8-ol (3b) (100 mg, 0.63 mmol) in acetic acid at 0° C. The reaction solution was stirred at 0° C. for 0.5 hour, warmed up to room temperature, and reacted for 1 hour. Ice water (10.0 mL) was added to the reaction solution. The aqueous phase was slowly adjusted to about pH 8-9 with aqueous ammonia, and extracted with dichloromethane (100.0 mL×3). The organic phases were combined, dried over anhydrous sodium sulfate and filtered, and the filtrate was concentrated under reduced pressure. The residues were purified by reverse phase high performance liquid chromatography (the chromatographic column was Eclipse XDB-C18 (21.2 mm×250 mm, 7 μm), the mobile phase was water/acetonitrile=100%-70%/30%, gradient elution (in the process of gradient elution, 0.1 v % formic acid was added based on the above mobile phase), the flow rate was 20.0 mL/min) to obtain 6-chloro-5-nitroquinolin-8-ol (3) (62.5 mg, yield 50%).

$^1$H NMR (400 MHz, CDCl$_3$) δ 8.91 (dd, J=4.2, 1.4 Hz, 1H), 8.26 (dd, J=8.8, 1.4 Hz, 1H), 7.69 (dd, J=8.8, 4.2 Hz, 1H), 7.29 (s, 1H).

MS calculated: 224.00; MS measured: 225.1 [M+H]$^+$.

Example 4: Synthesis of 6-methyl-5-nitroquinolin-8-ol (4)

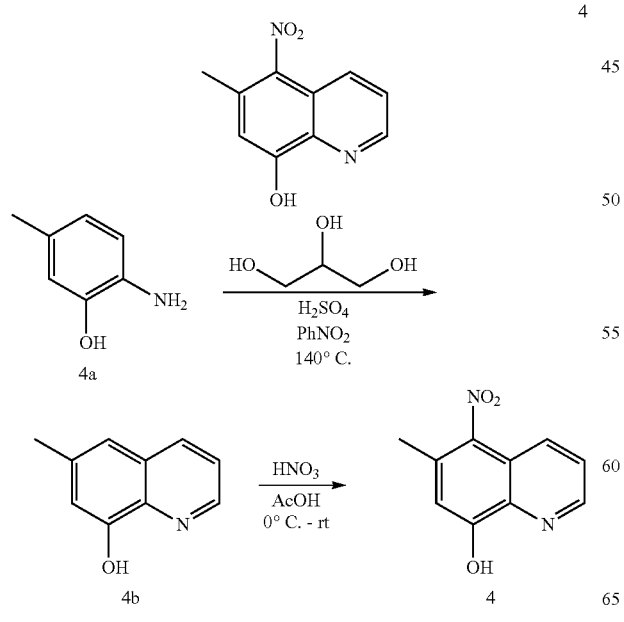

Step 1) Preparation of 6-methylquinolin-8-ol (4b)

2-Amino-5-methylphenol (300.0 mg, 2.43 mmol), glycerol (0.48 mL, 6.5 mmol), nitrobenzene (1.0 mL) and concentrated sulfuric acid (98 wt. %) (0.2 mL, 3.75 mmol) were added into a tube at room temperature successively. The tube was sealed, and the reaction solution was stirred at 140° C. for 6 hours. The reaction solution was cooled to room temperature, followed by addition of ice water (10.0 mL). The pH value of the aqueous phase was slowly adjusted to about 8-9 with aqueous ammonia. The aqueous phase was extracted with dichloromethane (10.0 mL×3). The organic phases were combined, dried over anhydrous sodium sulfate and filtered, and the filtrate was concentrated under reduced pressure. The residues were purified by silica gel column chromatography (eluent: petroleum ether/ethyl acetate=1/1) to obtain 6-methylquinolin-8-ol (4b) (194 mg, yield 50%).

Step 2) Preparation of 6-methyl-5-nitroquinolin-8-ol (4)

Nitric acid (65 wt. %) (0.1 mL) was slowly added dropwise to a solution (2.0 mL) of 6-methylquinolin-8-ol (100 mg, 0.63 mmol) in acetic acid at 0° C. The reaction solution was stirred at 0° C. for 0.5 hour, warmed up to room temperature, and stirred for 2 hours. Ice water (10.0 mL) was added to the reaction solution. The aqueous phase was slowly adjusted to about pH 8-9 with aqueous ammonia, and extracted with dichloromethane (100.0 mL×3). The organic phases were combined, dried over anhydrous sodium sulfate and filtered, and the filtrate was concentrated under reduced pressure. The residues were purified by reverse phase high performance liquid chromatography (the chromatographic column was Eclipse XDB-C18 (21.2 mm×250 mm, 7 μm), the mobile phase was water/acetonitrile=100%-70%/30%, gradient elution (in the process of gradient elution, 0.1 v % formic acid was added based on the above mobile phase), the flow rate was 20.0 mL/min) to obtain 6-methyl-5-nitroquinolin-8-ol (60 mg, yield 47%).

$^1$H NMR (400 MHz, CDCl$_3$) δ 8.88-8.77 (m, 1H), 8.21 (d, J=8.0 Hz, 1H), 7.60-7.52 (m, 1H), 7.39 (d, J=4.0 Hz, 1H), 3.78 (s, 3H).

MS calculated: 204.05; MS measured: 205.1 [M+H]$^+$.

Example 5: Synthesis of 4-morpholino-5-nitroquinolin-8-ol (5)

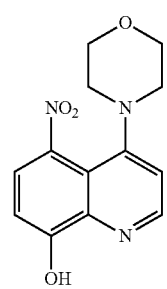

-continued

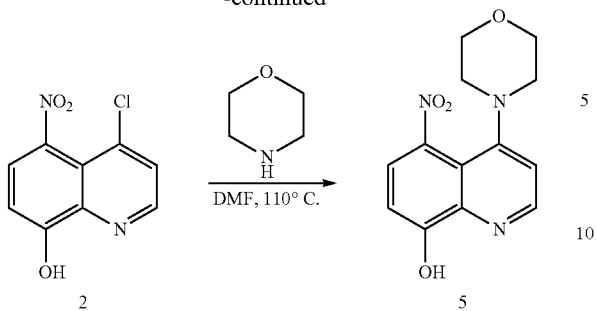

4-Chloro-5-nitroquinolin-8-ol (2) (55.0 mg, 0.24 mmol) and morpholine (87.0 mg, 1.0 mmol) were dissolved in N,N-dimethylformamide (1.0 mL) at room temperature. The reaction mixture was stirred at 110° C. for 2 hours, cooled to room temperature, and concentrated under reduced pressure to remove the organic solvent. The resulting residues were added with water (1.0 mL), stirred for 3 minutes, and filtered under reduced pressure. The filter cake was washed with water (2×0.5 mL), and dried under vacuum to obtain 4-morpholino-5-nitroquinolin-8-ol (5) (56.0 mg, yield 85%).

$^1$H NMR (400 MHz, DMSO-d$_6$) δ 8.61 (d, J=8.0 Hz, 1H), 7.99 (d, J=8.0 Hz, 1H), 7.33 (d, J=4.0 Hz, 1H), 6.84 (d, J=8.0 Hz, 1H), 3.76 (t, J=4.0, 4H), 3.07 (t, J=4.0, 4H).

MS calculated: 275.09; MS measured: 276.1 [M+H]$^+$.

Example 6: Synthesis of 5-nitro-4-(piperidin-1-yl)quinolin-8-ol (6)

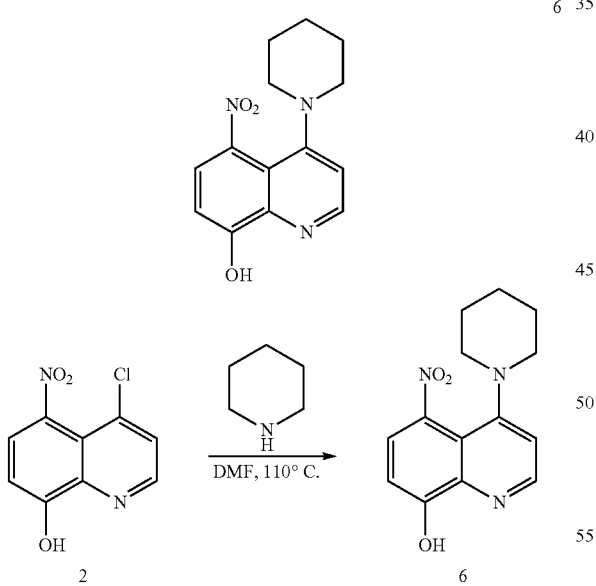

5-Nitro-4-(piperidin-1-yl)quinolin-8-ol (6) (30.6 mg, yield 47%) was obtained in accordance with the same preparation method of Example 5 with 4-chloro-5-nitroquinolin-8-ol (2) (55.0 mg, 0.24 mmol) and hexahydropyridine (110.0 mg, 1.2 mmol).

$^1$H NMR (400 MHz, DMSO-d$_6$) δ 8.40 (d, J=8.0 Hz, 1H), 8.00 (d, J=8.0 Hz, 1H), 7.21 (d, J=4.0 Hz, 1H), 6.56 (d, J=8.0 Hz, 1H), 2.96 (t, J=5.6 Hz, 4H), 1.70-1.60 (m, 4H), 1.59-1.50 (m, 2H).

MS calculated: 273.11; MS measured: 274.1 [M+H]$^+$.

Example 7: Synthesis of 5-nitro-4-(pyrrolidin-1-yl)quinolin-8-ol (7)

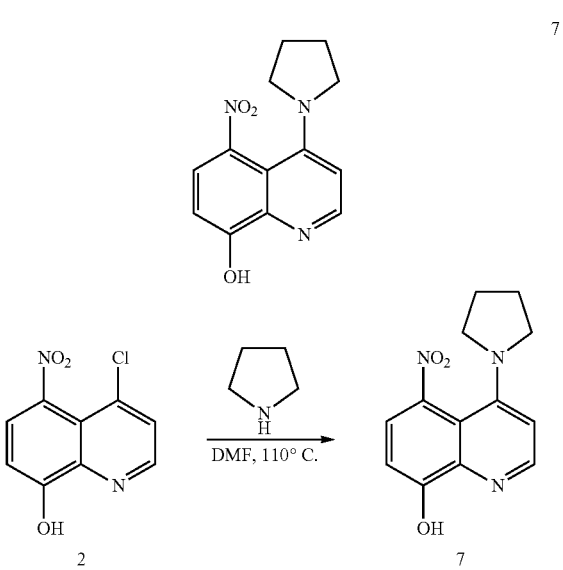

5-Nitro-4-(pyrrolidin-1-yl)quinolin-8-ol (7) (53.0 mg, yield 85%) was obtained in accordance with the same preparation method of Example 5 with 4-chloro-5-nitroquinolin-8-ol (2) (55.0 mg, 0.24 mmol) and tetrahydropyrrole (80.0 mg, 1.2 mmol).

$^1$H NMR (400 MHz, DMSO-d$_6$) δ 8.25-8.16 (m, 2H), 7.00 (d, J=8.8 Hz, 1H), 6.92 (d, J=7.2 Hz, 1H), 3.43 (t, J=6.0 Hz, 1H), 3.58-3.50 (m, 1H), 3.21 (t, J=6.0 Hz, 1H), 3.10 (p, J=6.5 Hz, 1H), 1.86-1.74 (m, 4H).

MS calculated: 245.08; MS measured: 246.1 [M+H]$^+$.

Example 8: Synthesis of 4-fluoro-5-nitroquinolin-8-ol (8)

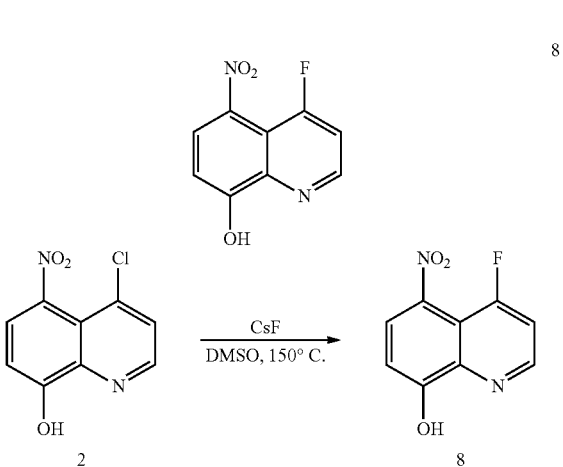

4-Chloro-5-nitroquinolin-8-ol (2) (113.0 mg, 0.50 mmol) and cesium fluoride (760.0 mg, 5.0 mmol) were dissolved in anhydrous dimethyl sulfoxide (2.0 mL) at room temperature.

The reaction solution was stirred at 150° C. for 2 hours under a nitrogen atmosphere. The reaction solution was cooled to room temperature, diluted with dichloromethane (50.0 mL), and washed once with water (20.0 mL). The organic phase was dried over anhydrous sodium sulfate and filtered, and the filtrate was concentrated under reduced pressure. The residues were purified by reverse phase high performance liquid chromatography (the chromatographic column was Eclipse XDB-C18 (21.2 mm×250 mm, 7 μm), the mobile phase was water/acetonitrile=100%-70%/30%, gradient elution (in the process of gradient elution, 0.1 v % formic acid was added based on the above mobile phase), the flow rate was 20.0 mL/min) to obtain the product 4-fluoro-5-nitroquinolin-8-ol (8) (50.0 mg, yield 44%).

$^1$H NMR (400 MHz, DMSO-$d_6$) δ 8.79-8.57 (m, 1H), 8.11 (d, J=8.0 Hz, 1H), 7.56-7.36 (m, 1H), 6.39 (d, J=8.0 Hz, 1H).

MS calculated: 208.03; MS measured: 209.0 [M+H]$^+$.

Example 9: Synthesis of 5-nitro-4-phenylquinolin-8-ol (9)

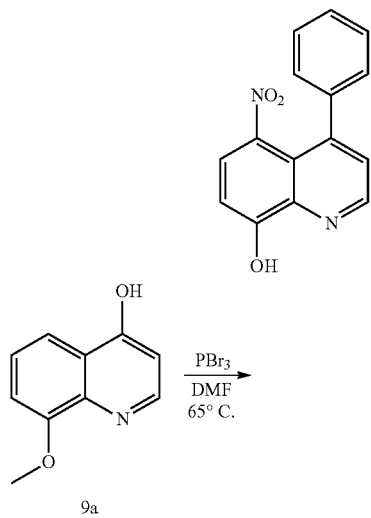

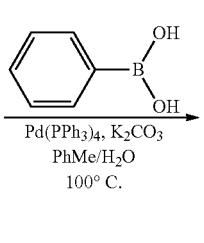

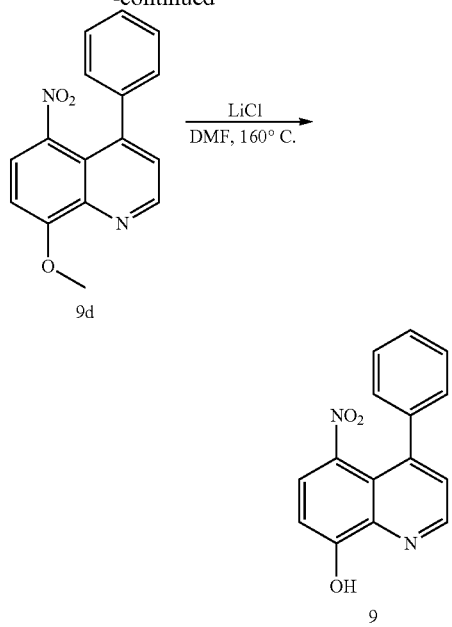

Step 1) Preparation of 4-bromo-8-methoxyquinoline (9b)

4-Hydroxy-8-methoxyquinoline (9a) (3.0 g, 17.14 mmol) and phosphorus tribromide (9.3 g, 34.2 mmol) were added successively to N,N-dimethylformamide (25.0 mL) at room temperature. The reaction solution was warmed up to 65° C. and stirred for 5 hours. The reaction solution was cooled to room temperature, to which ice water (50.0 mL) was added. The pH of the aqueous phase was adjusted to about 9 with aqueous ammonia. The resulting mixture was extracted with ethyl acetate (100.0 mL×3). The organic phases were combined, dried over anhydrous sodium sulfate and filtered, and the filtrate was concentrated under reduced pressure. The residues were purified by silica gel column chromatography (eluent: petroleum ether/ethyl acetate=7/3) to obtain 4-bromo-8-methoxyquinoline (9b) (3.7 g, yield 91%).

Step 2) Preparation of 4-bromo-5-nitro-8-methoxyquinoline (9c)

Nitric acid (65 wt. %) (5.0 mL) was slowly added to a solution of 4-bromo-8-methoxyquinoline (9b) (3.0 g, 12.66 mmol) in acetic anhydride (25.0 mL) at 0° C. The reaction solution was stirred for 10 minutes, then concentrated sulfuric acid (98 wt. %) (2.0 mL) was slowly added dropwise. The reaction solution was warmed up to room temperature and stirred for 12 hours, followed by addition of ice water (100.0 mL). The aqueous phase was adjusted to about pH 9 with aqueous ammonia, and extracted with dichloromethane (100.0 mL×3). The organic phases were combined, dried over anhydrous sodium sulfate and filtered, and the filtrate was concentrated under reduced pressure. The residues were purified by silica gel column chromatography (eluent: petroleum ether/ethyl acetate=4/1) to obtain 4-bromo-5-nitro-8-methoxyquinoline (9c) (1.5 g, yield 40%).

Step 3) Preparation of 8-methoxy-5-nitro-4-phenylquinoline (9d)

4-Bromo-5-nitro-8-methoxyquinoline (9c) (100.0 mg, 0.35 mmol), phenylboronic acid (61.6 mg, 0.72 mmol), tetrakistriphenylphosphine palladium (76.0 mg, 0.05 mmol) and potassium carbonate (97.0 mg, 0.70 mmol) were added to a mixture of toluene (5.0 mL) and water (0.50 mL) at room temperature successively. The reaction mixture was stirred at 100° C. for 5 hours, followed by cooling to room temperature. Water (20.0 mL) was added, and the solution was extracted with ethyl acetate (50.0 mL×3). The organic phases were combined, dried over anhydrous sodium sulfate and filtered, and the filtrate was concentrated under reduced pressure. The residues were purified by silica gel column chromatography (eluent: petroleum ether/ethyl acetate=1/4) to obtain 8-methoxy-5-nitro-4-phenylquinoline (9d) (60.0 mg, yield 61%).

Step 4) Preparation of 5-nitro-4-phenylquinolin-8-ol (9)

8-Methoxy-5-nitro-4-phenylquinoline (9d) (60.0 mg, 0.21 mmol) and lithium chloride (91.0 mg, 2.1 mmol) were added to N,N-dimethylformamide (2.0 mL) at room temperature. The reaction solution was warmed up to 160° C. and stirred for 1 hour, cooled to room temperature, and concentrated under reduced pressure to remove the organic solvent. The residues were added with water (5.0 mL), stirred for 3 minutes, and filtered under reduced pressure. The filter cake was washed with water (0.5 mL×2) and ethanol (0.5 mL×2) successively, and dried under vacuum to obtain 5-nitro-4-phenylquinolin-8-ol (9) (50.0 mg, yield 90%).

$^1$H NMR (400 MHz, DMSO-$d_6$) δ 8.79-8.52 (m, 1H), 8.35-8.05 (m, 1H), 7.89-7.62 (m, 1H), 7.61-7.18 (m, 5H), 6.98-6.55 (m, 1H).

MS calculated: 266.07; MS measured: 267.1 [M+H]$^+$.

Example 10: Synthesis of 5-nitro-4-(piperazin-1-yl)quinolin-8-ol (10)

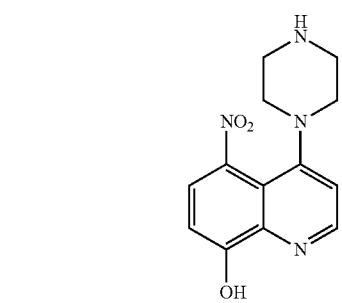

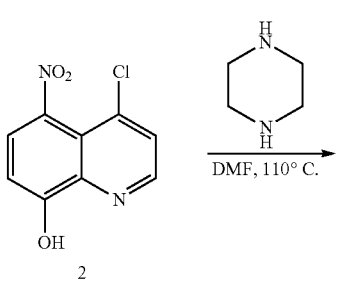

5-Nitro-4-(piperazin-1-yl)quinolin-8-ol (10) (64.0 mg, yield 58%) was obtained in accordance with the same preparation method of Example 5 with 4-chloro-5-nitroquinolin-8-ol (2) (100.0 mg, 0.44 mmol) and piperazine (192.0 mg, 2.0 mmol).

$^1$H NMR (400 MHz, CDCl$_3$) δ 8.79-8.71 (m, 1H), 7.92-7.85 (m, 1H), 7.73-7.67 (m, 1H), 7.22-7.15 (m, 1H).

MS calculated: 224.00; MS measured: 225.0 [M+H]$^+$.

Example 11: Synthesis of 4-(dimethylamino)-5-nitroquinolin-8-ol (11)

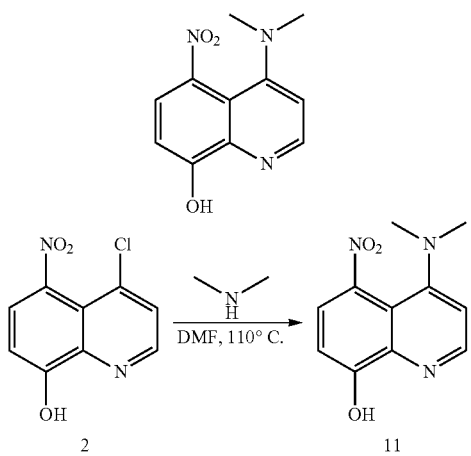

4-(Dimethylamino)-5-nitroquinolin-8-ol (11) (64.0 mg, yield 68%) was obtained in accordance with the same preparation method of Example 5 with 4-chloro-5-nitroquinolin-8-ol (2) (100.0 mg, 0.44 mmol) and an aqueous solution of dimethylamine (40 wt. %) (90.0 mg, 2.0 mmol).

$^1$H NMR (400 MHz, DMSO-$d_6$) δ 8.33-7.97 (m, 2H), 7.03 (d, J=8.0 Hz, 1H), 6.35 (d, J=8.0 Hz, 1H), 3.06 (s, 6H).

MS calculated: 233.08; MS measured: 234.1 [M+H]$^+$.

Example 12: Synthesis of 4-(methylsulfonyl)-5-nitroquinolin-8-ol (12)

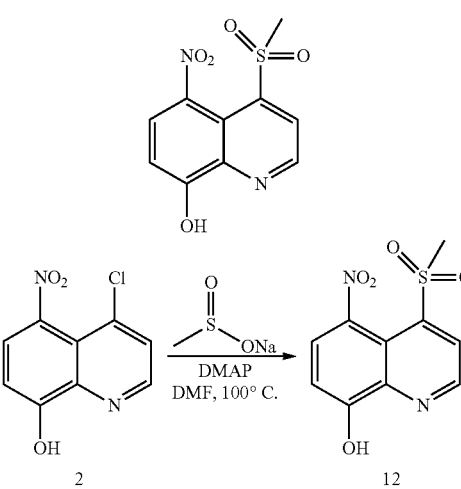

4-Chloro-5-nitroquinolin-8-ol (2) (120.0 mg, 0.53 mmol), 4-dimethylaminopyridine (13.0 mg, 0.1 mmol) and sodium methanesulfinate (102.0 mg, 1.0 mmol) were dissolved in N,N-dimethylformamide (5.0 mL) at room temperature. The reaction solution was warmed up to 100° C. and stirred for 1 hour, cooled to room temperature, and concentrated under reduced pressure to remove the organic solvent. The residues were added with water (10.0 mL), stirred for 3 minutes, and filtered. The filter cake was dried to obtain 4-(methylsulfonyl)-5-nitroquinolin-8-ol (12) (22.0 mg, yield 50%).

$^1$H NMR (400 MHz, DMSO-d$_6$) δ 9.08 (d, J=4.0 Hz, 1H), 8.40-8.21 (m, 2H), 8.18 (d, J=8.0 Hz, 1H), 6.95-6.84 (m, 1H), 6.74 (d, J=8.0 Hz, 1H), 3.12 (s, 3H).

MS calculated: 268.02; MS measured: 269.0 [M+H]$^+$.

Example 13: Synthesis of 4-(2-methylpiperidin-1-yl)-5-nitroquinolin-8-ol (13)

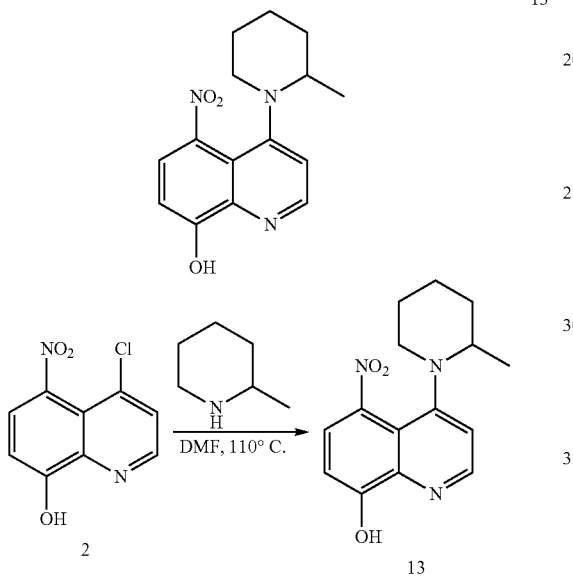

4-(2-Methylpiperidin-1-yl)-5-nitroquinolin-8-ol (13) (86.0 mg, yield 75%) was obtained in accordance with the same preparation method of Example 5 with 4-chloro-5-nitroquinolin-8-ol (2) (100.0 mg, 0.44 mmol) and 2-methylpiperidine (180.0 mg, 2.0 mmol).

$^1$H NMR (400 MHz, DMSO-d$_6$) δ 8.38 (d, J=8.0 Hz, 1H), 7.99 (d, J=8.0 Hz, 1H), 7.08 (d, J=4.0 Hz, 1H), 6.47 (d, J=8.0 Hz, 1H), 3.00-2.73 (m, 3H), 1.72-1.29 (m, 9H).

MS calculated: 287.13; MS measured: 288.1 [M+H]$^+$.

Example 14: Synthesis of 5-nitro-4-(pyridin-4-yl quinolin-8-ol (14)

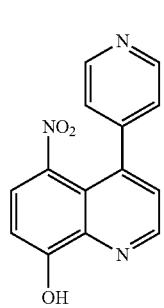

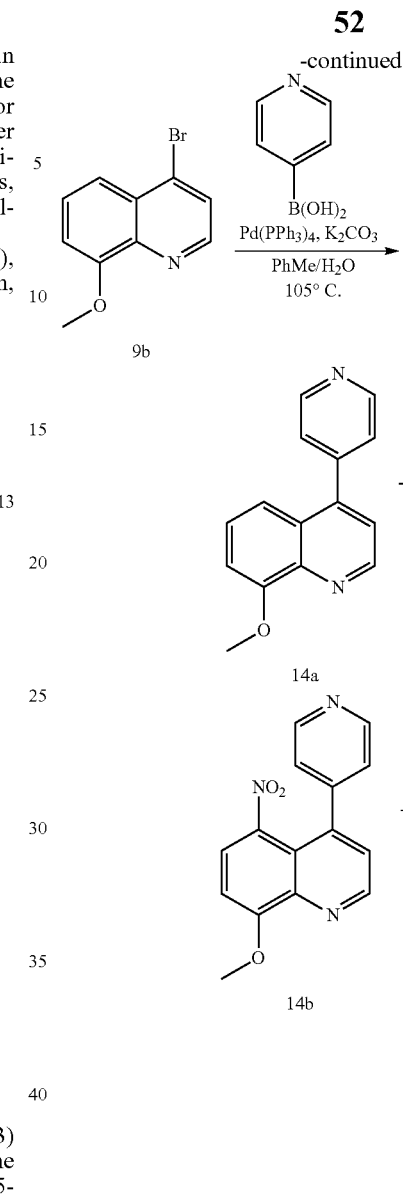

Step 1) Preparation of 8-methoxy-4-(pyridin-4-yl)quinoline (14a)

4-Bromo-8-methoxyquinoline (9b) (400.0 mg, 1.68 mmol), pyridine-4-boronic acid (416.0 mg, 3.38 mmol), tetrakistriphenylphosphine palladium (393.0 mg, 0.34 mmol) and potassium carbonate (695.0 mg, 5.04 mmol) were added to a mixture of toluene (10.0 mL) and water (1.0 mL) successively at room temperature. The resulting reaction mixture was stirred at 105° C. for 3 hours, cooled to room temperature, and extracted with ethyl acetate (10.0 mL×3). The organic phases were combined, dried over anhydrous sodium sulfate and filtered, and the filtrate was concentrated under reduced pressure. The residues were purified by silica gel column chromatography (eluent:

dichloromethane/methanol=5/1) to obtain 8-methoxy-4-(pyridin-4-yl)quinoline (14a) (330.0 mg, yield 87%).

Step 2) Preparation of 5-nitro-4-(pyridin-4-yl)-8-methoxyquinoline (14b)

Nitric acid (65 wt. %) (2.0 mL) was slowly added dropwise to a solution (3.0 mL) of 8-methoxy-4-(pyridin-4-yl)quinoline (14a) (180.0 mg, 0.76 mmol) in acetic anhydride at 0° C. The reaction solution was stirred at 0° C. for 1 hour, followed by diluting with water (15.0 mL). The aqueous phase was slowly adjusted to about pH 9-10 with aqueous ammonia, and extracted with dichloromethane (30.0 mL×3). The organic phases were combined, dried over anhydrous sodium sulfate and filtered, and the filtrate was concentrated under reduced pressure. The residues were purified by silica gel column chromatography (eluent: dichloromethane/methanol=19/1) to obtain 5-nitro-4-(pyridin-4-yl)-8-methoxyquinoline (14b) (30.0 mg, yield 14%).

Step 3) Preparation of 5-nitro-4-(pyridin-4-yl)quinolin-8-ol (14)

5-Nitro-4-(pyridin-4-yl)-8-methoxyquinoline (14b) (30.0 mg, 0.11 mmol) and lithium chloride (22.0 mg, 0.55 mmol) were dissolved in N,N-dimethylformamide (2.0 mL) at room temperature. The reaction mixture was stirred at 160° C. for 1 hour, cooled to room temperature, and concentrated under reduced pressure to remove the organic solvent. The residues were added with water (2.0 mL), stirred for 3 minutes, and filtered under reduced pressure. The filter cake was washed with water (0.5 mL×2), and dried under vacuum to obtain 5-nitro-4-(pyridin-4-yl)quinolin-8-ol (14) (18 mg, yield 61%).

$^{1}$H-NMR (400 Hz, DMSO-$d_6$) δ: 8.85-8.75 (m, 1H), 7.68-7.53 (m, 2H), 7.40-7.19 (m, 6H), 6.81-6.64 (m, 1H).

MS calculated: 222.08; MS measured: 223.1 [M+H]$^{+}$.

Example 15: Synthesis of 4-(azepan-1-yl)-5-nitro-quinolin-8-ol (15)

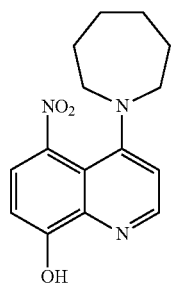

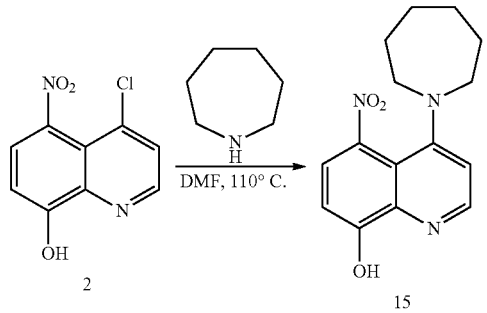

4-(Azepan-1-yl)-5-nitroquinolin-8-ol (15) (68.0 mg, yield 45%) was obtained in accordance with the same preparation method of Example 5 with 4-chloro-5-nitroquinolin-8-ol (2) (120.0 mg, 0.53 mmol) and cycloheximide (250.0 mg, 2.5 mmol).

$^{1}$H NMR (400 MHz, DMSO-$d_6$) δ 8.16 (d, J=8.0 Hz, 1H), 8.10-7.96 (m, 1H), 7.11 (d, J=8.0 Hz, 1H), 6.27 (d, J=8.0 Hz, 1H), 3.92-3.68 (m, 2H), 3.65-3.52 (m, 2H), 1.99-1.43 (m, 8H).

MS calculated: 287.13; MS measured: 288.1 [M+H]$^{+}$.

Example 16: Synthesis of 4-methoxy-5-nitroquinolin-8-ol (16)

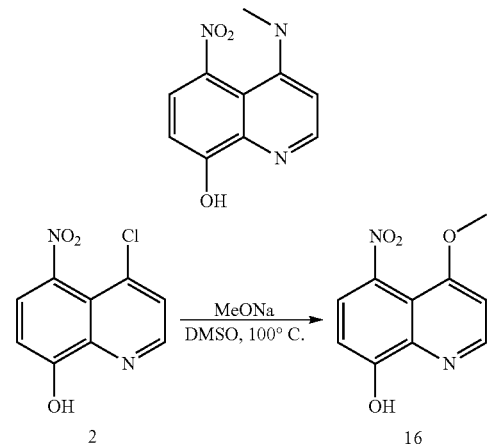

4-Chloro-5-nitroquinolin-8-ol (2) (100.0 mg, 0.44 mmol) and sodium methoxide (50.0 mg, 0.88 mmol) were dissolved in anhydrous dimethyl sulfoxide (2.0 mL) at room temperature. The reaction solution was warmed up to 100° C. and stirred for 2 hours, cooled to room temperature, and concentrated under reduced pressure to remove the organic solvent. The residues were added with water (10.0 mL), stirred for 3 minutes, and filtered under reduced pressure. The filter cake was washed with water (0.5 mL×2), and dried under vacuum to obtain 4-methoxy-5-nitroquinolin-8-ol (16) (22.0 mg, yield 50%).

$^{1}$H NMR (400 MHz, DMSO-$d_6$) δ 8.84 (d, J=4.0 Hz, 1H), 7.82 (d, J=8.0 Hz, 1H), 7.31 (d, J=4.0 Hz, 1H), 7.10 (d, J=8.0 Hz, 1H), 3.98 (s, 3H).

MS calculated: 220.05; MS measured: 221.1 [M+H]$^{+}$.

Example 17: Synthesis of 5-nitro-4-(pyridin-3-yl)quinolin-8-ol (17)

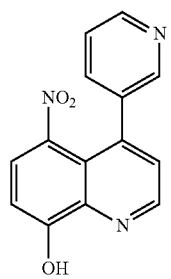

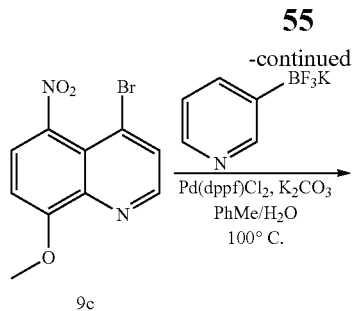
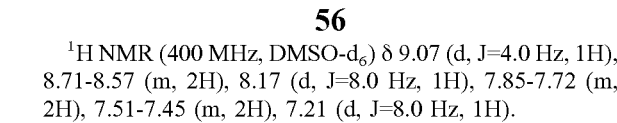

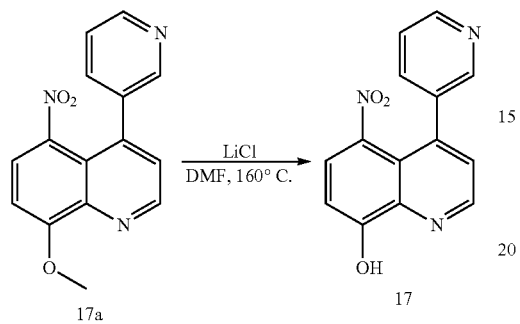

Step 1) Preparation of 4-(pyridin-3-yl)-5-nitro-8-methoxyquinoline (17a)

4-Bromo-5-nitro-8-methoxyquinoline (9c) (100.0 mg, 0.35 mmol), potassium 3-pyridyltrifluoroborate (150.0 mg, 0.83 mmol), [1,1'-bis(diphenylphosphino)ferrocene]palladium dichloride (30.0 mg, 0.04 mmol) and potassium carbonate (120.0 mg, 0.83 mmol) were added to a mixture of toluene (2.0 mL) and water (0.5 mL) successively at room temperature. The reaction mixture was stirred at 100° C. for 5 hours, cooled to room temperature, diluted with ethyl acetate (50.0 mL), and washed with water (10.0 mL) and saturated brine (10.0 mL) successively. The organic phase was dried over anhydrous sodium sulfate and filtered, and the filtrate was concentrated under reduced pressure. The residues were purified by silica gel column chromatography (eluent: petroleum ether/ethyl acetate=1/1) to obtain 4-(pyridin-3-yl)-5-nitro-8-methoxyquinoline (17a) (50.0 mg, yield 51%).

Step 2) Preparation of 5-nitro-4-(pyridin-3-yl)quinolin-8-ol (17)

4-(Pyridin-3-yl)-5-nitro-8-methoxyquinoline (17a) (50.0 mg, 0.18 mmol) and lithium chloride (76.3 mg, 1.8 mmol) were added to N,N-dimethylformamide (2.0 mL) at room temperature. The reaction solution was warmed up to 160° C. and stirred for 1 hour, cooled to room temperature, and concentrated under reduced pressure to remove the organic solvent. The residues were added with dichloromethane (5.0 mL), stirred for 3 minutes, and filtered under reduced pressure. The filtrate was concentrated under reduced pressure, and the resulting residues were purified by reverse phase high performance liquid chromatography (the chromatographic column was Eclipse XDB-C18 (21.2 mm×250 mm, 7 μm), the mobile phase was water/acetonitrile=100%–70%/30%, gradient elution (in the process of gradient elution, 0.1 v % formic acid was added based on the above mobile phase), the flow rate was 20.0 mL/min) to obtain 5-nitro-4-(pyridin-3-yl)quinolin-8-ol (17) (35.0 mg, yield 73%).

$^1$H NMR (400 MHz, DMSO-d$_6$) δ 9.07 (d, J=4.0 Hz, 1H), 8.71-8.57 (m, 2H), 8.17 (d, J=8.0 Hz, 1H), 7.85-7.72 (m, 2H), 7.51-7.45 (m, 2H), 7.21 (d, J=8.0 Hz, 1H).

MS calculated: 267.06; MS measured: 268.1 [M+H]$^+$.

Example 18: Synthesis of 4-(8-hydroxy-5-nitroquinolin-4-yl)-1-methylpiperazin-2-one (18)

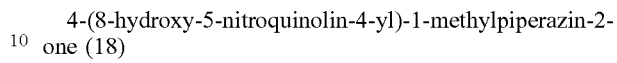
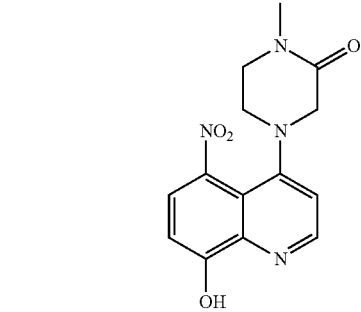

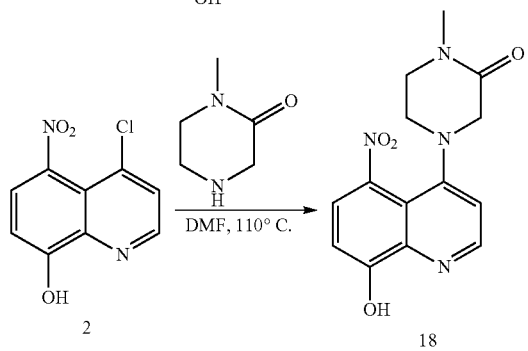

4-(8-Hydroxy-5-nitroquinolin-4-yl)-1-methylpiperazin-2-one (18) (35.0 mg, yield 26%) was obtained in accordance with the same preparation method of Example 5 with 4-chloro-5-nitroquinolin-8-ol (2) (100.0 mg, 0.44 mmol) and 1-methylpiperazin-2-one (150.0 mg, 1.3 mmol).

$^1$H NMR (400 MHz, DMSO-d$_6$) δ 8.55 (d, J=4.0 Hz, 1H), 8.08 (d, J=8.0 Hz, 1H), 7.35 (d, J=4.0 Hz, 1H), 6.78 (d, J=8.8 Hz, 1H), 3.85 (s, 2H), 3.57-3.45 (m, 2H), 3.34-3.27 (m, 2H), 2.87 (s, 3H).

MS calculated: 302.10; MS measured: 303.1 [M+H]$^+$.

Example 19: Synthesis of 4-cyclopropyl-5-nitroquinolin-8-ol (19)

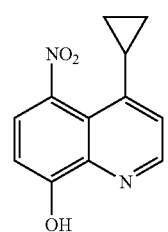

-continued

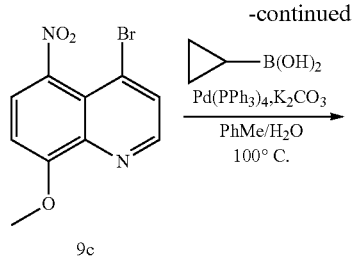

9c

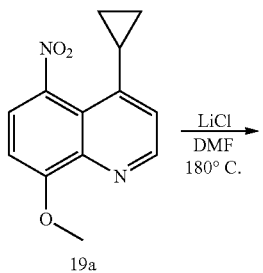

19a

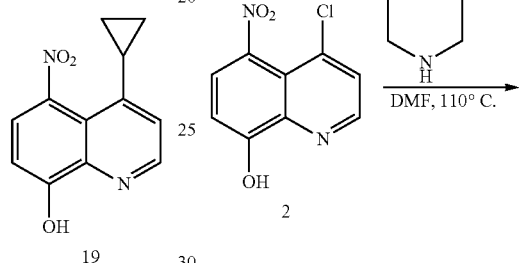

19    2

Step 1) Preparation of 4-cyclopropyl-5-nitro-8-methoxyquinoline (19a)

4-Bromo-5-nitro-8-methoxyquinoline (9c) (100.0 mg, 0.35 mmol), cyclopropylboronic acid (61.6 mg, 0.72 mmol), tetrakistriphenylphosphine palladium (82 mg, 0.07 mmol) and potassium carbonate (147 mg, 1.07 mmol) were added to a mixture of toluene (5 mL) and water (0.5 mL) successively at room temperature. The reaction mixture was stirred at 100° C. for 2 hours, followed by cooling to room temperature. Water (20.0 mL) was added, and the solution was extracted with ethyl acetate (50.0 mL×3). The organic phases were combined, dried over anhydrous sodium sulfate and filtered, and the filtrate was concentrated under reduced pressure. The residues were purified by silica gel column chromatography (eluent: petroleum ether/ethyl acetate=4/1) to obtain 4-cyclopropyl-5-nitro-8-methoxyquinoline (19a) (60.0 mg, yield 70%).

Step 2) Preparation of 4-cyclopropyl-5-nitroquinolin-8-ol (19)

4-Cyclopropyl-5-nitro-8-methoxyquinoline (19a) (60.0 mg, 0.25 mmol) and lithium chloride (105.0 mg, 2.5 mmol) were added to N,N-dimethylformamide (2.0 mL) successively at room temperature. The reaction solution was reacted at 180° C. for 1 hour, cooled to room temperature, and concentrated under reduced pressure to remove the organic solvent. Water (3.0 mL) was added, stirred for 3 minutes, and filtered. The filter cake was washed successively with water (0.5 mL×2) and ethanol (0.5 mL×2), and dried under vacuum to obtain 4-cyclopropyl-5-nitroquinolin-8-ol (19) (11.0 mg, yield 19%).

$^1$H-NMR (400 Hz, DMSO-d$_6$) δ: 8.46-8.36 (m, 1H), 8.15-8.07 (m, 1H), 7.25-7.15 (m, 1H), 6.20-6.10 (m, 1H), 2.10-1.95 (m, 1H), 0.95-0.87 (m, 2H), 0.59-0.52 (m, 2H).

MS calculated: 230.07; MS measured: 231.1 [M+H]$^+$.

Example 20: Synthesis of 4-(3-methylpiperazin-1-yl)-5-nitroquinolin-8-ol (20)

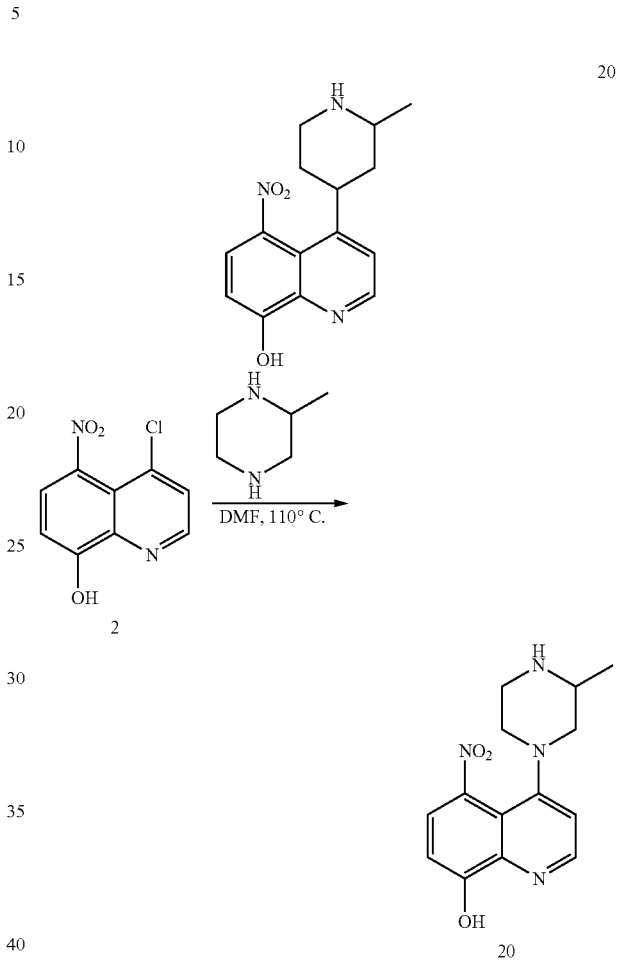

4-(3-Methylpiperazin-1-yl)-5-nitroquinolin-8-ol (20) (68.0 mg, yield 53%) was obtained in accordance with the same preparation method of Example 5 with 4-chloro-5-nitroquinolin-8-ol (2) (100.0 mg, 0.44 mmol) and 2-methylpiperazine (130.0 mg, 1.3 mmol).

$^1$H NMR (400 MHz, DMSO-d$_6$) δ 8.57 (d, J=4.0 Hz, 1H), 8.00-7.90 (m, 1H), 7.25 (d, J=8.0 Hz, 2H), 6.78 (d, J=8.0 Hz, 1H), 3.30-3.19 (m, 7H), 2.96-2.75 (m, 3H).

MS calculated: 288.12; MS measured: 289.1 [M+H]$^+$.

Example 21: Synthesis of 4-(azetidin-1-yl)-5-nitroquinolin-8-ol (21)

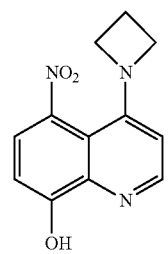

-continued

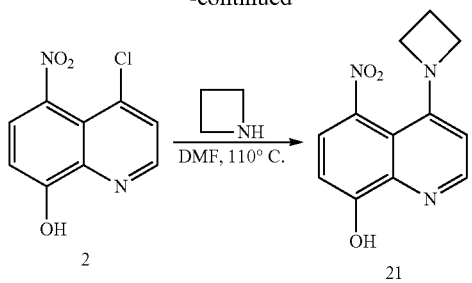

4-(Azetidin-1-yl)-5-nitroquinolin-8-ol (21) (42.0 mg, yield 39%) was obtained in accordance with the same preparation method of Example 5 with 4-chloro-5-nitroquinolin-8-ol (2) (100.0 mg, 0.44 mmol) and azetidine (68.0 mg, 1.2 mmol).

$^1$H NMR (400 MHz, DMSO-$d_6$) δ 8.26 (d, J=8.0 Hz, 1H), 8.20 (d, J=8.0 Hz, 1H), 7.35 (d, J=8.0 Hz, 1H), 6.66 (d, J=8.0 Hz, 1H), 4.31 (t, J=7.6 Hz, 4H), 2.36 (p, J=7.6 Hz, 2H).

MS calculated: 245.08; MS measured: 246.1 [M+H]$^+$.

Example 22: Synthesis of ethyl 4-(8-hydroxy-5-nitroquinolin-4-yl)piperazine-1-carboxylate (22)

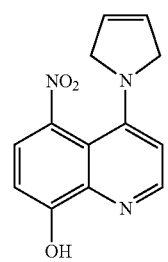

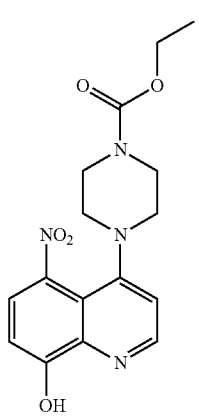

Ethyl 4-(8-hydroxy-5-nitroquinolin-4-yl)piperazine-1-carboxylate (22) (12.0 mg, yield 10%) was obtained in accordance with the same preparation method of Example 5 with 4-chloro-5-nitroquinolin-8-ol (2) (80.0 mg, 0.35 mmol) and ethyl 1-piperazinecarboxylate (110.0 mg, 0.70 mmol).

$^1$H NMR (400 MHz, DMSO-$d_6$) δ 8.64 (d, J=4.0 Hz, 1H), 7.99 (d, J=8.0 Hz, 1H), 7.67-7.20 (m, 1H), 6.88 (d, J=8.0 Hz, 1H), 4.15-4.03 (m, 2H), 3.90-3.72 (m, 2H), 3.25-3.22 (m, 2H), 3.14-3.02 (m, 2H), 3.00-2.89 (m, 2H), 1.19 (t, J=7.2 Hz, 3H).

MS calculated: 346.13; MS measured: 347.1 [M+H]$^+$.

Example 23: Synthesis of 4-(2,5-dihydro-1H-pyrrol-1-yl)-5-nitroquinolin-8-ol (23)

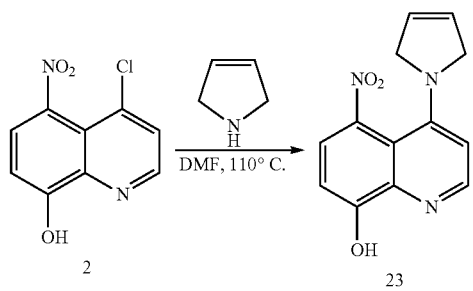

4-(2,5-Dihydro-1H-pyrrol-1-yl)-5-nitroquinolin-8-ol (23) (58.0 mg, yield 64%) was obtained in accordance with the same preparation method of Example 5 with 4-chloro-5-nitroquinolin-8-ol (2) (80.0 mg, 0.35 mmol) and 2,5-dihydro-1H-pyrrole (74.0 mg, 1.06 mmol).

$^1$H NMR (400 MHz, DMSO-$d_6$) δ 8.22 (d, J=8.0 Hz, 1H), 8.08 (d, J=4.0 Hz, 1H), 6.90 (d, J=4.0 Hz, 1H), 6.26 (d, J=8.0 Hz, 1H), 5.94 (s, 2H), 4.26 (s, 4H).

MS calculated: 257.08; MS measured: 258.1 [M+H]$^+$.

Example 24: Synthesis of 4-cyclopentyl-5-nitroquinolin-8-ol (24)

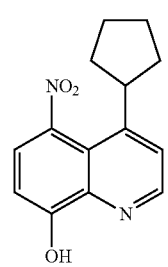

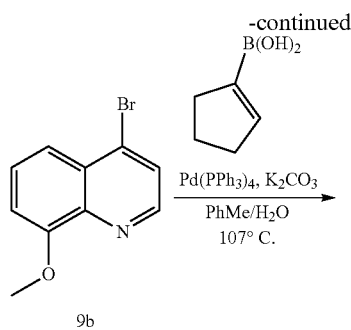
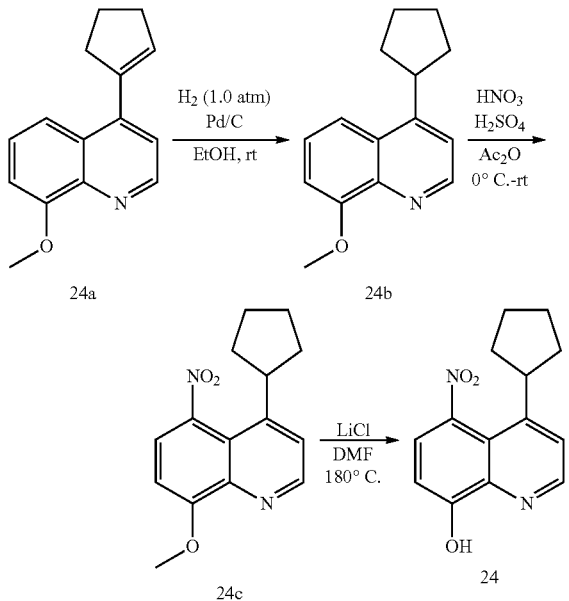

Step 1) Preparation of 4-(cyclopent-1-en-1-yl)-8-methoxyquinoline (24a)

4-Bromo-8-methoxyquinoline (9b) (400.0 mg, 1.68 mmol), 1-cyclopenteneboronic acid (376.0 mg, 3.36 mmol), tetrakistriphenylphosphine palladium (388.0 mg, 0.336 mmol) and potassium carbonate (695.0 mg, 5.04 mmol) were added to a mixture of toluene (5.0 mL) and water (0.5 mL) successively at room temperature. The reaction mixture was stirred at 107° C. for 3 hours, cooled to room temperature, and extracted with ethyl acetate (100.0 mL×3). The organic phases were combined, dried over anhydrous sodium sulfate and filtered, and the filtrate was concentrated under reduced pressure. The residues were purified by silica gel column chromatography (eluent: petroleum ether/ethyl acetate=3/1) to obtain 4-(cyclopent-1-en-1-yl)-8-methoxyquinoline (24a) (330.0 mg, yield 87%).

Step 2) Preparation of 4-cyclopentyl-8-methoxyquinoline (24b)

Pd/C (200.0 mg) was added to a solution (16.0 mL) of 4-(cyclopent-1-en-1-yl)-8-methoxyquinoline (24a) (330.0 mg, 1.46 mmol) in ethanol at room temperature. The reaction mixture was stirred under a hydrogen atmosphere for 3 hours, and filtered under reduced pressure. The filtrate was concentrated under reduced pressure to obtain 4-cyclopentyl-8-methoxyquinoline (24b) (300.0 mg, yield 90%).

Step 3) Preparation of 4-cyclopentyl-8-methoxy-5-nitroquinoline (24c)

Nitric acid (65 wt. %) (3.0 mL) was slowly added to a solution (5.0 mL) of 4-cyclopentyl-8-methoxyquinoline (24b) (300.0 mg, 1.32 mmol) in acetic anhydride at 0° C. The reaction solution was stirred for 10 minutes, then concentrated sulfuric acid (0.5 mL) was slowly added dropwise. The reaction solution was warmed up to room temperature and stirred for 2 hours, followed by addition of ice water (15.0 mL). The aqueous phase was adjusted to about pH 9 with aqueous ammonia, and extracted with dichloromethane (50.0 mL×2). The organic phases were combined, dried over anhydrous sodium sulfate and filtered, and the filtrate was concentrated under reduced pressure. The residues were purified by silica gel column chromatography (eluent: petroleum ether/ethyl acetate=7/3) to obtain 4-cyclopentyl-8-methoxy-5-nitroquinoline (24c) (70.0 mg, yield 20%).

Step 4) Preparation of 4-cyclopentyl-5-nitroquinolin-8-ol (24)

4-Cyclopentyl-8-methoxy-5-nitroquinoline (24c) (70.0 mg, 0.26 mmol) and lithium chloride (105.0 mg, 2.5 mmol) were added to N,N-dimethylformamide (3.0 mL) at room temperature. The reaction solution was stirred at 180° C. for 1 hour, cooled to room temperature, and concentrated under reduced pressure to remove the organic solvent. The residues were added with water (3.0 mL), stirred for 3 minutes, and filtered under reduced pressure. The filter cake was washed with water (0.5 mL×2), and dried under vacuum to obtain 4-cyclopentyl-5-nitroquinolin-8-ol (24) (27.0 mg, yield 41%). $^1$H-NMR (400 Hz, DMSO-$d_6$) δ: 8.92-8.83 (m, 1H), 8.11-8.04 (m, 1H), 7.81-7.84 (m, 1H), 3.10-3.04 (m, 1H), 2.13-2.00 (m, 2H), 1.87-1.53 (m, 6H).

MS calculated: 258.10; MS measured: 259.1 [M+H]$^+$.

Example 25: Synthesis of 4-cyclohexyl-5-nitroquinolin-8-ol (25)

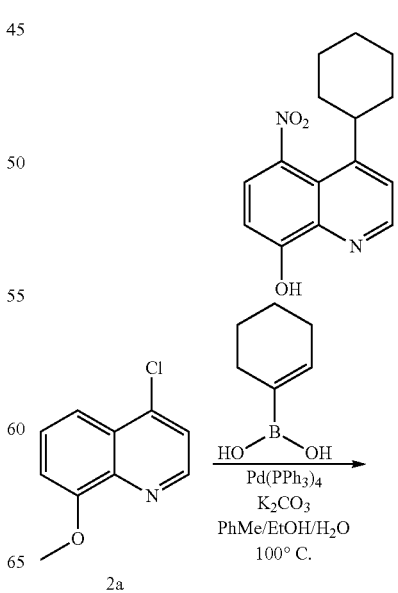

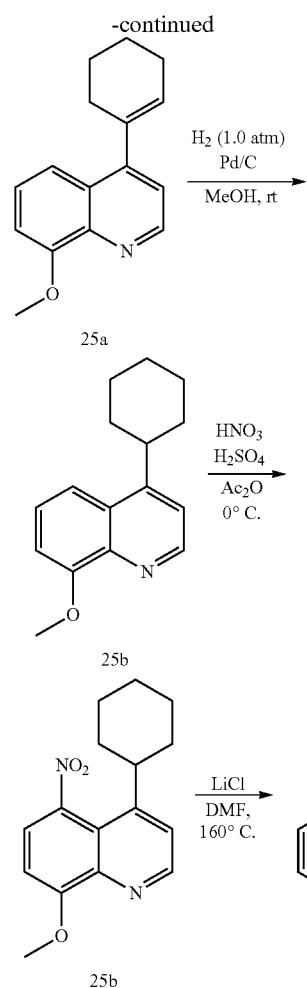

Step 1) Preparation of 4-cyclohexenyl-8-methoxyquinoline (25a)

4-Chloro-8-methoxyquinoline (2a) (1.0 g, 5.2 mmol), cyclohexenylboronic acid (0.975 g, 7.7 mmol), tetrakis(triphenylphosphine)palladium (0.600 g, 0.50 mmol) and potassium carbonate (1.5 g, 11.0 mmol) were dissolved in a mixed solvent of toluene (10.0 mL), ethanol (1.0 mL) and water (2.0 mL) at room temperature. The reaction solution was warmed up to 100° C. and stirred for 12 hours, cooled to room temperature, and diluted with water (20.0 mL). The resulting mixture was extracted with ethyl acetate (100.0 mL×2). The organic phases were combined, dried over anhydrous sodium sulfate and filtered, and the filtrate was concentrated under reduced pressure. The residues were purified by silica gel column chromatography (eluent: petroleum ether/ethyl acetate=1/1) to obtain 4-cyclohexenyl-8-methoxyquinoline (1.1 g, yield 89%).

Step 2) Preparation of 4-cyclohexyl-8-methoxyquinoline (25b)

4-Cyclohexenyl-8-methoxyquinoline (25a) (850.0 mg, 3.5 mmol) was dissolved in methanol (20.0 mL) at room temperature, followed by addition of Pd/C (85.0 mg). The resulting suspension was stirred under a hydrogen atmosphere for 3 hours, and filtered under reduced pressure. The filter cake was washed with ethyl acetate (10.0 mL×3). The filtrate was concentrated under reduced pressure to obtain 4-cyclohexyl-8-methoxyquinoline (25b) (850.0 mg, yield 99%).

Step 3) Preparation of 4-cyclohexyl-5-nitro-8-methoxyquinoline (25c)

Nitric acid (65 wt. %) (1.0 mL) was slowly added to a solution (5.0 mL) of 4-cyclohexyl-8-methoxyquinoline (25b) (800.0 mg, 3.3 mmol) in acetic anhydride at 0° C. The reaction solution was stirred for 10 minutes, then concentrated sulfuric acid (0.5 mL) was slowly added dropwise. The reaction solution was stirred at 0° C. for 1 hour, followed by diluting with water (20.0 mL). The aqueous phase was slowly adjusted to about pH 9-10 with aqueous ammonia, and extracted with ethyl acetate (30.0 mL×3). The organic phases were combined, dried over anhydrous sodium sulfate and filtered, and the filtrate was concentrated under reduced pressure. The residues were purified by silica gel column chromatography (eluent: petroleum ether/ethyl acetate=1/1) to obtain 4-cyclohexyl-5-nitro-8-methoxyquinoline (25c) (500.0 mg, yield 53%).

Step 4) Preparation of 4-cyclohexyl-5-nitroquinolin-8-ol (25)

4-Cyclohexyl-5-nitro-8-methoxyquinoline (25c) (500.0 mg, 1.7 mmol) and lithium chloride (740.0 mg, 17.0 mmol) were added to N,N-dimethylformamide (10.0 mL) at room temperature. The reaction solution was stirred at 160° C. for 1 hour, cooled to room temperature, and concentrated under reduced pressure to remove the organic solvent. The residues were added with water (5.0 mL), stirred for 3 minutes, and filtered under reduced pressure. The filter cake was washed with water (3.0 mL×2), and dried under vacuum to obtain 4-cyclohexyl-5-nitroquinolin-8-ol (25) (221 mg, yield 48%).

$^1$H NMR (400 MHz, DMSO-d$_6$) δ 8.58 (d, J=4.0 Hz, 1H), 8.11 (d, J=8.0 Hz, 1H), 7.54 (d, J=4.0 Hz, 1H), 6.37 (d, J=8.0 Hz, 1H), 2.62-2.54 (m, 1H), 1.83-1.74 (m, 4H), 1.48-1.37 (m, 2H), 1.30-1.21 (m, 4H).

MS calculated: 272.12; MS measured: 273.1 [M+H]$^+$.

Example 26: Synthesis of 5-nitro-4-trifluoromethylquinolin-8-ol (26)

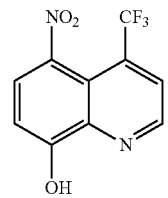

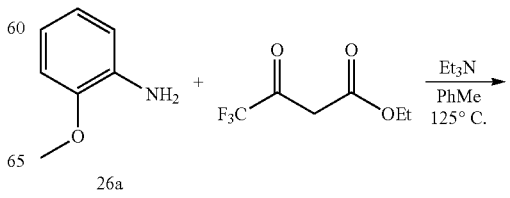

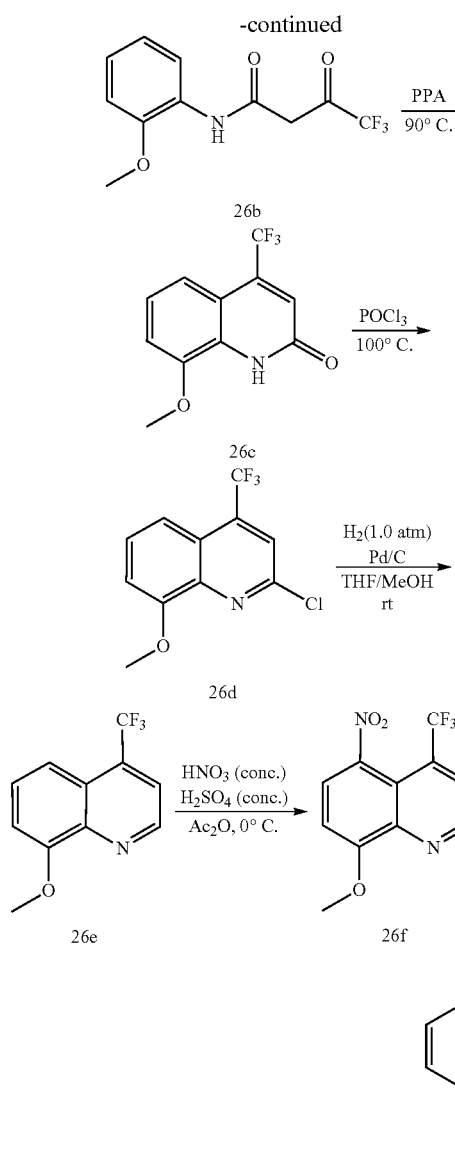

Step 1) Preparation of 4,4,4-trifluoro-N-(2-methoxyphenyl)-3-oxobutanamide (26b)

o-Methoxyaniline (26a) (2.36 g, 19.2 mmol), ethyl 4,4,4-trifluoroacetoacetate (2.95 g, 16.0 mmol) and triethylamine (3.24 g, 32.0 mmol) were dissolved in toluene (16.0 mL) at room temperature. The reaction solution was stirred at 125° C. for 4 hours, cooled to room temperature, and concentrated under reduced pressure to remove the organic solvent. The resulting residues were dissolved in dichloromethane (50.0 mL), and washed with hydrochloric acid (2.0 M) (15.0 mL×2), saturated aqueous sodium bicarbonate solution (20.0 mL) and water (15.0 mL) successively. The organic phase was dried over anhydrous sodium sulfate and filtered, and the filtrate was concentrated under reduced pressure to obtain the crude product 4,4,4-trifluoro-N-(2-methoxyphenyl)-3-oxobutanamide (26b) (3.48 g, crude yield 78%), which was used directly in the next step without purification.

Step 2) Preparation of 8-methoxy-4-trifluoromethyl-2(1H)-quinolinone (26c)

4,4,4-Trifluoro-N-(2-methoxyphenyl)-3-oxobutanamide (26b) (2.81 g, 10.7 mmol) was dissolved in polyphosphoric acid (14.0 g) at 90° C. The reaction solution was stirred at 90° C. for 3 hours, followed by diluting with water (100.0 mL) until the polyphosphoric acid was completely dissolved. The resulting mixture was extracted with dichloromethane (40.0 mL×3). The organic phases were combined, washed with saturated aqueous sodium bicarbonate (30.0 mL×3), dried over anhydrous sodium sulfate and filtered, and the filtrate was concentrated under reduced pressure. The resulting residues were purified by silica gel column chromatography (eluent: petroleum ether/ethyl acetate=40/1) to obtain 8-methoxy-4-trifluoromethyl-2(1H)-quinolinone (26c) (2.21 g, yield 84%).

Step 3) Preparation of 2-chloro-8-methoxy-4-trifluoromethylquinoline (26d)

8-Methoxy-4-trifluoromethyl-2(1H)-quinolinone (26c) (2.09 g, 8.6 mmol) was added to phosphorus oxychloride (8.6 mL) at room temperature. The resulting mixture was stirred at 100° C. for 2 hours, cooled to room temperature, and diluted with dichloromethane (40.0 mL). The pH of the aqueous phase was adjusted to about 9 to 10 with saturated sodium carbonate aqueous solution. The organic phase was separated, and the aqueous phase was extracted with dichloromethane (15.0 mL×2). The combined organic phases were washed with saturated aqueous sodium carbonate (25.0 mL), water (25.0 mL) and saturated brine (25.0 mL) successively. The organic phase was dried over anhydrous sodium sulfate and filtered, and the filtrate was concentrated under reduced pressure to obtain the crude product 2-chloro-8-methoxy-4-trifluoromethylquinoline (26d) (2.26 g, crude yield 100%), which was used directly in the next step without purification.

Step 4) Preparation of 8-methoxy-4-trifluoromethylquinoline (26e)

2-Chloro-8-methoxy-4-trifluoromethylquinoline (26d) (0.52 g, 2.0 mmol) was dissolved in a mixed solvent of tetrahydrofuran (10.0 mL) and methanol (10.0 mL) at room temperature, followed by addition of Pd/C (0.21 g). The resulting mixture was stirred under a hydrogen atmosphere for 1 hour, filtered through celite, and the filter cake was washed with a mixed solvent of dichloromethane and methanol (dichloromethane/methanol=20/1, 30.0 mL). The filtrate was concentrated under reduced pressure. The resulting residues were dissolved in dichloromethane (20.0 mL), washed with saturated sodium bicarbonate aqueous solution (10.0 mL×2), dried over anhydrous sodium sulfate and filtered, and the filtrate was concentrated under reduced pressure. The resulting residues were purified by silica gel column chromatography (eluent: petroleum ether/ethyl acetate=3/1) to obtain 8-methoxy-4-trifluoromethylquinoline (26e) (0.38 g, yield 84%).

Step 5) Preparation of 8-methoxy-5-nitro-4-trifluoromethylquinoline (26f)

Nitric acid (65 wt. %) (0.69 mL, 10.0 mmol) was slowly added dropwise to a solution of 8-methoxy-4-trifluoromethylquinoline (26e) (0.38 g, 1.7 mmol) in acetic anhydride (5.0 mL) at 0° C. The reaction solution was stirred for 10 minutes, then sulfuric acid (98 wt. %) (0.12 mL, 2.2 mmol) was slowly added dropwise and stirred for 30 minutes. The aqueous phase was adjusted to about pH 10 with aqueous sodium hydroxide solution (1.0 M), and extracted with dichloromethane (10.0 mL×3). The combined organic phases were dried over anhydrous sodium sulfate and filtered, and the filtrate was concentrated under reduced pressure. The resulting residues were purified by silica gel column chromatography (eluent: petroleum ether/ethyl acetate=2/1) to obtain 8-methoxy-5-nitro-4-trifluoromethylquinoline (26f) (0.36 g, yield 78%).

Step 6) Preparation of
5-nitro-4-trifluoromethylquinolin-8-ol (26)

8-Methoxy-5-nitro-4-trifluoromethylquinoline (26f) (0.36 g, 1.32 mmol) and lithium chloride (0.56 g, 13.2 mmol) were added to N,N-dimethylformamide (1.7 mL) at room temperature. The resulting mixture was stirred at 170° C. for 1 hour, cooled to room temperature, and concentrated under reduced pressure to remove the organic solvent. The resulting residues were added with water (1.5 mL), stirred for 3 minutes, and filtered under reduced pressure. The filter cake was washed with water (0.5 mL×2), and dried under vacuum to obtain 5-nitro-4-trifluoromethylquinolin-8-ol (26) (0.29 g, yield 85%).

$^1$H NMR (400 MHz, DMSO-$d_6$) δ 8.92 (d, J=3.2 Hz, 1H), 8.29 (d, J=9.2 Hz, 1H), 8.01 (d, J=4.0 Hz, 1H), 6.59 (d, J=9.2 Hz, 1H).

MS calculated: 258.03; MS measured: 259.0 [M+H]$^+$.

Example 27: Synthesis of
4-cyano-5-nitroquinolin-8-ol (27)

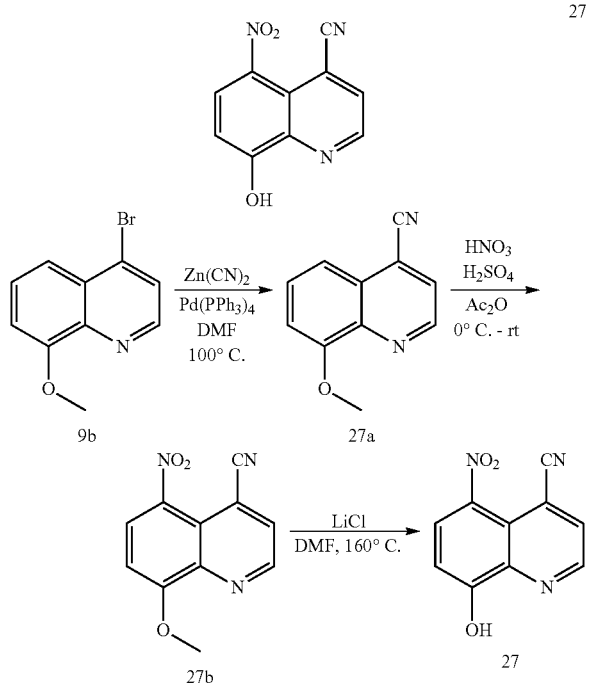

Step 1) Preparation of 4-cyano-8-methoxyquinoline
(27a)

Zinc cyanide (788.0 mg, 6.71 mmol) and tetrakistriphenylphosphine palladium (728.0 mg, 0.63 mmol) were added to a solution of 4-bromo-8-methoxyquinoline (9b) (1.0 g, 4.2 mmol) in N,N-dimethylformamide (15.0 mL) at room temperature. The reaction solution was stirred at 100° C. for 2.5 hours under a nitrogen atmosphere, cooled to room temperature, and filtered under reduced pressure. The filtrate was concentrated under reduced pressure, and the resulting residues were dissolved in dichloromethane (15.0 mL) and water (15.0 mL). The organic phase was separated, washed with saturated brine (10.0 mL), dried over anhydrous sodium sulfate and filtered, and the filtrate was concentrated under reduced pressure. Ethyl acetate (5.0 mL) was added to the residues, stirred for 3 minutes, and filtered under reduced pressure. The filter cake was dried under vacuum to obtain 4-cyano-8-methoxyquinoline (27a) (650.0 mg, yield 84%).

Step 2) Preparation of
4-cyano-5-nitro-8-methoxyquinoline (27b)

Nitric acid (65 wt. %) (0.45 mL, 6.52 mmol) was slowly added to a suspension of 4-cyano-8-methoxyquinoline (27a) (200.0 mg, 1.08 mmol) in acetic anhydride (5.0 mL) at 0° C. The reaction mixture was stirred at 0° C. for 10 minutes, then sulfuric acid (98 wt. %) (0.1 mL, 1.87 mmol) was slowly added dropwise and stirred for 30 minutes. The aqueous phase was adjusted to about pH 10 with aqueous sodium hydroxide solution (1.0 M). Dichloromethane (10.0 mL) was added. The organic phase was separated, washed with saturated brine (5.0 mL), dried over anhydrous sodium sulfate and filtered, and the filtrate was concentrated under reduced pressure. The residues were purified by silica gel column chromatography (eluent: petroleum ether/ethyl acetate=4/1) to obtain 4-cyano-5-nitro-8-methoxyquinoline (27b) (205.0 mg, yield 82%).

Step 3) Preparation of 4-cyano-5-nitroquinolin-8-ol
(27)

4-Cyano-5-nitro-8-methoxyquinoline (27b) (100.0 mg, 0.44 mmol) and lithium chloride (184.0 mg, 4.4 mmol) were added to N,N-dimethylformamide (2.0 mL) at room temperature. The reaction solution was stirred at 160° C. for 30 minutes, cooled to room temperature, and concentrated under reduced pressure to remove the organic solvent. The residues were added with water (2.0 mL), stirred for 3 minutes, and filtered under reduced pressure. The filter cake was washed successively with ethanol (2.0 mL) and water (2.0 mL), and dried under vacuum to obtain 4-cyano-5-nitroquinolin-8-ol (27) (91.0 mg, yield 97%).

$^1$H NMR (400 MHz, DMSO-$d_6$) δ 8.69 (d, J=4.4 Hz, 1H), 8.32 (d, J=9.8 Hz, 1H), 8.02 (d, J=4.4 Hz, 1H), 6.30 (d, J=9.8 Hz, 1H).

MS calculated: 215.03; MS measured: 216.1 [M+H]$^+$.

Example 28: Synthesis of 3-(8-hydroxy-5-nitroquinolin-4-yl)acrylic acid (28)

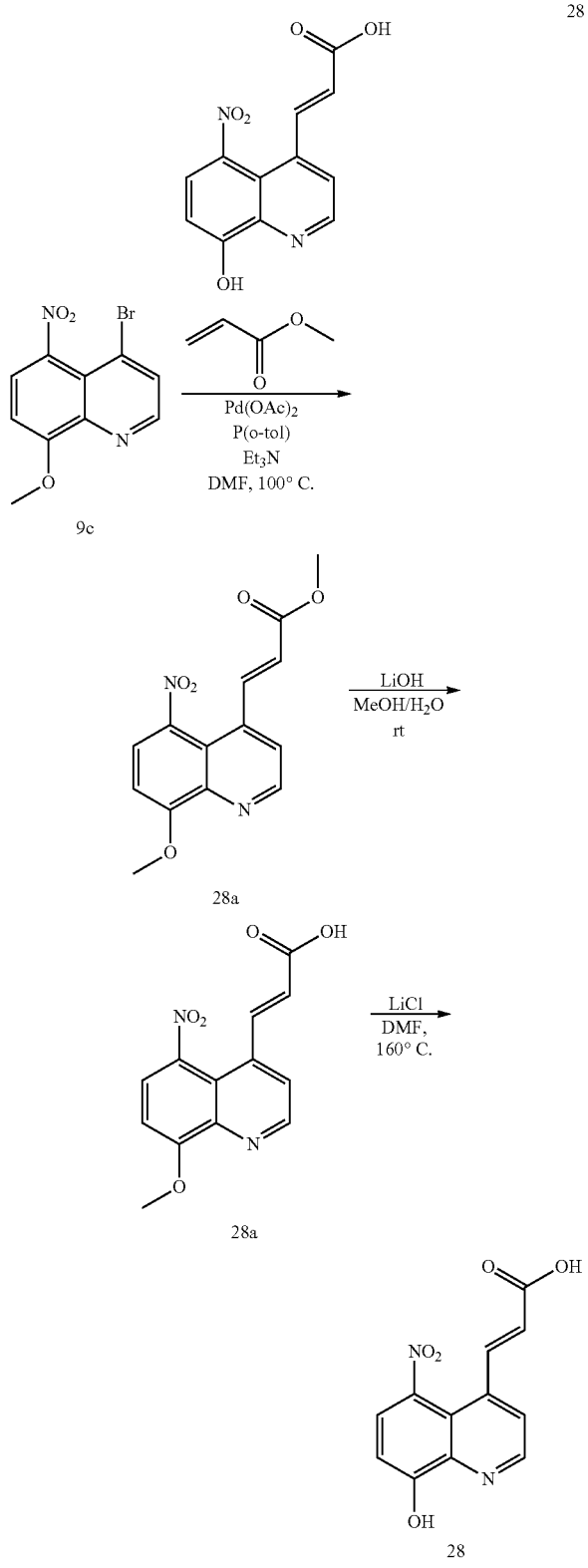

Step 1) Preparation of methyl 3-(8-methoxy-5-nitroquinolin-4-yl)acrylate (28a)

4-Bromo-5-nitro-8-methoxyquinoline (9c) (900.0 mg, 3.2 mmol), methyl acrylate (0.80 mL, 8.9 mmol), palladium acetate (72.0 mg, 0.32 mmol), tris(o-methylphenyl)phosphine (144.0 mg, 0.47 mmol) and triethylamine (1.35 mL, 9.7 mmol) were added to N,N-dimethylformamide (18.0 mL) at room temperature. The reaction solution was stirred at 100° C. for 12 hours, cooled to room temperature, and concentrated under reduced pressure to remove the organic solvent. The resulting residues were purified by silica gel column chromatography (eluent: petroleum ether/ethyl acetate=1/1.5) to obtain methyl 3-(8-methoxy-5-nitroquinolin-4-yl)acrylate (28a) (486.0 mg, yield 53%).

Step 2) Preparation of 3-(8-methoxy-5-nitroquinolin-4-yl)acrylic acid (28b)

Methyl 3-(8-methoxy-5-nitroquinolin-4-yl)acrylate (28a) (486.0 mg, 1.7 mmol) and lithium hydroxide (60.6 mg, 2.53 mmol) were dissolved in a mixture of methanol (14.0 mL) and water (3.5 mL) at room temperature. The reaction solution was stirred at room temperature for 12 hours, and concentrated under reduced pressure to remove the organic solvent. The residues were adjusted to about pH 4 with aqueous hydrochloric acid (1.0 M), followed by addition of dichloromethane (5.0 mL). The solution was stirred for 15 minutes and filtered under reduced pressure. The filter cake was dried under vacuum to obtain 3-(8-methoxy-5-nitroquinolin-4-yl)acrylic acid (28b) (303.0 mg, yield 75%).

Step 3) Preparation of 3-(8-hydroxy-5-nitroquinolin-4-yl)acrylic acid (28)

3-(8-Methoxy-5-nitroquinolin-4-yl)acrylic acid (28b) (70.0 mg, 0.26 mmol) and lithium chloride (107.0 mg, 2.55 mmol) were added to N,N-dimethylformamide (2.0 mL) at room temperature. The reaction solution was stirred at 160° C. for 40 minutes, cooled to room temperature, and concentrated under reduced pressure to remove the organic solvent. The residues were added with water (3.0 mL), stirred for 3 minutes, and filtered under reduced pressure. The filtrate was concentrated under reduced pressure, and the resulting residues were purified by C18 reverse phase column liquid chromatography (the chromatographic column was Eclipse XDB-C18 (21.2 mm×250 mm, 7 μm), the mobile phase was water/methanol=100%-75%/25%, gradient elution, the flow rate was 20.0 mL/min), and dried under vacuum to obtain 3-(8-hydroxy-5-nitroquinolin-4-yl)acrylic acid (28) (26.1 mg, yield 39%).

$^1$H NMR (400 MHz, DMSO-$d_6$) δ 8.95-8.84 (m, 1H), 8.26 (d, J=9.0 Hz, 1H), 7.88 (d, J=4.4 Hz, 1H), 7.52 (d, J=15.7 Hz, 1H), 6.44 (d, J=15.7 Hz, 1H).

MS calculated: 260.04; MS measured: 261.1 [M+H]$^+$.

Example 29: Synthesis of 3-(8-hydroxy-5-nitroquinolin-4-yl)-N-acryloylmorpholine (29)

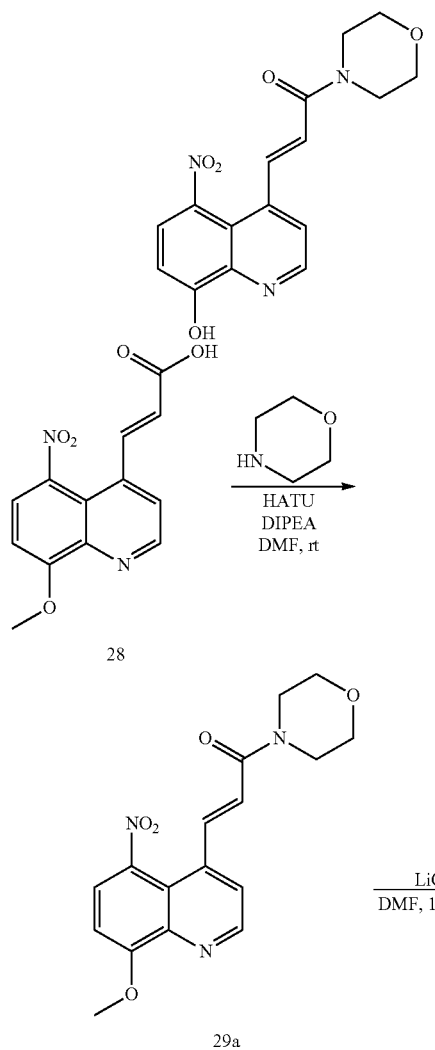

Step 1) Preparation of 3-(8-methoxy-5-nitroquinolin-4-yl)-N-acryloylmorpholine (29a)

3-(8-Methoxy-5-nitroquinolin-4-yl)acrylic acid (28) (100.0 mg, 0.36 mmol), morpholine (48.0 mg, 0.55 mmol), HATU (209.0 mg, 0.55 mmol) and DIPEA (0.20 mL, 1.08 mmol) were added to DMF (1.5 mL) at room temperature. The reaction solution was stirred at room temperature for 16 hours, and concentrated under reduced pressure to remove the organic solvent. Ethyl acetate (10.0 mL) and saturated aqueous sodium bicarbonate solution (10.0 mL) were added to the residues. The organic phase was separated, washed with saturated brine (5.0 mL), dried over anhydrous sodium sulfate and filtered, and the filtrate was concentrated under reduced pressure. The residues were purified by silica gel column chromatography (dichloromethane/ethyl acetate=100% dichloromethane—100% ethyl acetate, gradient elution) to obtain 3-(8-methoxy-5-nitroquinolin-4-yl)-N-acryloylmorpholine (29a) (115.0 mg, yield 92%).

Step 2) Preparation of 3-(8-hydroxy-5-nitroquinolin-4-yl)-N-acryloylmorpholine (29)

3-(8-Methoxy-5-nitroquinolin-4-yl)-N-acryloylmorpholine (29a) (87.0 mg, 0.25 mmol) and lithium chloride (106.0 mg, 2.5 mmol) were added to N,N-dimethylformamide (3.0 mL) at room temperature. The reaction solution was stirred at 160° C. for 45 minutes, cooled to room temperature, and concentrated under reduced pressure to remove the organic solvent. The residues were dissolved in water (3.0 mL), purified by C18 reverse phase column liquid chromatography (the chromatographic column was Eclipse XDB-C18 (21.2 mm×250 mm, 7 μm), the mobile phase was water/methanol=100%–75%/25%, gradient elution) to obtain 3-(8-hydroxy-5-nitroquinolin-4-yl)-N-acryloylmorpholine (29) (50.0, yield 45%).

$^1$H NMR (400 MHz, DMSO-$d_6$) δ 8.59 (d, J=4.5 Hz, 1H), 8.23 (d, J=9.5 Hz, 1H), 7.79 (d, J=4.6 Hz, 1H), 7.32 (d, J=15.2 Hz, 1H), 7.13 (d, J=15.2 Hz, 1H), 6.22 (d, J=9.6 Hz, 1H), 3.61 (t, J=21.9 Hz, 8H).

MS calculated: 329.31; MS measured: 330.1 [M+H]$^+$.

Example 30: Synthesis of 3-(8-hydroxy-5-nitroquinolin-4-yl)-N-(4-methoxybenzyl)acrylamide (30)

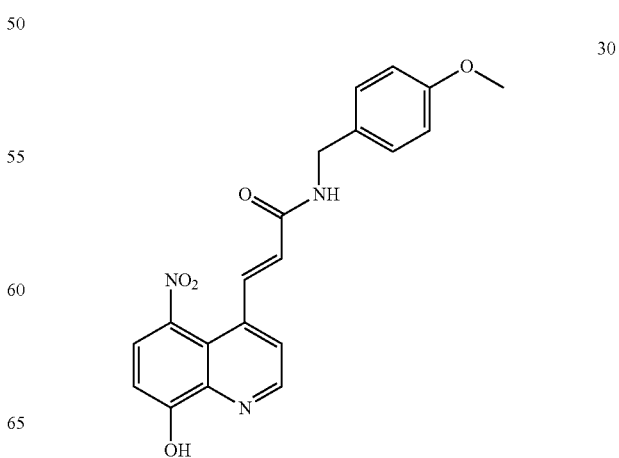

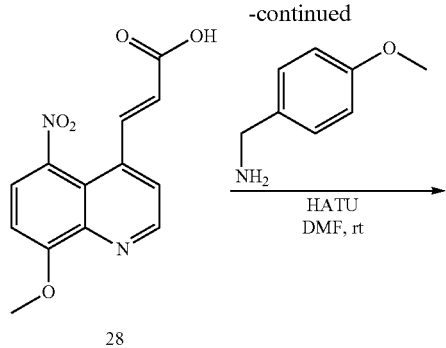
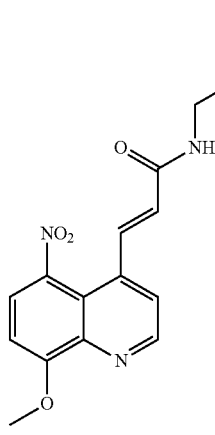
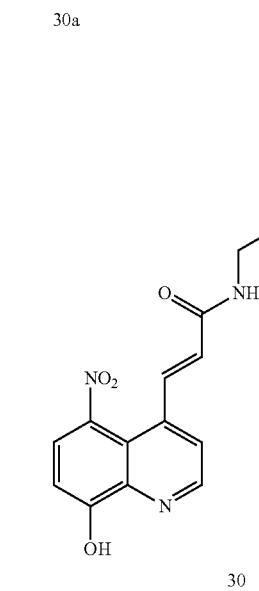

3-(8-Methoxy-5-nitroquinolin-4-yl)-N-(4-methoxybenzyl)acrylamide (30) (34.3 mg, yield 26%) was obtained in accordance with the same preparation method of Example 29 with 3-(8-methoxy-5-nitroquinolin-4-yl)acrylic acid (28) (100.0 mg, 0.36 mmol) and (4-methoxyphenyl)methylamine (75.5 mg, 0.55 mmol) as the starting materials.

$^1$H NMR (400 MHz, DMSO-$d_6$) δ 8.64-8.55 (m, 2H), 8.25 (d, J=9.5 Hz, 1H), 7.58 (d, J=4.6 Hz, 1H), 7.31 (d, J=15.6 Hz, 1H), 7.25 (d, J=8.6 Hz, 2H), 6.93 (d, J=8.6 Hz, 2H), 6.53 (d, J=15.6 Hz, 1H), 6.23 (d, J=9.6 Hz, 1H), 4.34 (d, J=5.7 Hz, 2H), 3.76 (s, 3H).

MS calculated: 379.12; MS measured: 380.2 [M+H]$^+$.

Example 31: Synthesis of ethyl 8-hydroxy-5-nitroquinoline-4-carboxylate (31)

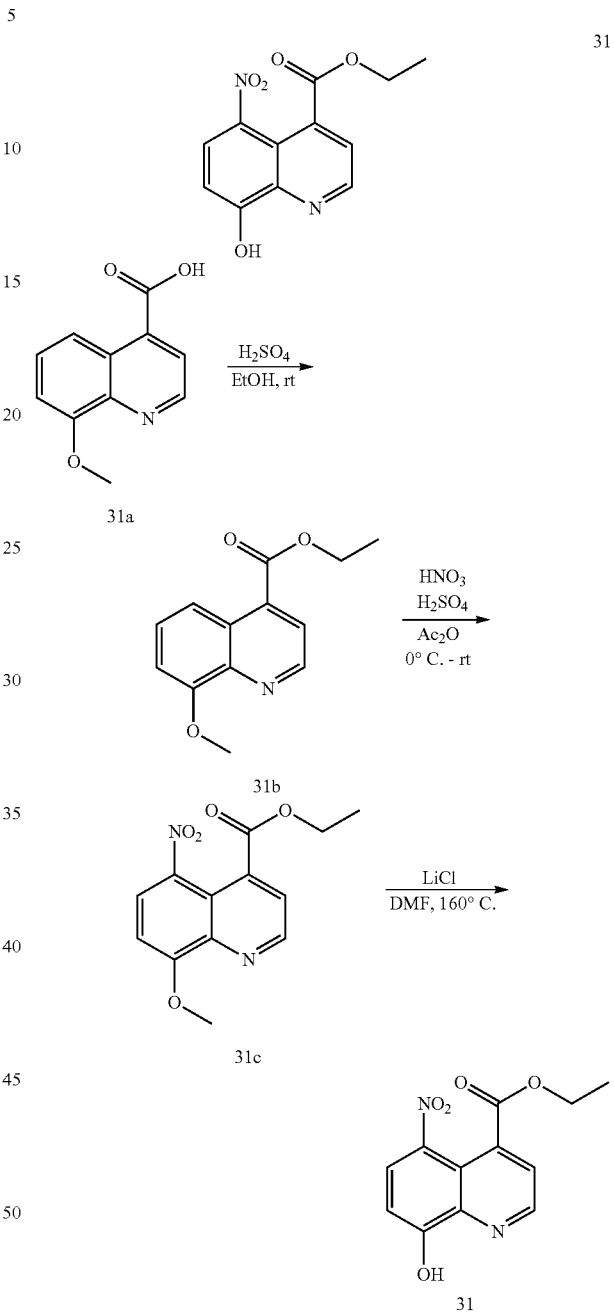

Step 1) Preparation of ethyl 8-methoxyquinoline-4-carboxylate (31a)

Sulfuric acid (98 wt. %) (0.6 mL) was slowly added to a solution of 8-methoxyquinoline-4-carboxylic acid (31a) (385.0 mg, 1.89 mmol) in ethanol (6.0 mL) at room temperature. The reaction solution was heated to 90° C. and stirred for 16 hours, cooled to room temperature, and concentrated under reduced pressure to remove the organic solvent. Ethyl acetate (10.0 mL) and saturated aqueous sodium carbonate solution (10.0 mL) were added to the residues, and the pH of the aqueous phase was adjusted to about 10. The organic phase was separated, washed with saturated brine (5.0 mL), dried over anhydrous sodium sulfate and filtered, and the filtrate was concentrated under reduced pressure. The residues were purified by silica gel column chromatography (eluent: petroleum ether/ethyl acetate=100%–65%/35%, gradient elution) to obtain ethyl 8-methoxyquinoline-4-carboxylate (31a) (247.0 mg, yield 56%).

Step 2) Preparation of ethyl 8-methoxy-5-nitroquinoline-4-carboxylate (31b)

Nitric acid (65 wt. %) (0.45 mL, 6.41 mmol) was slowly added to a suspension of ethyl 8-methoxyquinoline-4-carboxylate (31a) (247.0 mg, 1.07 mmol) in acetic anhydride (6.0 mL) at 0° C. The reaction solution was stirred at 0° C. for 10 minutes, then concentrated sulfuric acid (0.1 mL, 1.87 mmol) was slowly added and stirred for 50 minutes. Aqueous sodium hydroxide solution (1.0 M) was added to the reaction solution to adjust the pH value of the aqueous phase to about 8, followed by addition of dichloromethane (15.0 mL). The organic phase was separated, washed with saturated brine (10.0 mL), dried over anhydrous sodium sulfate and filtered, and the filtrate was concentrated under reduced pressure. The residues were purified by silica gel column chromatography (eluent: petroleum ether/ethyl acetate=100%–60%/40%, gradient elution) to obtain ethyl 8-methoxy-5-nitroquinoline-4-carboxylate (31b) (228.0 mg, yield 77%).

Step 3) Preparation of ethyl 8-hydroxy-5-nitroquinoline-4-carboxylate (31)

Ethyl 8-methoxy-5-nitroquinoline-4-carboxylate (31b) (228.0 mg, 0.82 mmol) and lithium chloride (347.0 mg, 8.2 mmol) were added to N,N-dimethylformamide (3.0 mL) at room temperature. The reaction solution was stirred at 160° C. for 35 minutes, cooled to room temperature, and concentrated under reduced pressure to remove the organic solvent. The residues were added with water (3.0 mL), stirred for 3 minutes, and filtered under reduced pressure. The filter cake was washed with water (1.0×2 mL), and dried under vacuum to obtain ethyl 8-hydroxy-5-nitroquinoline-4-carboxylate (31) (153.9 mg, yield 71%).

$^1$H NMR (400 MHz, DMSO-$d_6$) δ 8.82 (s, 1H), 8.31 (d, J=8.6 Hz, 1H), 7.76 (s, 1H), 6.50 (d, J=8.6 Hz, 1H), 4.24 (q, J=8 Hz, 2H), 1.26 (t, J=8 Hz, 3H).

MS calculated: 262.06; MS measured: 263.1 [M+H]$^+$.

Example 32: Synthesis of ethyl 8-hydroxy-5-nitroquinoline-3-carboxylate (32)

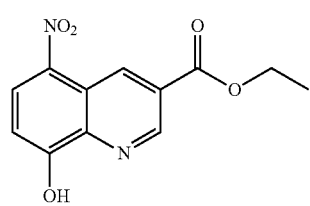

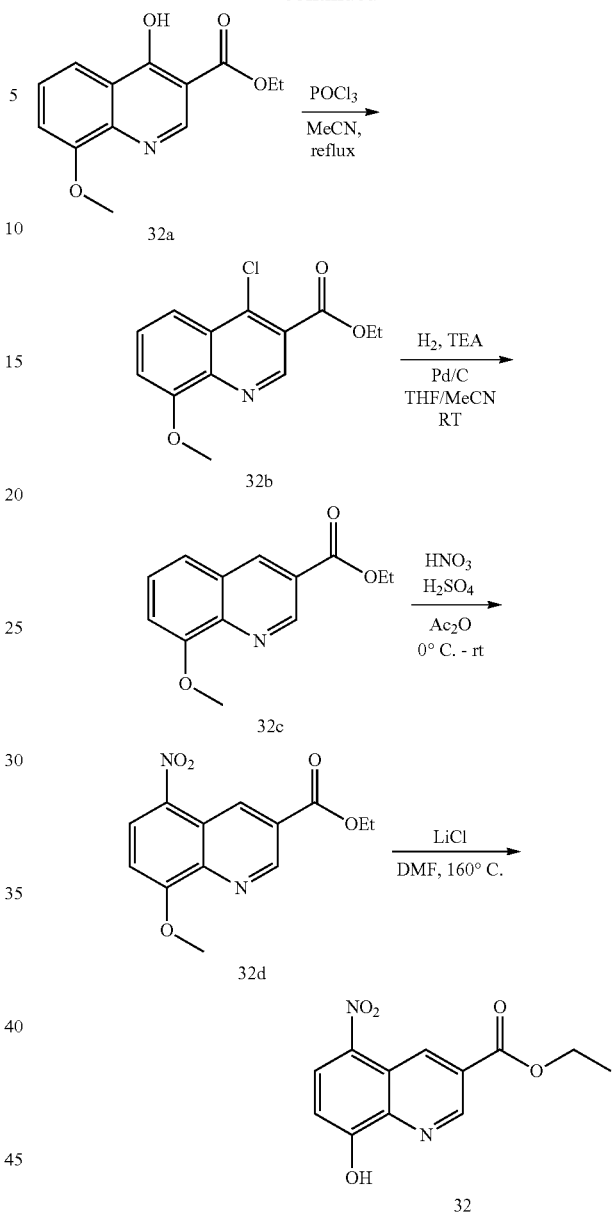

Step 1) Preparation of ethyl 8-methoxy-4-chloroquinoline-3-carboxylate (32b)

POCl$_3$ (3.72 g) was slowly added to a solution of ethyl 8-methoxy-4-hydroxyquinoline-3-carboxylate (32a) (2.0 g, 8.08 mmol) in acetonitrile (20.0 mL) at room temperature. The reaction solution was warmed up to 90° C. and stirred for 2.5 hours, cooled to room temperature, and diluted with 50 mL of dichloromethane. Triethylamine was added to the system to precipitate the solid. The mixture was pulped for 30 minutes and filtered. The filter cake was washed, and the filtrate was concentrated under reduced pressure. The residues were purified by silica gel column chromatography (eluent: petroleum ether/ethyl acetate=3:1) to obtain ethyl 8-methoxy-4-chloroquinoline-3-carboxylate (32b) (2.19 g, yield 97.7%).

Step 2) Preparation of ethyl 8-methoxy-quinoline-3-carboxylate (32c)

Ethyl 8-methoxy-4-chloroquinoline-3-carboxylate (32b) (2.1 g, 7.9 mmol), Pd/C (0.42 g, 10%), THF/MeOH=1:1 (20 mL) and 1.2 g of TEA were added to a reaction flask, and stirred well at room temperature. A hydrogenation reaction was carried out under a hydrogen atmosphere at room temperature for 2 hours. The reaction system was filtered with celite, and the filtrate was concentrated under reduced pressure to obtain a yellow oily product ethyl 8-methoxy-quinoline-3-carboxylate (32c) (1.89 g, 98.5%).

Step 3) Preparation of ethyl 8-methoxy-5-nitroquinoline-3-carboxylate (32d)

Ethyl 8-methoxy-quinoline-3-carboxylate (32c) (500.0 mg, 2.16 mmol) and Ac$_2$O (10 mL) were added to a reaction flask at room temperature, and stirred until clear. Concentrated HNO$_3$ was added dropwise at 0° C. and stirred for 5 minutes. Concentrated sulfuric acid was added dropwise to the system and stirred for 2 hours. The reaction system was added to saturated Na$_2$CO$_3$ solution to quench the reaction at 0° C., and the pH was adjusted to 8-9. The solution was extracted with DCM, dried and concentrated to obtain 550 mg of crude product. The crude product was purified by column chromatography to obtain ethyl 8-methoxy-5-nitro-quinoline-3-carboxylate (32d) (430 mg 72%).

Step 4) Preparation of ethyl 8-hydroxy-5-nitroquinoline-3-carboxylate (32)

N,N-dimethylformamide (2.5 mL) was added to ethyl 8-methoxy-5-nitroquinoline-3-carboxylate (32d) (100 mg, 0.36 mmol) and lithium chloride (153.0 mg, 3.6 mmol). The reaction solution was stirred at 160° C. for 45 minutes, cooled to room temperature, and concentrated under reduced pressure to remove the organic solvent. Water (3.0 mL) was added to the residue, stirred for 3 minutes, and filtered under reduced pressure. The filter cake was washed with water (1.0×2 mL), and dried under vacuum to obtain ethyl 8-hydroxy-5-nitroquinoline-3-carboxylate (32) (55 mg, yield 57.9%).

$^1$H NMR (400 MHz, DMSO-d$_6$) δ 10.04 (s, 1H), 8.46 (d, J=9.8 Hz, 1H), 9.03 (s, 1H), 6.33 (d, J=9.8 Hz, 1H), 4.42 (q, J=7 Hz, 2H), 1.38 (t, J=7.1 Hz, 3H).

MS calculated: 262.06; MS measured: 263.1 [M+H]$^+$.

Example 33: Synthesis of 8-hydroxy-6-isopropyl-5-nitroquinoline (33)

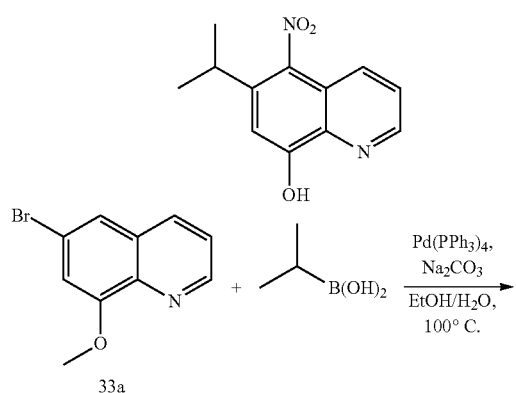

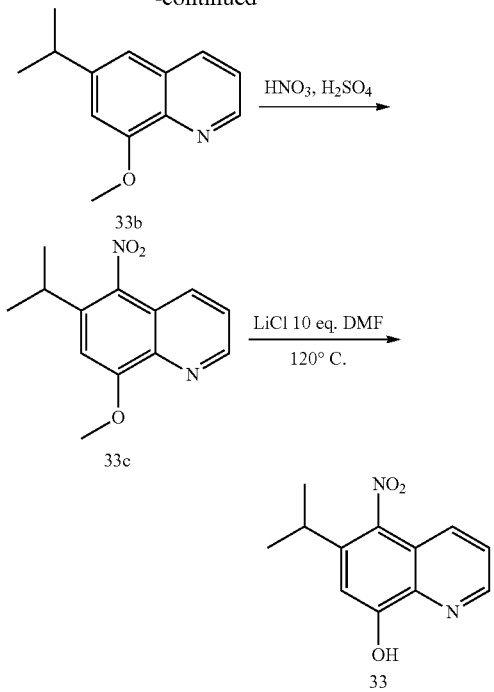

Step 1) Preparation of 8-methoxy-6-isopropyl-quinoline (33b)

8-Methoxy-6-bromo-quinoline (33a) (2.37 g, 10 mmol) was added into a 100 mL reaction flask at room temperature, followed by addition of isopropylboronic acid (880 mg, 10 mmol), Na$_2$CO$_3$ (2.12 g, 20 mmol) and EtOH/H$_2$O=40 mL/10 mL. The reaction solution was heated to 100° C. and stirred for 6 hours. The reaction solution was concentrated under reduced pressure and extracted with 50 mL of water and 50 mL of EA, and the organic phase was concentrated. The residues were purified by silica gel column chromatography (ethyl acetate/petroleum ether=90/10) to obtain the product 33b (1.4 g, 70%).

Step 2) Preparation of 8-methoxy-6-isopropyl-5-nitro-quinoline (33c)

8-Methoxy-6-isopropyl-quinoline (33b) (610 mg, 3 mmol) was added to 6 mL of concentrated sulfuric acid at 0-15° C., and stirred to dissolve. Concentrated nitric acid (900 mg, 64% wt, 9 mmol) was added slowly, and stirred at room temperature for 2 hour after completion of the addition. The reaction solution was slowly poured into 50 mL of ice water, adjusted to pH=7-8 with 20% aqueous Na$_2$CO$_3$ solution, and extracted with DCM. The organic phase was dried and concentrated to obtain the target product 8-methoxy-6-isopropyl-5-nitro-quinoline (33c) (500 mg, yield 50%).

Step 3) Preparation of 8-hydroxy-6-isopropyl-5-nitroquinoline (33)

8-Methoxy-6-isopropyl-5-nitro-quinoline (33c) (250 mg, 1 mmol) and LiCl (420 mg, 10 mmol) were added to 3 mL of DMF. The reaction solution was stirred at 120° C. for 1 hour, and concentrated under reduced pressure. The residues were pulped with 5 mL of water and filtered. The filter cake was dried to obtain the product 8-hydroxy-6-isopropyl-5-nitroquinoline (33) (160 mg) as a yellow solid, yield 70%.

MS calculated: 232.08; MS measured: 233.1 [M+H]+.

Example 34: Synthesis of 8-hydroxy-6-cyclopropyl-5-nitroquinoline (34)

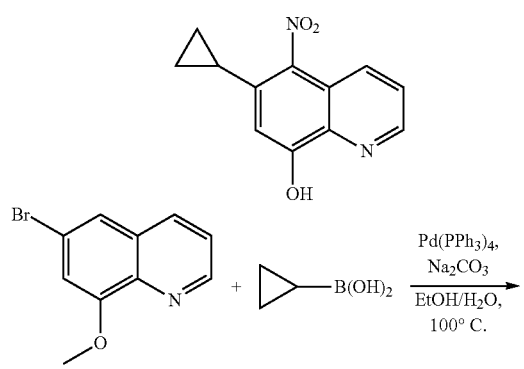

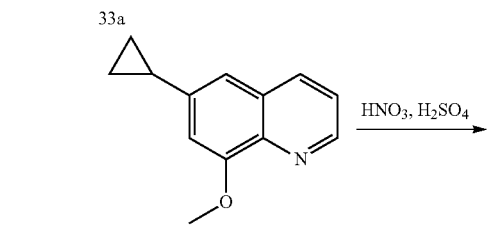

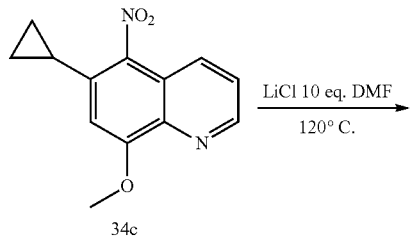

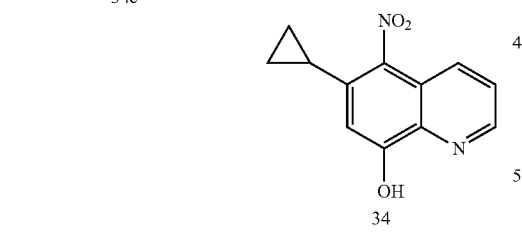

Step 1) Preparation of 8-methoxy-6-cyclopropyl-quinoline (34b)

8-Methoxy-6-bromo-quinoline (33a) (2.37 g, 10 mmol) was added into a 100 mL reaction flask at room temperature, followed by addition of cyclopropylboronic acid (860 mg, 10 mmol), Na₂CO₃ (2.12 g, 20 mmol) and EtOH/H₂O=40 mL/10 mL. The reaction solution was heated to 100° C. and stirred for 3 hours. The reaction solution was concentrated under reduced pressure and extracted with 50 mL of water and 50 mL of EA, and the organic phase was concentrated under reduced pressure. The residues were purified by silica gel column chromatography (ethyl acetate/petroleum ether=90/10) to obtain the product 33b (1.27 g, 63.5%).

Step 2) Preparation of 8-methoxy-6-cyclopropyl-5-nitro-quinoline (34c)

8-Methoxy-6-cyclopropyl-quinoline (33b) (600 mg, 3 mmol) was added to 6 mL of concentrated sulfuric acid at 0-15° C., and stirred to dissolve. Concentrated nitric acid (900 mg, 64% wt, 9 mmol) was added slowly, and stirred at room temperature for 2 hour after completion of the addition. The reaction solution was slowly poured into 50 mL of ice water, adjusted to pH=7-8 with 20% aqueous Na₂CO₃ solution, and extracted with DCM. The organic phase was dried and concentrated to obtain the target product 8-methoxy-6-cyclopropyl-5-nitro-quinoline (34c) (446 mg, yield 61%).

Step 3) Preparation of 8-hydroxy-6-cyclopropyl-5-nitroquinoline (34)

8-Methoxy-6-cyclopropyl-5-nitro-quinoline (33c) (245 mg, 1 mmol) and LiCl (420 mg, 10 mmol) were added to 3 mL of DMF. The reaction solution was stirred at 120° C. for 1 hour, and concentrated under reduced pressure. The residues were pulped with 5 mL of water and filtered. The filter cake was dried to obtain the product 8-hydroxy-6-cyclopropyl-5-nitroquinoline (34) (161 mg) as a yellow solid, yield 70%.

MS calculated: 230.07; MS measured: 231.1 [M+H]+.

Example 35: Synthesis of 8-hydroxy-4-(1-methyl-1H-pyrazol-5-yl)-5-nitroquinoline (35)

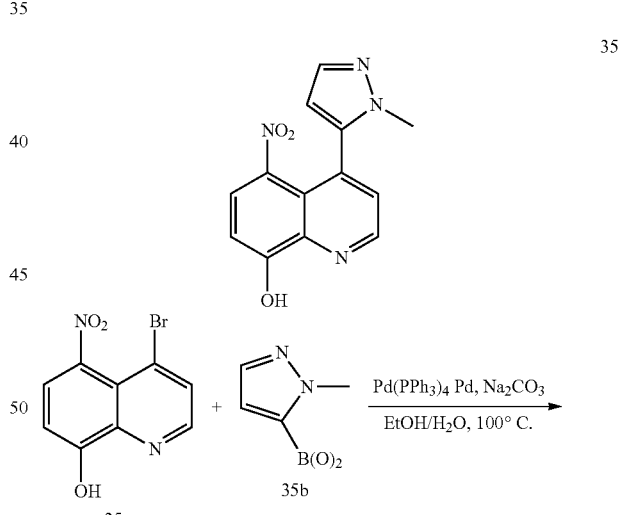

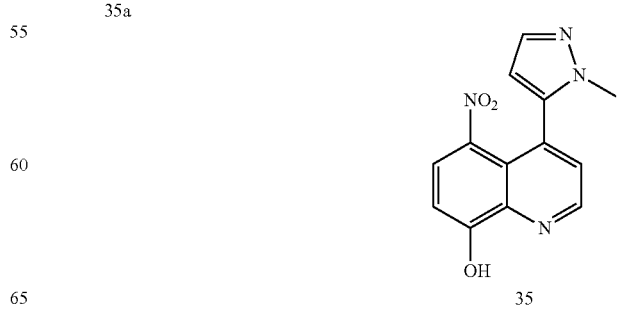

8-Hydroxy-4-bromo-5-nitroquinoline (35a) (20 mg, 0.07 mmol), N-methyl-pyrazole-5 boronic acid (14 mg, 0.1 mmol), tetrakistriphenylphosphine palladium (10 mg, 10%) and sodium carbonate (15 mg, 0.14 mmol) were added to 1 mL of toluene at room temperature, followed by addition of 0.2 mL of ethanol and 0.4 mL of water. The reaction solution was stirred at 100° C. for 12 hours, cooled to room temperature, and concentrated under reduced pressure to remove the organic solvent. The resulting residues were purified by silica gel column chromatography (eluent: petroleum ether/ethyl acetate=1/1.5) to obtain 8-hydroxy-4-(1-methyl-1H-pyrazol-5-yl)-5-nitroquinoline (35) (5 mg, yield 26%).

MS calculated: 270.08; MS measured: 271.1 [M+H]$^+$.

Example 36: Synthesis of 8-hydroxy-4-(4-methylpiperazinyl)-5-nitroquinoline (36)

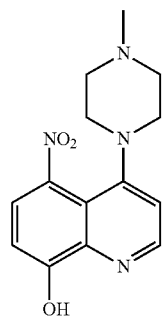

36

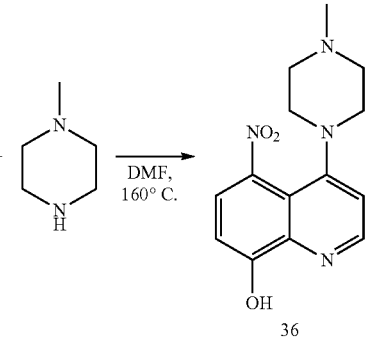

36

4-Chloro-5-nitroquinolin-8-ol (2) (100 mg, 0.45 mmol) and N-methyl-piperazine (223 mg, 2.2 mmol) were added to 2 mL of DMF at room temperature. The reaction solution was stirred at 160° C. for 1 hour, cooled to room temperature, and concentrated. The residues were pulped with 5 mL of water to obtain 8-hydroxy-4-(4-methylpiperazinyl)-5-nitroquinoline (36) (60 mg, yield 46%).

MS calculated: 288.12; MS measured: 289.2 [M+H]$^+$.

Example 37: Synthesis of 3-(8-hydroxy-5-nitroquinolin-4-yl)-N-methylacrylamide (37)

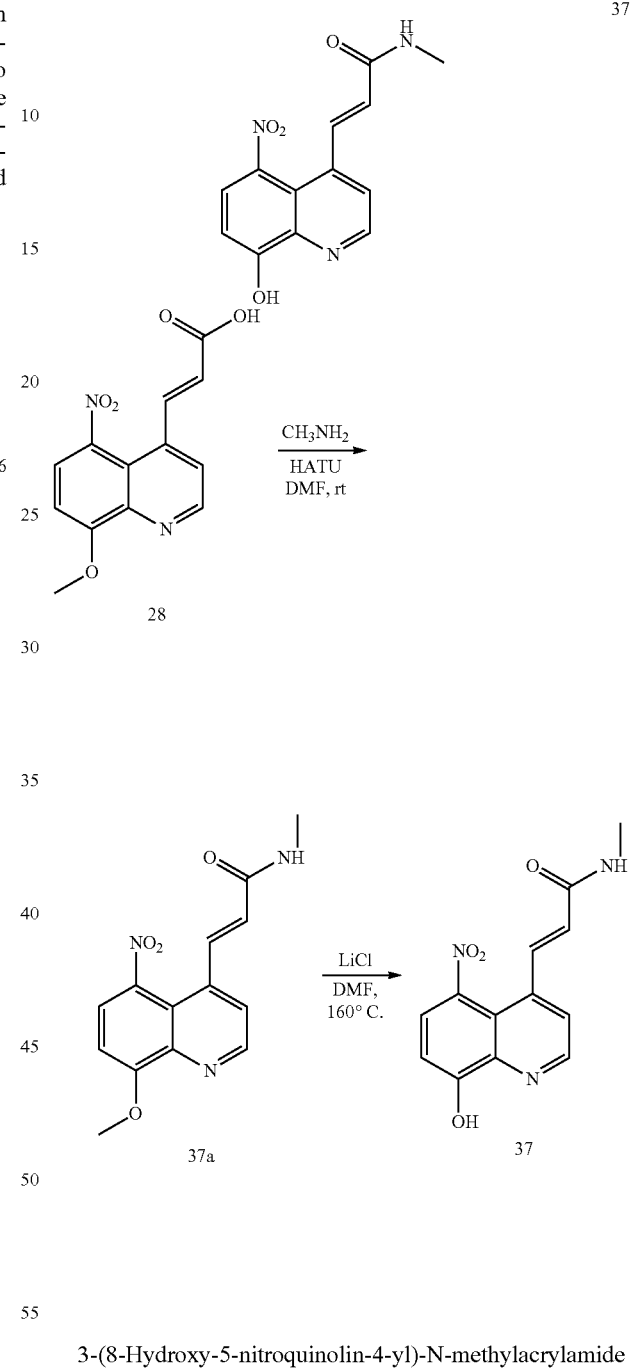

3-(8-Hydroxy-5-nitroquinolin-4-yl)-N-methylacrylamide (37) (7.6 mg, yield 6.18%) was obtained in accordance with the same preparation method of Example 29 with 3-(8-methoxy-5-nitroquinolin-4-yl)acrylic acid (28) (133.0 mg, 0.485 mmol) and methylamine hydrochloride (49 mg, 0.727 mmol) as the starting materials.

$^1$H NMR (400 MHz, DMSO-d$_6$) δ 8.59 (d, J=4.5 Hz, 1H), 8.23 (d, J=9.5 Hz, 1H), 7.79 (d, J=4.6 Hz, 1H), 7.32 (d, J=15.2 Hz, 1H), 7.13 (d, J=15.2 Hz, 1H), 6.22 (d, J=9.6 Hz, 1H), 3.61 (t, J=21.9 Hz, 8H).

MS calculated: 273.07; MS measured: 274.10 [M+H]$^+$.

Example 38: Synthesis of 8-hydroxy-5-nitroquinoline-3-carboxylic acid (38)

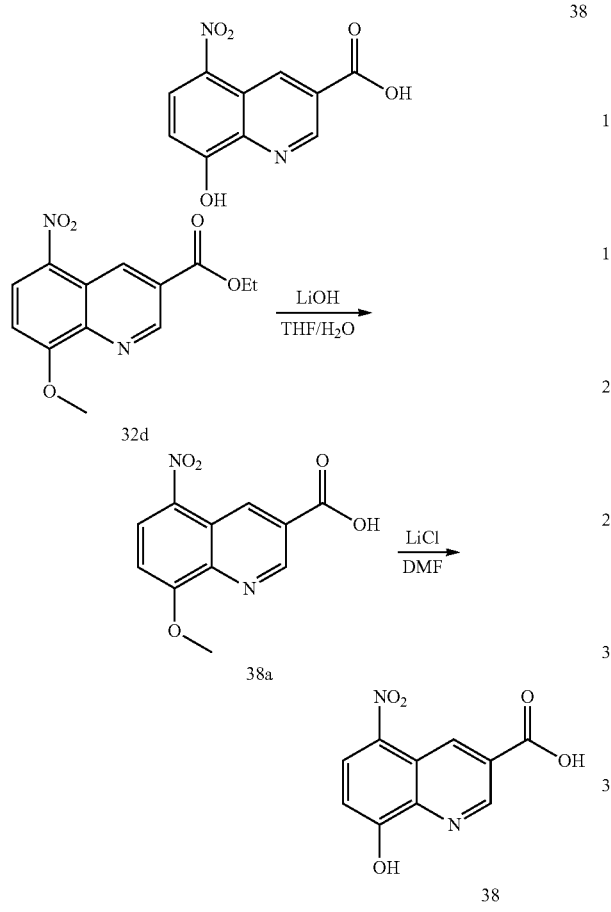

Step 1): Preparation of 8-methoxy-5-nitroquinoline-3-carboxylic acid (38a)

Ethyl 8-methoxy-5-nitroquinoline-3-carboxylate (32d) (330 mg, 1.19 mmol) and LiOH (57 mg, 2.4 mmol) were added to THF/H$_2$O=3 mL/0.3 mL. The reaction solution was stirred at room temperature for 2 hours, adjusted to pH 3-4 with TN HCl, and concentrated under reduced pressure. The residues were pulped with ethyl acetate and filtered. The filter cake was dried to obtain the product 8-methoxy-5-nitroquinoline-3-carboxylic acid (38a) (292 mg) as a yellow solid, yield 98.5%.

Step 2): Preparation of 8-hydroxy-5-nitroquinoline-3-carboxylic acid (38)

8-Methoxy-5-nitroquinoline-3-carboxylic acid (38a) (40 mg, 0.16 mmol) and LiCl (68 mg, 1.6 mmol) were added to 1 mL of DMF. The reaction solution was stirred at 130° C. for 1 hour, and concentrated under reduced pressure. The residues were pulped with MeOH/EA=1:1 and filtered. The filter cake was dried to obtain the product 8-hydroxy-5-nitroquinoline-3-carboxylic acid (38) (30 mg) as a yellow solid, yield 79.5%.

$^1$H NMR (400 MHz, DMSO-d$_6$) δ 9.91 (s, 1H), 9.11 (s, 1H), 8.49 (d, J=9.5 Hz, 1H), 6.53 (d, J=9.5 Hz, 1H).
MS calculated: 234.03; MS measured: 235.1 [M+H]$^+$.

Example 39: Synthesis of cyclopropylmethyl 8-hydroxy-5-nitroquinoline-3-carboxylate (39)

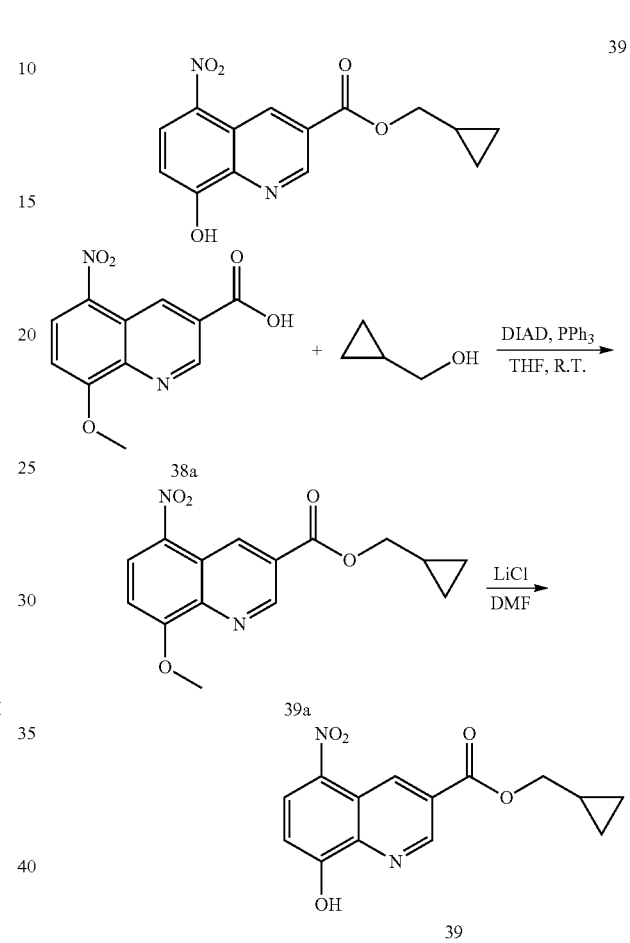

Step 1): Preparation of cyclopropylmethyl 8-methoxy-5-nitroquinoline-3-carboxylate (39a)

8-Hydroxy-5-nitroquinoline-3-carboxylic acid (38a) (60 mg, 0.24 mmol), cyclopropylmethanol (35 mg, 2.0 e.q.), triphenylphosphine (152 mg, 2.4 e.q.) and tetrahydrofuran (1 mL) were mixed. Diisopropyl azodicarboxylate (118 mg, 2.4 e.q.) was added dropwise to the reaction solution at room temperature, and stirred for 1 hour. The reaction solution was concentrated under reduced pressure to obtain an oily crude product. The crude product was purified by silica gel thin-layer chromatography (DCM:MeOH=36:1) to obtain the product 39a (68 mg) as a light yellow solid, yield 93.1%.

Step 2): Preparation of cyclopropylmethyl 8-hydroxy-5-nitroquinoline-3-carboxylate (39)

Cyclopropylmethyl 8-methoxy-5-nitroquinoline-3-carboxylate (39a) (68 mg, 0.22 mmol), lithium chloride (95 mg, 10.0 e.q.) and N,N-dimethylformamide (2 mL) were mixed and stirred well. The reaction system was heated to 130° C. and stirred for 1 hour under a nitrogen atmosphere. The reaction solution was concentrated under reduced pressure, followed by addition of water to precipitate solid. The mixture was filtered, and the filter cake was washed with water and ethanol/water solution (1:1, 0.5 mL), and dried to obtain the product cyclopropylmethyl 8-hydroxy-5-nitroquinoline-3-carboxylate (39) (67 mg) as a yellow solid, yield 100%.

$^1$H NMR (400 MHz, DMSO) δ 10.06 (d, J=1.9 Hz, 1H), 8.99 (s, 1H), 8.45 (d, J=9.8 Hz, 1H), 6.31 (d, J=9.8 Hz, 1H), 4.22 (d, J=7.3 Hz, 2H), 1.34-1.25 (m, 1H), 0.64-0.57 (m, 2H), 0.41 (q, J=4.8 Hz, 2H).

MS calculated: 288.01; MS measured: 289.26 [M+H]$^+$.

Example 40: Synthesis of N,N-diethyl-8-hydroxy-5-nitroquinoline-3-carboxamide (40)

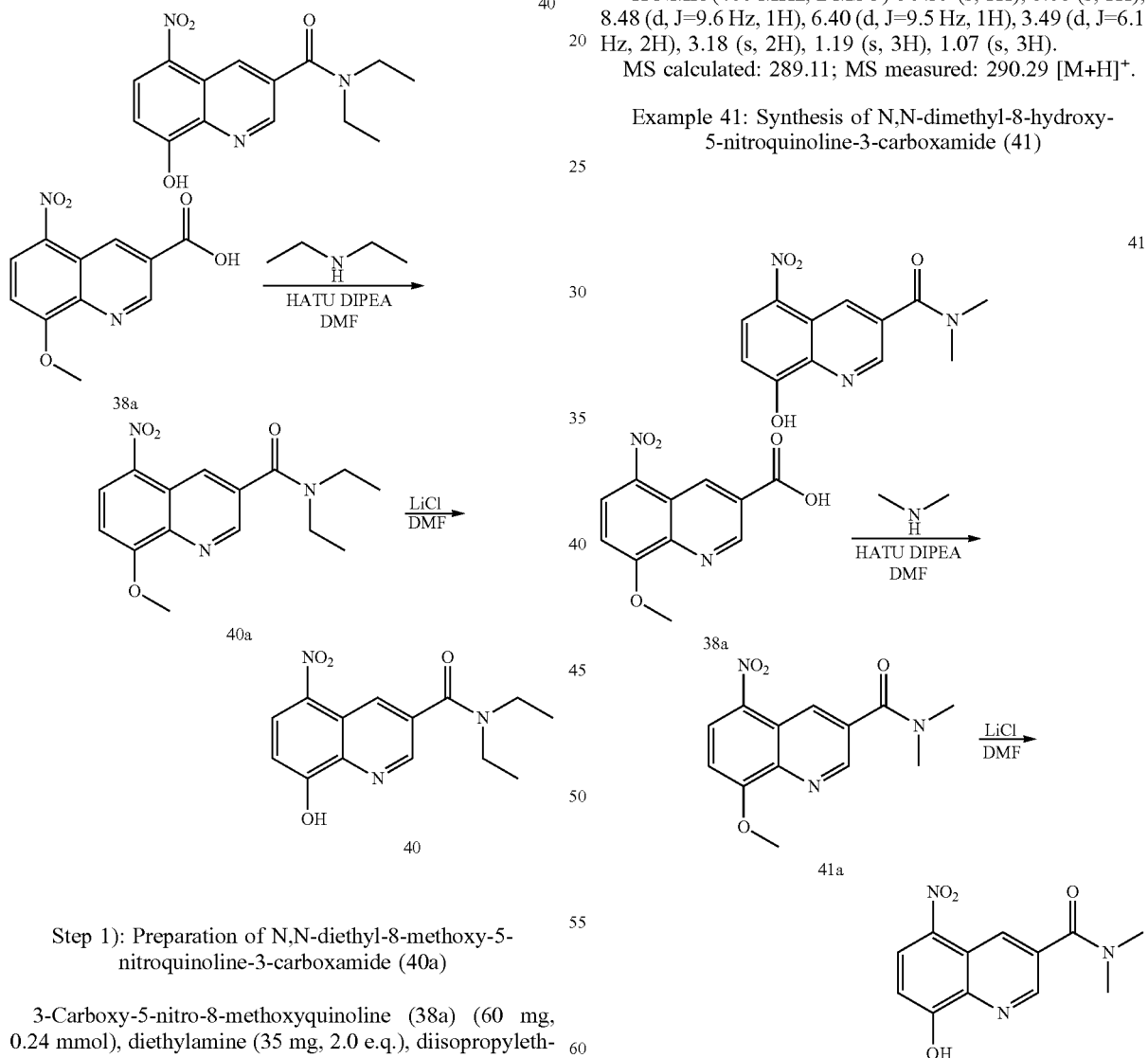

Step 1): Preparation of N,N-diethyl-8-methoxy-5-nitroquinoline-3-carboxamide (40a)

3-Carboxy-5-nitro-8-methoxyquinoline (38a) (60 mg, 0.24 mmol), diethylamine (35 mg, 2.0 e.q.), diisopropylethylamine (94 mg, 3.0 e.q.) and N,N-dimethylformamide (1 mL) were mixed and stirred well. HATU (138 mg, 1.5 e.q.) was added to the system at room temperature, and stirred for 1 hour. The reaction solution was concentrated under reduced pressure to obtain an oily crude product. The crude product was purified by silica gel thin-layer chromatography (DCM:MeOH=20:1) to obtain the product N,N-diethyl-8-methoxy-5-nitroquinoline-3-carboxamide (40a) (40 mg, yield 54.5%) as a yellow solid.

Step 2): Preparation of N,N-diethyl-8-hydroxy-5-nitroquinoline-3-carboxamide (40)

N,N-Diethyl-8-methoxy-5-nitroquinoline-3-carboxamide (40a) (40 mg, 0.13 mmol), lithium chloride (56 mg, 10.0 e.q.) and N,N-dimethylformamide (1 mL) were mixed and stirred well. The system was heated to 130° C. and stirred for 1 hour under a nitrogen atmosphere. The reaction solution was concentrated under reduced pressure, followed by addition of water to precipitate solid. The mixture was filtered, and the filter cake was washed 2 to 3 times with water, and dried to obtain the product N,N-diethyl-8-hydroxy-5-nitroquinoline-3-carboxamide (40) (21 mg, yield 55%) as a yellow solid.

$^1$H NMR (400 MHz, DMSO) δ 9.39 (s, 1H), 8.68 (s, 1H), 8.48 (d, J=9.6 Hz, 1H), 6.40 (d, J=9.5 Hz, 1H), 3.49 (d, J=6.1 Hz, 2H), 3.18 (s, 2H), 1.19 (s, 3H), 1.07 (s, 3H).

MS calculated: 289.11; MS measured: 290.29 [M+H]$^+$.

Example 41: Synthesis of N,N-dimethyl-8-hydroxy-5-nitroquinoline-3-carboxamide (41)

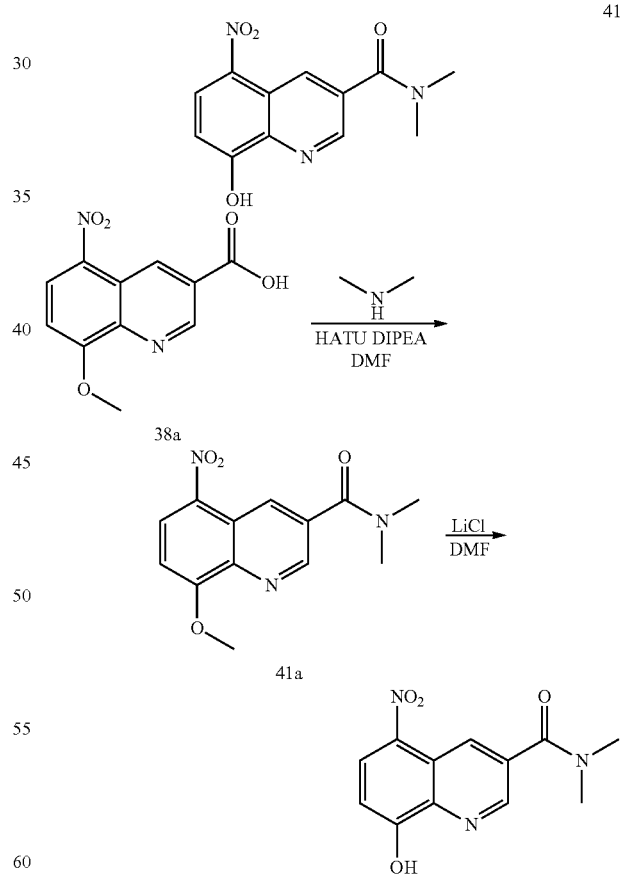

N,N-Dimethyl-8-hydroxy-5-nitroquinoline-3-carboxamide (41) was obtained in accordance with the same preparation method of Example 40, except for replacing diethylamine with dimethylamine solution.

$^1$H NMR (400 MHz, DMSO) δ 9.46 (d, J=1.8 Hz, 1H), 8.71 (s, 1H), 8.49 (d, J=9.6 Hz, 1H), 6.38 (d, J=9.6 Hz, 1H), 3.07 (s, 3H), 2.99 (s, 3H).
MS calculated: 261.07; MS measured: 262.24 [M+H]$^+$.

Example 42: Synthesis of 8-hydroxy-6-fluoro-5-nitroquinoline (42)

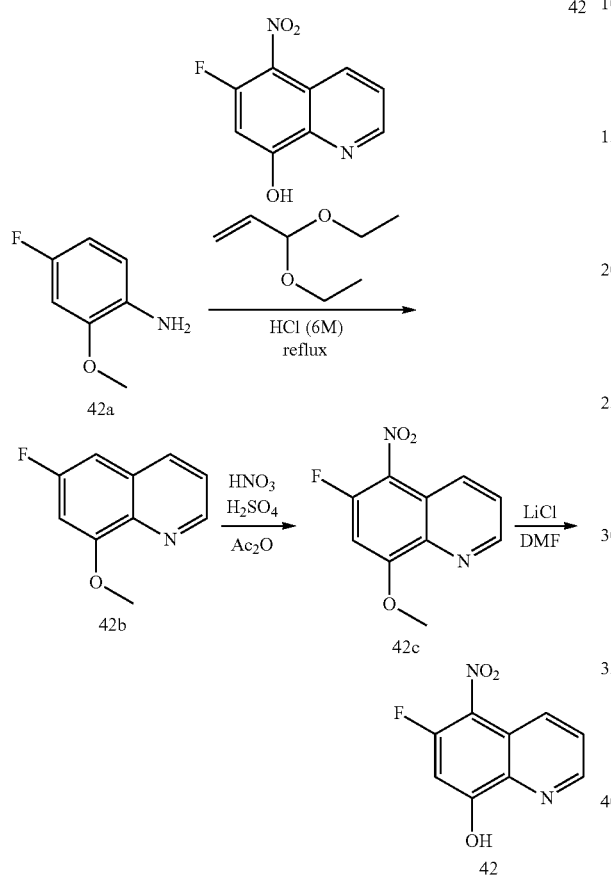

Step 1): Preparation of 8-methoxy-6-fluoroquinoline (42b)

4-Fluoro-2-methoxyaniline (42a) (2.00 g, 14.2 mmol) and hydrochloric acid (6M, 20 mL) were mixed and stirred well. The system was warmed up to 110° C., followed by addition of acrolein diethyl acetal (4.61 g, 2.5 e.q.) and stirring for 3 hours. The reaction solution was cooled to room temperature, adjusted to neutral pH with saturated potassium carbonate aqueous solution, and extracted with dichloromethane. The organic phase was washed with saturated brine, dried over anhydrous sodium sulfate and filtered, and the filtrate was concentrated under reduced pressure to obtain a brown oily crude product. The crude product was purified by silica gel column chromatography (PE:EA=7:1~3:1) to obtain the product 8-methoxy-6-fluoroquinoline (42b) (443 mg, yield 17.6%) as a yellow solid.

Step 2): Preparation of 8-methoxy-6-fluoro-5-nitroquinoline (42c)

8-Methoxy-6-fluoroquinoline (42b) (220 mg, 1.24 mmol) and acetic anhydride (4.4 mL) were mixed and stirred to dissolve well. Concentrated nitric acid (65%, 0.258 mL, 3.0 e.q.) was added dropwise to the system at 0° C., and stirred for 5 minutes. Concentrated sulfuric acid (98%, 0.068 mL, 1.0 e.q.) was added dropwise to the system, and stirred overnight. Saturated sodium bicarbonate aqueous solution was added to the reaction solution to quench the reaction. The aqueous phase was adjusted to pH 8-9, and extracted with dichloromethane. The organic phase was washed with saturated brine, dried over anhydrous sodium sulfate and filtered, and the filtrate was concentrated under reduced pressure. The residues were purified by silica gel column chromatography (PE:EA=3:1-2:1) to obtain a yellow solid. The solid was further purified by silica gel thin-layer chromatography (dichloromethane was used as developing solvent) to obtain the product 8-methoxy-6-fluoro-5-nitroquinoline (42c) (103 mg, yield 37.3%) as a pale yellow solid.

Step 3): Preparation of 8-hydroxy-6-fluoro-5-nitroquinoline (42)

8-Methoxy-6-fluoro-5-nitroquinoline (42c) (103 mg, 0.47 mmol), lithium chloride (197 mg, 10.0 e.q.) and N,N-dimethylformamide (2.5 mL) were mixed and stirred well. The system was warmed up to 130° C. and stirred for 1 hour under a nitrogen atmosphere. The reaction solution was concentrated under reduced pressure, followed by addition of water to precipitate solid. The mixture was filtered, and the filter cake was washed with water for 2 times, and dried to obtain the product 8-hydroxy-6-fluoro-5-nitroquinoline (42) (49 mg, yield 50.8%) as a yellow solid.
$^1$H NMR (400 MHz, DMSO) δ 9.10 (d, J=8.7 Hz, 1H), 8.56 (d, J=3.2 Hz, 1H), 7.61 (dd, J=8.7, 4.1 Hz, 1H), 6.14 (d, J=17.9 Hz, 1H).
MS calculated: 208.15; MS measured: 209.0 [M+H]$^+$.

Example 43: Synthesis of cyclohexyl 8-hydroxy-5-nitroquinoline-3-carboxylate (43)

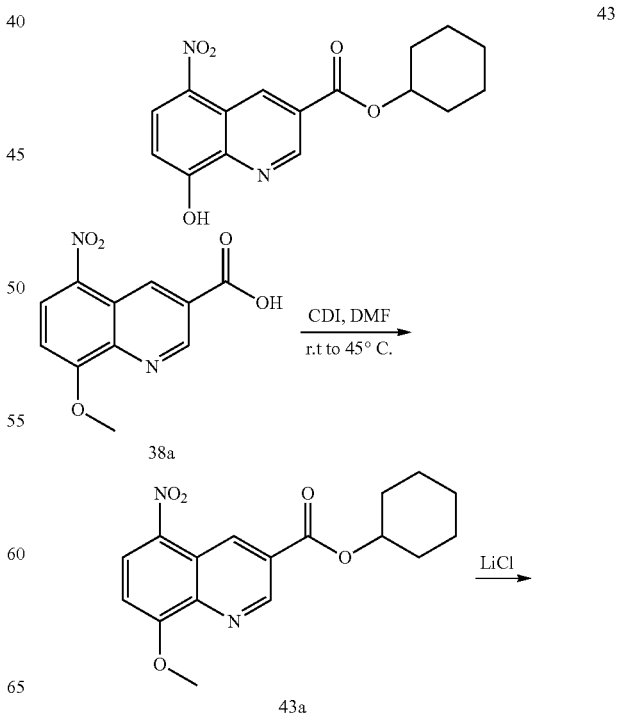

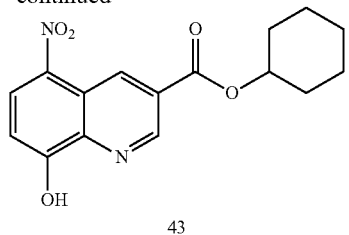

43

Step 1): Preparation of cyclohexyl 5-nitro-8-methoxyquinoline-3-carboxylate (43a)

Carbonyldiimidazole (CDI) (85 mg, 0.52 mmol) was added in batches to a solution of 5-nitro-8-methoxyquinoline-3-carboxylic acid (38a) (100 mg, 0.4 mmol) in N,N-dimethylformamide (2.0 mL) at room temperature. The reaction mixture was stirred at room temperature for 1 hour, followed by slowly addition of cyclohexanol (120 mg, 1.2 mmol) and stirring at 45° C. for 6 hours. The reaction solution was cooled to room temperature, diluted with water (10.0 mL), and extracted with dichloromethane (10.0 mL×2). The organic phases were combined, washed with saturated brine (10.0 mL), dried over anhydrous sodium sulfate and filtered, and the filtrate was concentrated under reduced pressure. The resulting residues were purified by silica gel column chromatography (eluent: ethyl acetate/petroleum ether=0~40%) to obtain cyclohexyl 5-nitro-8-methoxyquinoline-3-carboxylate (43a) (101 mg, yield 75.9%).

Step 2): Preparation of cyclohexyl 8-hydroxy-5-nitroquinoline-3-carboxylate (43)

Cyclohexyl 5-nitro-8-methoxyquinoline-3-carboxylate (43a) (50.0 mg, 0.15 mmol) and lithium chloride (63.0 mg, 1.5 mmol) were added to N,N-dimethylformamide (2.0 mL) at room temperature. The reaction mixture was stirred at 130° C. for 1 hour, cooled to room temperature, and concentrated under reduced pressure to remove the organic solvent. The resulting residues were added with water (2.0 mL), stirred for 3 minutes, and filtered under reduced pressure. Water (1.0 mL) and ethanol (1.0 mL) were added to the resulting filter cake, stirred for 10 minutes, and filtered under reduced pressure. The filter cake was dried under vacuum to obtain cyclohexyl 8-hydroxy-5-nitroquinoline-3-carboxylate (43) (36.5 mg, yield 76.3%).

$^1$H NMR (400 MHz, DMSO-d6) δ:10.08 (s, 1H), 9.00 (s, 1H), 8.48 (d, J=9.8 Hz, 1H), 6.34 (d, J=9.8 Hz, 1H), 5.16-5.00 (m, 1H), 1.99-1.94 (m, 2H), 1.82-1.78 (m, 2H), 1.70-1.39 (m, 6H).

MS calculated: 316.11; MS measured: 317.2 [M+H]$^+$.

Example 44: Synthesis of N-isopropyl-8-hydroxy-5-nitroquinoline-3-carboxamide (44)

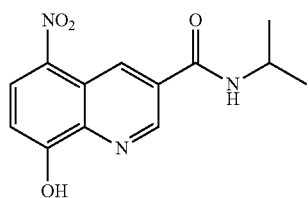

44

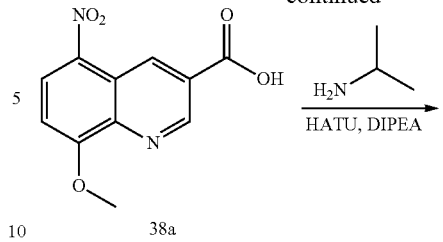

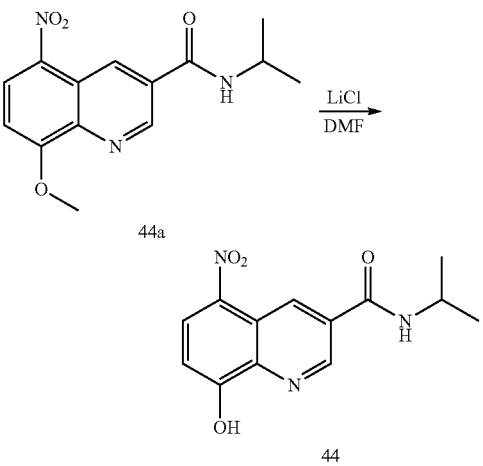

Step 1): Preparation of N-isopropyl-5-nitro-8-methoxyquinoline-3-carboxamide (44a)

Carbonyldiimidazole (85 mg, 0.52 mmol) was added in batches to a solution of 5-nitro-8-methoxyquinoline-3-carboxylic acid (38a) (100 mg, 0.4 mmol) in N,N-dimethylformamide (2.0 mL) at room temperature. The reaction mixture was stirred at room temperature for 1 hour, followed by slowly addition of isopropylamine (141.9 mg, 2.4 mmol) and stirring at room temperature for 16 hours. The reaction solution was diluted with water (10.0 mL), and extracted with dichloromethane (10.0 mL×2). The organic phases were combined, washed with saturated brine (10.0 mL), dried over anhydrous sodium sulfate and filtered, and the filtrate was concentrated under reduced pressure. The resulting residues were purified by silica gel column chromatography (eluent: (dichloromethane:methanol=4:1)/dichloromethane=0~28%) to obtain N-isopropyl-5-nitro-8-methoxyquinoline-3-carboxamide (44a) (52.0 mg, yield 44.8%).

Step 2): Preparation of N-isopropyl-8-hydroxy-5-nitroquinoline-3-carboxamide (44)

N-Isopropyl-5-nitro-8-methoxyquinoline-3-carboxamide (44a) (52.0 mg, 0.18 mmol) and lithium chloride (75.5 mg, 1.8 mmol) were added to N,N-dimethylformamide (2.0 mL) at room temperature. The reaction mixture was stirred at 130° C. for 1.5 hours, cooled to room temperature, and concentrated under reduced pressure to remove the organic solvent. The resulting residues were added with water (2.0 mL), stirred for 3 minutes, and filtered under reduced pressure. Water (1.0 mL) and ethanol (1.0 mL) were added to the resulting filter cake, stirred for 10 minutes, and filtered under reduced pressure. The filter cake was dried under vacuum to obtain N-isopropyl-8-hydroxy-5-nitroquinoline-3-carboxamide (44) (35.5 mg, yield 71.7%).

$^1$H NMR (400 MHz, DMSO-$d_6$) δ: 9.84 (d, J=1.9 Hz, 1H), 8.93 (d, J=1.7 Hz, 1H), 8.70 (d, J=7.6 Hz, 1H), 8.49 (d, J=9.7 Hz, 1H), 6.36 (d, J=9.7 Hz, 1H), 4.26-4.10 (m, 1H), 1.24 (d, J=6.6 Hz, 6H).

MS calculated: 275.09; MS measured: 276.1[M+H]$^+$.

Biological Assay

Test Example 1 Determination of the Inhibitory Activity of the Compounds of the Present Invention on Cancer Cells Experimental materials, reagents and test methods
1. Cell Lines
   HUVEC (purchased from Allcells Biological Technology (Shanghai) Co., Ltd.); UM-UC-3 (ATCC); LNCaP Clone FGC (ATCC); RM-1 (purchased from Nanjing Cobioer Biosciences Co., Ltd.)
2. Reagents
   Endothelial cell complete medium (Allcells, H-004)
   Medium RPMI1640 (ATCC, 30-2001)
   Medium EMEM (ATCC, 30-2003)
   Medium DMEM (Gibco, 12430-054)
   Fetal bovine serum (Gibco, 10091148)
   Penicillin-streptomycin double anti-body (Gibco, S110JV)
   DPBS (Gibco, 14190-144)
   CellTiter-Glo® kit (Promega, G7573)
   Trypsin (0.25%), phenol red (Gibco, 25200-056)
   DMSO (Sigma, D2650)
3. Instruments
   Biological safety cabinet (Suzhou Antai Airtech Co., Ltd., BSC-1300A II)
   Inverted microscope (Nikon, CKX53)
   Automated cell counter (Life Technologies, countess II)
   Multifunctional microplate reader (Biotek, H1FM)
   Shaker (Hangzhou Allsheng Instruments Co., Ltd., OS-100)
   GraphPad Prism 5.0 software
   XLFIT 5.3 (Inforstack Shanghai Co., Ltd.)
4. Test Method
   In this test method, the following experiments were carried out in a biological safety cabinet, and the specific steps are as follows:
   (1) On the first day, the cells were seeded in a 96-well plate, and the previous medium was poured off. 5 mL of DPBS was added to wash the cells, and then removed by a pipette. Then, 1 mL of trypsin (0.25%) was added, and the plate was placed in a cell culture incubator at 37° C., 5% $CO_2$ for digestion, and taken out after about 2 to 5 minutes. New corresponding medium was added, and pipetted to resuspend the cells evenly, and the cells were then counted with an automated cell counter.
   The digestion was observed using an inverted microscope.
   Regarding to HUVEC, the medium used was endothelial cell complete medium; regarding to UM-UC-3, the medium used was 89v % EMEM+10v % fetal bovine serum+1 v % penicillin-streptomycin double anti-body; regarding to LNcaP Clone FGC, the medium used was 89v % RPM11640+10v % fetal bovine serum+1 v % penicillin-streptomycin double anti-body; and regarding to RM-1, the medium used was 89v % DMEM+10v % fetal bovine serum+1v % penicillin-streptomycin double anti-body.
   (2) HUVEC cells were seeded in columns 1 to 11 of a 96-well plate (Corning, Cat. No. 3610) at a density of 2000 cells per well in 100 μL of medium, and the medium free of cell was added to the wells of column 12. The other three types of cells were also seeded, wherein UM-UC-3 and RM-1 cells were seeded at a density of 3000 cells per well, and LNCap Clone FGC cells were seeded at a density of 5000 cells per well. Then, the plate was placed in an incubator at 37° C., 5% $CO_2$ for 24 hours.
   (3) On the second day, the compounds of the present invention and the reference drug nitroxoline (obtained according to the preparation method disclosed in the prior art) were diluted in gradient (2.5 folds, started at 100 μmol) to obtain 8 dose points (there were a total of 8 columns of wells; the first column of wells had the highest concentration, the concentration decreased in turn, and the last column of wells had the lowest concentration). 10 uL of the compound diluted in gradient was added to the 100 μL of cells in column 1 to column 10 with an 8-channel pipette. 10 μL of the corresponding medium containing 0.33v % DMSO was added to column 11 and column 12. The plate was incubated in an incubator at 37° C., 5% $CO_2$ for 72 hours (note: column 11 was used as MAX well with cells and no compounds; and column 12 was used as MIN well with no cells and no compounds).
   (4) After treating with the compounds of the present invention for 72 hours, the cell viability detection reagents in the above CellTiter-Glo® kit were added to the 96-well plate at 50 μL per well according to the instructions. The plate was shaken on a shaker in the dark for 5 to 10 minutes, and then the cell activity was determined by a multifunctional microplate reader Finally, the growth inhibition of the compounds of the present invention on the cells was plotted by Graphpad Prism 5.0 software or XLFIT software, and the $IC_{50}$ values of the compounds of the present invention were calculated.

The inhibition $IC_{50}$ values of the compounds of the present invention on various cancer cells are shown in Table 1 below.

TABLE 1

The inhibition $IC_{50}$ values of the compounds of the present invention on cancer cells

| | $IC_{50}$ (uM) | | | |
| --- | --- | --- | --- | --- |
| Example | Endothelial cell line HUVEC | Bladder cancer cell line UM-UC-3 | Prostate cancer cell line LNcaP Clone FGC | Mouse prostate cancer cell line RM-1 |
| Reference drug Nitroxoline | 4.5 | 9.2 | 5.1 | 4.3 |
| 2 | 3 | 2 | 4.9 | 3.1 |
| 5 | / | 5.5 | 5.5 | / |
| 6 | / | 7 | / | / |
| 9 | 1.3 | 0.5 | 1.7 | 1 |
| 10 | / | 3 | / | / |
| 13 | 2.5 | 1.6 | 1.2 | 2 |
| 14 | / | 5 | 3.8 | |
| 16 | / | 1.5 | 1.8 | 2.1 |
| 17 | / | 4.9 | 4.8 | 2.8 |
| 19 | 1.3 | 2.4 | 1.9 | 0.9 |
| 22 | 3 | 4 | 2.7 | 2.7 |
| 24 | 1.4 | 1.7 | 0.8 | 1 |

From the data in the table above, it can be seen that the compounds of the present invention have belier anticancer activity than nitroxoline.

Test Example 2 Determination of the inhibitory activity of the compounds of the present invention on bacteria 1. Purpose The purpose of this test is to determine the bacteriostatic activity of the compounds of the present invention against a representative panel of strains (Gram-negative bacteria: *Escherichia enter/ca* ATCC 25922, *Acinetobacter baumannii* ATCC 19606; Gram-positive bacteria: *Staphylococcus aureus* ATCC29213). Bacteriostatic activity was determined by minimum inhibitory concentration (MIC), $MIC_{50}$, $MIC_{90}$. This test was entrusted to Shanghai Junj Lab Co., Ltd. Except for the test drugs, all other test materials were provided by Shanghai Junj Lab Co., Ltd.

2. Test Drugs

The compounds of the Examples of the present invention

3. Test Bacteria

The tested bacteria were several strains of clinically isolated carbapenem-resistant *Escherichia coli*, several strains of carbapenem-resistant *Acinetobacter baumannii*, several strains of methicillin-resistant *Staphylococcus aureus*, and several strains of sensitive *Staphylococcus aureus*. Duplicate strains isolated from the same patient were eliminated. There were also three quality control strains *Escherichia coli* ATCC 25922, *Acinetobacter baumannii* ATCC 19606, and *Staphylococcus aureus* ATCC 29213. The activity test of each compound was carried out on one or more strains of each of the above test bacteria. The number of some test strains is shown in the table below.

TABLE 2

| | Number of test strains (strains) | | | | | |
|---|---|---|---|---|---|---|
| | *Escherichia coli* | | *Acinetobacter baumannii* | | *Staphylococcus aureus* | |
| Examples | Standard strain ATCC25922 | Clinical strain | Standard strain ATCC19606 | Clinical strain | Standard strain ATCC29213 | Clinical strain |
| 1 | 1 | 2 | 0 | 1 | 0 | 1 |
| 2 | 0 | 1 | 0 | 1 | 0 | 1 |
| 9 | 0 | 1 | 0 | 1 | 1 | 4 |
| 16 | 1 | 2 | 1 | 2 | 1 | 4 |
| 19 | 1 | 2 | 1 | 2 | 1 | 4 |
| 24 | 1 | 4 | 1 | 4 | 1 | 5 |
| 25 | 1 | 4 | 1 | 4 | 1 | 8 |
| 26 | 1 | 4 | 1 | 5 | 1 | 8 |
| 27 | 1 | 6 | 1 | 5 | 1 | 11 |

4. Drug Susceptibility Test Method

According to the recommendations of relevant documents of the American Clinical and Laboratory Standards Institute (CLSI), the micro broth dilution method was used to determine the MIC of the compounds of the present invention against clinically isolated strains. The culture solution free of drug was used as the test bacteria positive control, the culture solution free of bacterial solution was used as the drug negative control, and the culture solution free of drug solution and bacterial solution was used as the blank control.

4.1 Formulation of antibacterial drug: All the compounds of the present invention were dissolved in DMSO. The drug concentration range was 128 mg/L-0.06 mg/L. Specific method: The compounds of the present invention were successively diluted by 1:1 with DMSO to obtain an intermediate series with a range of 25600 mg/L-12.5 mg/L. 30 µL of solution from each tube of the intermediate series of each compound was added to a 3 mL/tube series of single broth tube, and mixed well to obtain an intermediate series with a range of 256 mg/L to 0.125 mg/L. The diluted series solution was added to the drug susceptibility plate line by line, 50 µL of solution per well. All ranges became investigated ranges after being mixed with an equal volume of bacterial solution: 128-0.06 mg/L.

4.2 Culture medium: The drug susceptibility test used cation adjusted Mueller-Hinton broth (CAMHB).

4.3 Amount of inoculum: The test bacteria cultured overnight were adjusted to 0.5 McFarland turbidity by the direct colony suspension method, and diluted 100 folds, the final inoculum amount was $10^5$ CFU/mL.

4.4 Culture conditions: The test bacteria were cultured at 35±2° C. for 20 hours in air.

5. Interpretation and Judgment of Results

The drug susceptibility test results were interpretated by reference to CLSI 2019 edition M100 $29^{th}$ edition criteria.

6. Statistics

The results of drug susceptibility test were statistically analyzed by WHONET version 5.6 software.

7. Experimental Results

The bacteriostatic MIC values (unit: mg/L) of the compounds of the present invention against various bacteria are shown in Table 3 below. In the case of Gram-negative bacteria, the compounds have bacteriostatic activity with a MIC value≤128 mg/L. In the case of Gram-positive bacteria, the compounds have bacteriostatic activity with a MIC value≤4 mg/L. The culture solution free of drug was used as the test bacteria positive control, wherein the bacteria grew as normal. The culture solution free of bacterial solution was used as the drug negative control, and the culture solution free of drug solution and bacterial solution was used as the blank control, wherein no bacteria grew in both solutions.

TABLE 3

Bacteriostatic MIC values (mg/L) of the compounds of the present invention

| | Escherichia coli | | | Acinetobacter baumannii | | | Staphylococcus aureus | | |
|---|---|---|---|---|---|---|---|---|---|
| | Standard strain ATCC25922 | Clinical strain | | Standard strain ATCC19606 | Clinical strain | | Standard strain ATCC29213 | Clinical strain | |
| Example | MIC | MIC$_{50}$ | MIC$_{90}$ | MIC | MIC$_{50}$ | MIC$_{90}$ | MIC | MIC$_{50}$ | MIC$_{90}$ |
| 1 | 8 | 4 | 8 | | 8 | 16 | | 4 | 4 |
| 2 | 8 | 8 | 8 | | 4 | 8 | | 4 | 4 |
| 9 | | 128 | 128 | | 128 | 128 | 4 | 4 | 8 |
| 16 | 32 | 32 | 32 | 32 | 32 | 32 | 4 | 4 | 4 |
| 19 | 8 | 8 | 16 | 16 | 8 | 16 | 4 | 2 | 4 |
| 24 | 64 | 32 | 64 | 32 | 32 | 64 | 4 | 4 | 4 |
| 25 | 32 | 32 | 32 | 32 | 32 | 32 | 4 | 4 | 4 |
| 26 | 8 | 8 | 16 | 8 | 8 | 8 | 2 | 2 | 2 |
| 27 | 16 | 16 | 32 | 16 | 32 | 32 | 16 | 16 | 16 |
| 32 | 64 | 64 | 128 | 32 | 64 | 128 | 4 | 2 | 4 |
| 33 | | 32 | 32 | | 32 | 64 | | 4 | 4 |
| 34 | | 16 | 16 | | 8 | 32 | | 4 | 4 |
| 39 | 64 | 64 | 64 | | | | 2 | 1 | 1 |
| 40 | 8 | 8 | 8 | | | | 32 | 64 | 64 |
| 42 | 64 | 64 | 64 | | | | 64 | 64 | 64 |
| 43 | 128 | 128 | 128 | 128 | 128 | 128 | 4 | 2 | 2 |

As can be seen from the data in the above table, the MIC values of the compounds of the present invention against *Escherichia coli*, *Acinetobacter baumannii*, and *Staphylococcus aureus* are respectively 8 mg/L~128 mg/L, 8 mg/L~128 mg/L, and 1 mg/L~64 mg/L. The compounds of the present invention exhibit excellent bacteriostatic activity against various Gram-negative bacteria such as *Escherichia coli*, *Acinetobacter baumannii*, and Gram-positive bacteria such as *Staphylococcus aureus*. The compounds of Examples 1, 2, 16, 19, 24-27, and 32-34 of the present invention have bacteriostatic activity against *Escherichia coli*, *Acinetobacter baumannii*, and *Staphylococcus aureus*. The compounds of Examples 39, 40, and 42 of the present invention have bacteriostatic activity against *Escherichia coli* and *Staphylococcus aureus*. The compounds of Examples 9 and 43 of the present invention have bacteriostatic activity against *Staphylococcus aureus*. Therefore, the compounds of the present invention have excellent bacteriostatic activity against more than one of *Escherichia coli*, *Acinetobacter baumannii*, and *Staphylococcus aureus*, and are capable of treating infectious disease caused by Gram-negative bacteria and/or Gram-positive bacteria. Although the specific embodiments of the present invention have been described above, those skilled in the art should understand that these are only examples, and the protection scope of the present invention is defined by the appended claims. Those skilled in the art can make various changes or modifications to these embodiments without departing from the principle and essence of the present invention, but these changes and modifications all fall within the protection scope of the present invention.

What is claimed is:

1. A compound of formula (I) or a pharmaceutically acceptable salt thereof,

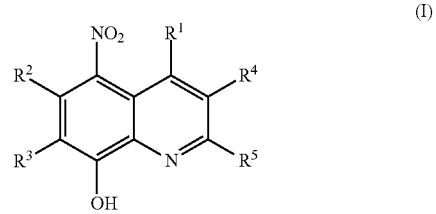

(I)

$R^1$ is —NR$^a$R$^b$;

R$^a$ and R$^b$ are each independently selected from the group consisting of hydrogen and $C_1$-$C_6$ alkyl; or, R$^a$ and R$^b$ together with the nitrogen atom to which they are attached form a 5- to 7-membered nitrogen-containing heterocyclyl, the 5- to 7-membered nitrogen-containing heterocyclyl optionally comprises one or more heteroatom(s) selected from the group consisting of N, O and S in addition to N; and the 5- to 7-membered nitrogen-containing heterocyclyl is optionally further substituted by one or more Qs;

Q is halogen, oxo, $C_1$-$C_6$ alkyl, —C(O) R$^c$, —C(O)OR$^c$, —C(O)NR$^c$R$^d$, —C(O)N(R$^c$)(CH$_2$)$_q$R$^d$ or —S(O)$_p$R$^c$;

R$^c$ and R$^d$ are each independently selected from the group consisting of hydrogen and $C_1$-$C_6$ alkyl, wherein the $C_1$-$C_6$ alkyl is optionally further substituted by one or more halogens; or, $R^c$ and Rd together with the nitrogen atom to which they are attached form a 5- to 7-membered nitrogen-containing heterocyclyl, the 5- to 7-membered nitrogen-containing heterocyclyl optionally comprises one or more heteroatom(s) selected from the group consisting of N, O and S in addition to N, the 5- to 7-membered nitrogen-containing heterocyclyl is optionally further substituted by one or more substituent(s) selected from the group consisting of halogen and $C_1$-$C_6$ alkyl;

p is 1 or 2;

q is an integer from 0 to 6;

or, $R^1$ is $C_3$-$C_{10}$ cycloalkyl, wherein the $C_3$-$C_{10}$ cycloalkyl is optionally further substituted by one or more substituent(s) selected from the group consisting of halogen and $C_1$-$C_6$ alkyl;

or, $R^1$ is selected from the group consisting of $C_6$-$C_{10}$ aryl and 5- to 10-membered heteroaryl, wherein the $C_6$-$C_{10}$ aryl and 5- to 10-membered heteroaryl are optionally further substituted by one or more substituent(s) selected from the group consisting of halogen and $C_1$-$C_6$ alkyl;

$R^2$ is hydrogen;

$R^3$ is hydrogen;

$R^4$ is hydrogen;

$R^5$ is hydrogen.

2. A compound of formula (I) or a pharmaceutically acceptable salt thereof,

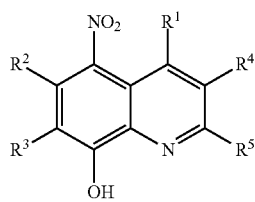
(I)

wherein:

$R^1$ is hydrogen;

$R^2$ is selected from the group consisting of hydrogen and $C_3$-$C_6$ cycloalkyl;

$R^3$ is hydrogen;

$R^4$ is —C(O) $OR^a$, wherein $R^a$ is selected from the group consisting of hydrogen, $C_1$-$C_6$ alkyl, $C_3$-$C_6$ cycloalkyl and $C_3$-$C_6$ cycloalkyl-$C_1$-$C_6$ alkyl;

$R^5$ is hydrogen.

3. The compound of formula (I) or the pharmaceutically acceptable salt thereof according to claim 1, wherein:

$R^1$ is selected from the group consisting of

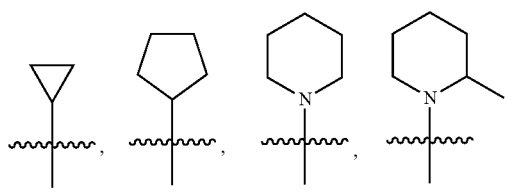

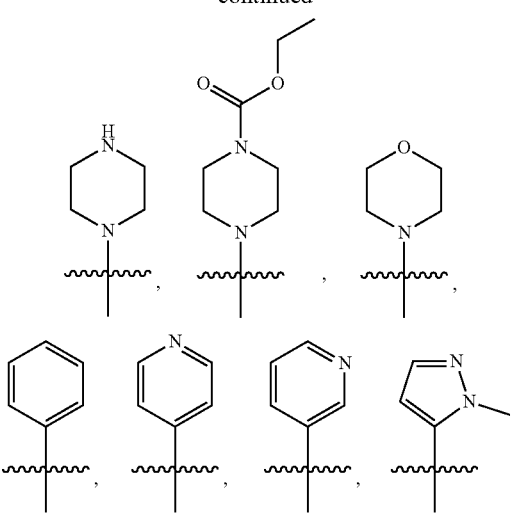

4. The compound of formula (I) or the pharmaceutically acceptable salt thereof according to claim 2, wherein:

$R^4$ is —C(O)$OR^a$, $R^a$ is a $C_1$-$C_6$ alkyl, or $R^a$ is a $C_3$-$C_6$ cycloalkyl.

5. A compound is selected from the group consisting of:

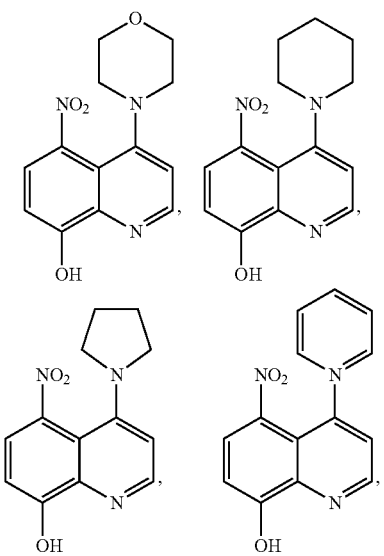

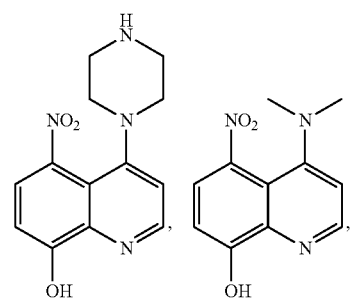

-continued
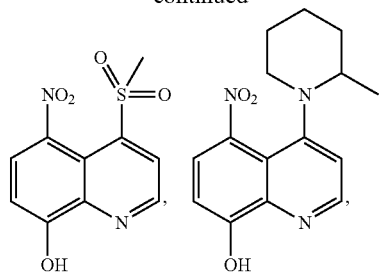
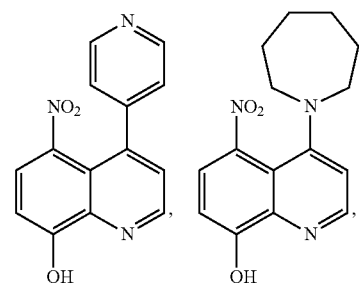
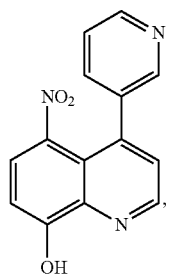
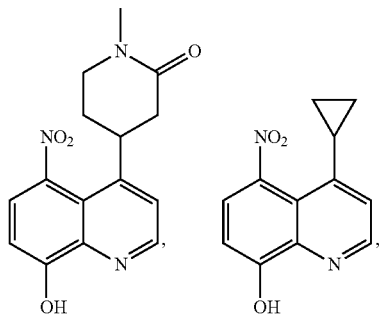
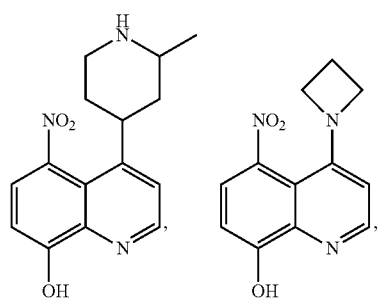
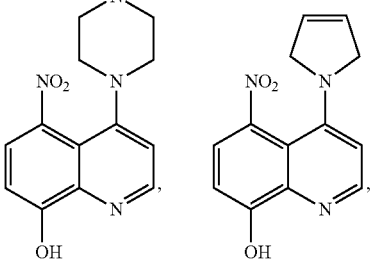
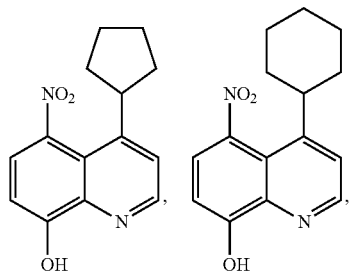
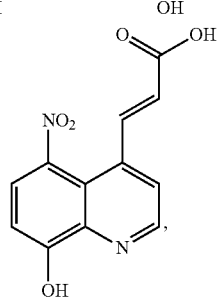
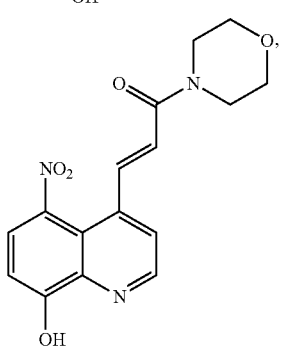
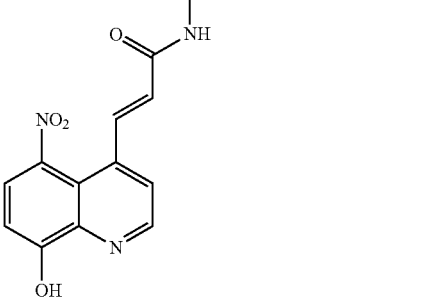
and -continued

,

,

,

,

,

,

, and

or a pharmaceutically acceptable salt thereof.

6. A method for preparing the compound of formula (I) or a pharmaceutically acceptable salt thereof according to claim 1, comprising the following steps of:

when $R^1$ is —$NR^aR^b$,

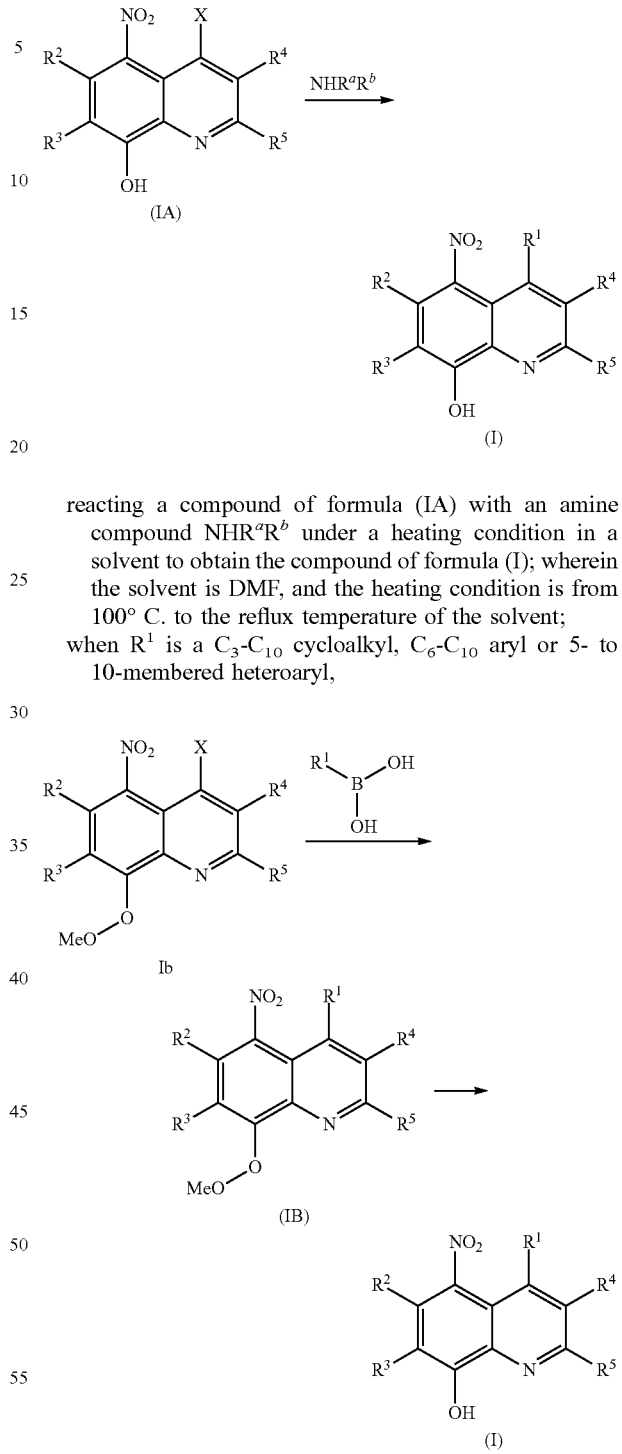

reacting a compound of formula (IA) with an amine compound $NHR^aR^b$ under a heating condition in a solvent to obtain the compound of formula (I); wherein the solvent is DMF, and the heating condition is from 100° C. to the reflux temperature of the solvent;

when $R^1$ is a $C_3$-$C_{10}$ cycloalkyl, $C_6$-$C_{10}$ aryl or 5- to 10-membered heteroaryl, reacting compound Ib with a boronic acid compound $R^1$—$B(OH)_2$ in the presence of a catalyst and an alkali to obtain a compound of formula (IB); wherein the catalyst is tetrakistriphenylphosphine palladium, and the alkali is potassium carbonate; and then, subjecting the compound of formula (IB) to a demethylation reaction under a heating condition in a solvent in the presence of a demethylation reagent to obtain the compound of formula (I); wherein the solvent is DMF, the demethylation reagent is LiCl, and the heating condition is the reflux temperature of the solvent;
wherein X is selected from halogen;
$R^2$, $R^3$, $R^4$ and $R^5$ are as defined in claim 1.

7. A pharmaceutical composition comprising a therapeutically effective amount of the compound of formula (I) or the pharmaceutically acceptable salt thereof according to claim 1 and a pharmaceutically acceptable carrier.

8. A method for treating an infectious disease or cancer comprising administering to a subject in need thereof a therapeutically effective amount of the compound of formula (I) or the pharmaceutically acceptable salt thereof according to claim 1, wherein the infectious disease is a systemic infection, reproductive system infection or urinary system infection.

9. The method according to claim 8, wherein the urinary system infection is an infection caused by Gram-negative bacteria and/or Gram-positive bacteria.

10. The compound of formula (I) or the pharmaceutically acceptable salt thereof according to claim 1, wherein $R^1$ is an unsubstituted $C_3$-$C_6$ cycloalkyl;
or, $R^1$ is

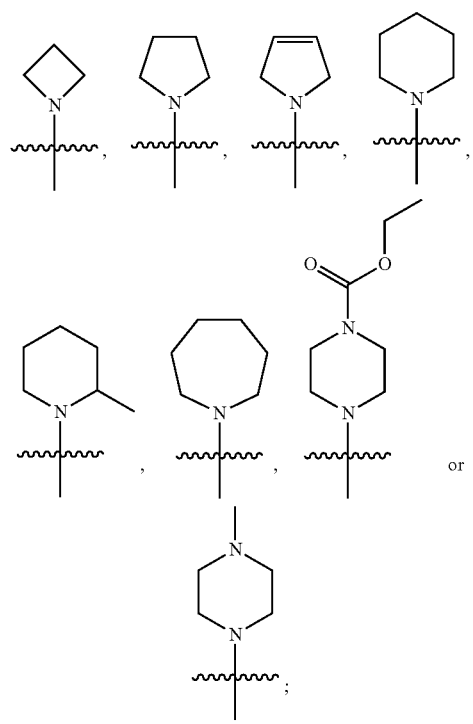

or, $R^1$ is an unsubstituted phenyl;
or, $R^1$ is pyridyl, pyrazolyl or imidazolyl unsubstituted or substituted by $C_1$-$C_6$ alkyl;
or, $R^1$ is —$NH_2$ or —$N(CH_3)_2$.

11. The compound of formula (I) or the pharmaceutically acceptable salt thereof according to claim 2, wherein the compound is

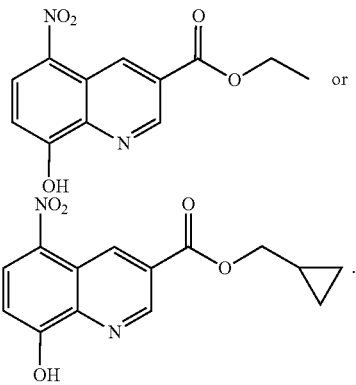

12. The compound of formula (I) or the pharmaceutically acceptable salt thereof according to claim 1, wherein $R^a$ and $R^b$ together with the nitrogen atom to which they are attached form a 5- to 7-membered nitrogen-containing heterocyclyl which is selected from the group consisting of

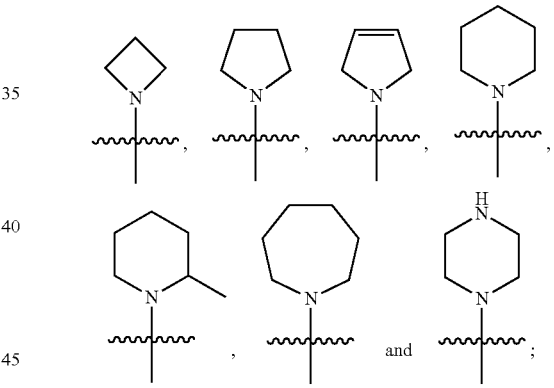

and the 5- to 7-membered nitrogen-containing heterocyclyl is optionally further substituted by one or more Qs;
Q is halogen, oxo, $C_1$-$C_6$ alkyl, —C(O)$R^c$, —C(O)O$R^c$, —C(O)N$R^c R^d$, —C(O)N($R^c$)($CH_2$)$_q R^d$ or —S(O)$_p R^c$; and
$R^c$, $R^d$, p, and q are as defined in claim 1.

* * * * *